(12) United States Patent
He et al.

(10) Patent No.: US 12,537,254 B2
(45) Date of Patent: *Jan. 27, 2026

(54) BATTERY PACK, VEHICLE, AND ENERGY STORAGE DEVICE

(71) Applicant: BYD COMPANY LIMITED, Guangdong (CN)

(72) Inventors: Long He, Shenzhen (CN); Huajun Sun, Shenzhen (CN); Wenfeng Jiang, Shenzhen (CN); Zhipei Lu, Shenzhen (CN); Weixin Zheng, Shenzhen (CN); Jianglong Tang, Shenzhen (CN); Yan Zhu, Shenzhen (CN); Xinyue Wang, Shenzhen (CN); Kefeng He, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,698

(22) Filed: Jul. 7, 2023

(65) Prior Publication Data

US 2023/0352783 A1 Nov. 2, 2023

Related U.S. Application Data

(63) Continuation of application No. 17/049,732, filed as application No. PCT/CN2019/092391 on Jun. 21, 2019, now abandoned.

(30) Foreign Application Priority Data

Jan. 9, 2019 (CN) .......................... 201910020925.5
Jan. 9, 2019 (CN) .......................... 201910020967.9

(Continued)

(51) Int. Cl.
*H01M 50/209* (2021.01)
*B60K 1/04* (2019.01)
(Continued)

(52) U.S. Cl.
CPC ............. *H01M 50/209* (2021.01); *B60K 1/04* (2013.01); *B60L 50/64* (2019.02); *B60L 50/66* (2019.02);
(Continued)

(58) Field of Classification Search
CPC ....................................................... B60K 1/04
See application file for complete search history.

(56) References Cited

U.S. PATENT DOCUMENTS 5,620,057 A 4/1997 Klemen et al.
7,618,740 B2 11/2009 Hamada et al.
(Continued)

FOREIGN PATENT DOCUMENTS

CN 1134041 A 10/1996
CN 101034753 A 9/2007
(Continued)

OTHER PUBLICATIONS

Wang CN-206584986 Machine Translation (Year: 2017).*
(Continued)

*Primary Examiner* — Ula C Ruddock
*Assistant Examiner* — Anna Korovina
(74) *Attorney, Agent, or Firm* — Calfee, Halter & Griswold LLP

(57) ABSTRACT

A battery pack, a vehicle, and an energy storage device are provided. The battery pack includes a cell array and a support member, where the cell array includes a plurality of cells, the cell has a first dimension, and the first dimension is a maximum spacing between two imaginary parallel planes sandwiching the cell; and at least one of the cells 600

(Continued)

mm≤first dimension≤2500 mm the at least one cell includes a casing and a core located inside the casing, a supporting region is formed on the casing, and the cell is connected to the support member through the supporting region and is supported by the support member. The support member is connected to the supporting region to support the cell.

20 Claims, 16 Drawing Sheets

(30) Foreign Application Priority Data

| Jan. 9, 2019 | (CN) | ................. | 201910021244.0 |
| Jan. 9, 2019 | (CN) | ................. | 201910021246.X |
| Jan. 9, 2019 | (CN) | ................. | 201910021247.4 |
| Jan. 9, 2019 | (CN) | ................. | 201910021248.9 |

(51) Int. Cl.

| *B60L 50/60* | (2019.01) |
| *B60L 50/64* | (2019.01) |
| *H01M 10/052* | (2010.01) |
| *H01M 10/42* | (2006.01) |
| *H01M 10/613* | (2014.01) |
| *H01M 10/625* | (2014.01) |
| *H01M 10/647* | (2014.01) |
| *H01M 10/6551* | (2014.01) |
| *H01M 10/6554* | (2014.01) |
| *H01M 50/103* | (2021.01) |
| *H01M 50/119* | (2021.01) |
| *H01M 50/244* | (2021.01) |
| *H01M 50/249* | (2021.01) |
| *H01M 50/271* | (2021.01) |
| *H01M 50/317* | (2021.01) |
| *H01M 50/342* | (2021.01) |
| *H01M 50/35* | (2021.01) |
| *H01M 50/383* | (2021.01) |
| *H01M 50/531* | (2021.01) |
| *H01M 50/543* | (2021.01) |
| *B60L 58/26* | (2019.01) |

(52) U.S. Cl.
CPC ....... *H01M 10/052* (2013.01); *H01M 10/425* (2013.01); *H01M 10/613* (2015.04); *H01M 10/625* (2015.04); *H01M 10/647* (2015.04); *H01M 10/6551* (2015.04); *H01M 10/6554* (2015.04); *H01M 50/103* (2021.01); *H01M 50/119* (2021.01); *H01M 50/244* (2021.01); *H01M 50/249* (2021.01); *H01M 50/271* (2021.01); *H01M 50/317* (2021.01); *H01M 50/342* (2021.01); *H01M 50/3425* (2021.01); *H01M 50/35* (2021.01); *H01M 50/383* (2021.01); *H01M 50/531* (2021.01); *H01M 50/543* (2021.01); *B60K 2001/0405* (2013.01); *B60K 2001/0438* (2013.01); *B60L 58/26* (2019.02); *H01M 2010/4271* (2013.01); *H01M 2220/20* (2013.01)

(56) References Cited

U.S. PATENT DOCUMENTS

| 8,268,469 | B2 | 9/2012 | Hermann et al. |
| 8,642,204 | B2 | 2/2014 | Higashino et al. |
| 8,910,737 | B2 | 12/2014 | Saeki |
| 9,017,845 | B2 | 4/2015 | Bender et al. |
| 9,283,837 | B1 | 3/2016 | Rawlinson |
| 9,306,201 | B2 | 4/2016 | Lu et al. |
| 9,337,458 | B2 | 5/2016 | Kim |
| 9,437,854 | B2 | 9/2016 | Shimizu et al. |
| 9,444,082 | B2 | 9/2016 | Tsujimura et al. |
| 9,806,312 | B2 | 10/2017 | Li et al. |
| 9,806,386 | B2 | 10/2017 | Lim |
| 9,843,027 | B1 | 12/2017 | Spotnitz et al. |
| 10,059,382 | B2 | 8/2018 | Nusier et al. |
| 10,099,546 | B2 | 10/2018 | Hara et al. |
| 11,088,412 | B2 | 8/2021 | Matecki et al. |
| 2002/0086578 | A1 | 7/2002 | Ikeda |
| 2003/0152825 | A1 | 8/2003 | Siddiqui et al. |
| 2004/0058233 | A1 | 3/2004 | Hamada et al. |
| 2007/0015049 | A1 | 1/2007 | Hamada et al. |
| 2009/0136806 | A1 | 5/2009 | Imanishi et al. |
| 2011/0003198 | A1 | 1/2011 | Noda et al. |
| 2011/0027632 | A1 | 2/2011 | Higashino et al. |
| 2011/0174556 | A1 | 7/2011 | Hermann et al. |
| 2012/0028105 | A1* | 2/2012 | Kumar ............... H01M 10/482 429/152 |
| 2012/0114993 | A1* | 5/2012 | Park ................... H01M 50/271 429/88 |
| 2012/0261206 | A1 | 10/2012 | Yasui et al. |
| 2013/0130070 | A1 | 5/2013 | Adachi et al. |
| 2013/0175829 | A1 | 7/2013 | Kim et al. |
| 2014/0014428 | A1* | 1/2014 | Yanagi .................. B60K 1/04 180/68.5 |
| 2014/0020969 | A1 | 1/2014 | Okada et al. |
| 2014/0072835 | A1 | 3/2014 | Tsujimura et al. |
| 2014/0087231 | A1* | 3/2014 | Schaefer ........... H01M 10/6554 429/120 |
| 2014/0093756 | A1 | 4/2014 | Nemoto et al. |
| 2014/0120391 | A1 | 5/2014 | Park |
| 2014/0127537 | A1 | 5/2014 | Pflueger et al. |
| 2014/0186677 | A1 | 7/2014 | Lim |
| 2014/0308550 | A1 | 10/2014 | Shimizu et al. |
| 2015/0081298 | A1 | 3/2015 | Ding et al. |
| 2015/0086842 | A1 | 3/2015 | Kang et al. |
| 2015/0140369 | A1 | 5/2015 | Itoi et al. |
| 2015/0303422 | A1* | 10/2015 | Poller ................. H01M 50/171 429/54 |
| 2016/0006006 | A1 | 1/2016 | Motokawa et al. |
| 2016/0064781 | A1 | 3/2016 | Specht et al. |
| 2016/0093843 | A1 | 3/2016 | Reineccius et al. |
| 2016/0133889 | A1 | 5/2016 | Tseng et al. |
| 2016/0133900 | A1 | 5/2016 | Li et al. |
| 2016/0133901 | A1 | 5/2016 | Li et al. |
| 2016/0141738 | A1 | 5/2016 | Kwag |
| 2016/0167544 | A1 | 6/2016 | Barbat et al. |
| 2016/0204404 | A1 | 7/2016 | Shimizu et al. |
| 2016/0226034 | A1 | 8/2016 | Seok et al. |
| 2016/0301045 | A1* | 10/2016 | Tyler ............... H01M 10/6554 |
| 2017/0088182 | A1 | 3/2017 | Hara |
| 2017/0190264 | A1 | 7/2017 | Kim et al. |
| 2017/0214008 | A9 | 7/2017 | Mardall et al. |
| 2017/0237113 | A1 | 8/2017 | Ruehle et al. |
| 2017/0309870 | A1* | 10/2017 | Millon ................ H01M 50/119 |
| 2017/0331090 | A1 | 11/2017 | Li et al. |
| 2018/0013105 | A1 | 1/2018 | Wuensche et al. |
| 2018/0013113 | A1 | 1/2018 | Wuensche et al. |
| 2018/0029493 | A1 | 2/2018 | Kobayashi et al. |
| 2018/0166735 | A1 | 6/2018 | Lee et al. |
| 2018/0194235 | A1 | 7/2018 | Kim et al. |
| 2018/0229593 | A1 | 8/2018 | Hitz et al. |
| 2018/0287213 | A1 | 10/2018 | Sato et al. |
| 2018/0337374 | A1 | 11/2018 | Matecki et al. |
| 2018/0337378 | A1 | 11/2018 | Stephens et al. |
| 2018/0358593 | A1 | 12/2018 | Seo et al. |
| 2018/0366717 | A1 | 12/2018 | Hu et al. |
| 2019/0044114 | A1 | 2/2019 | Demar |
| 2020/0140018 | A1 | 5/2020 | Grottke et al. |
| 2020/0212385 | A1 | 7/2020 | Shi et al. |
| 2020/0295322 | A1 | 9/2020 | Gunther |

FOREIGN PATENT DOCUMENTS

| CN | 101079477 | A | 11/2007 |
| CN | 101145059 | A | 3/2008 |
| CN | 101305488 | A | 11/2008 |

(56) References Cited

FOREIGN PATENT DOCUMENTS

| | | | |
|---|---|---|---|
| CN | 201146206 Y | 11/2008 | |
| CN | 101521265 A | 9/2009 | |
| CN | 101877413 A | 11/2010 | |
| CN | 201766132 U | 3/2011 | |
| CN | 102104122 A | 6/2011 | |
| CN | 202034426 U | 11/2011 | |
| CN | 202210539 U | 5/2012 | |
| CN | 202217748 U | 5/2012 | |
| CN | 202268403 U | 6/2012 | |
| CN | 202268412 U | 6/2012 | |
| CN | 202332978 U | 7/2012 | |
| CN | 202373642 U | 8/2012 | |
| CN | 102683907 A | 9/2012 | |
| CN | 102893426 A | 1/2013 | |
| CN | 202712297 U | 1/2013 | |
| CN | 102956934 A | 3/2013 | |
| CN | 102007619 B | 6/2013 | |
| CN | 103269941 A | 8/2013 | |
| CN | 203150637 U | 8/2013 | |
| CN | 103296302 A | 9/2013 | |
| CN | 103824984 A | 5/2014 | |
| CN | 203600973 U | 5/2014 | |
| CN | 103928642 A | 7/2014 | |
| CN | 103931020 A | 7/2014 | |
| CN | 203760534 U | 8/2014 | |
| CN | 102823054 B | 12/2014 | |
| CN | 203983373 U | 12/2014 | |
| CN | 204029891 U | 12/2014 | |
| CN | 104319360 A | 1/2015 | |
| CN | 204130608 U | 1/2015 | |
| CN | 204189846 U | 3/2015 | |
| CN | 104576999 A | 4/2015 | |
| CN | 104733667 A | 6/2015 | |
| CN | 104795527 A | 7/2015 | |
| CN | 204577542 U | 8/2015 | |
| CN | 204614833 U | 9/2015 | |
| CN | 204651372 U | 9/2015 | |
| CN | 204668376 U | 9/2015 | |
| CN | 204732461 U | 10/2015 | |
| CN | 105024112 A | 11/2015 | |
| CN | 204809680 U | 11/2015 | |
| CN | 204857906 U | 12/2015 | |
| CN | 204885223 U | 12/2015 | |
| CN | 105244462 A | 1/2016 | |
| CN | 105322222 A | 2/2016 | |
| CN | 105489828 A | 4/2016 | |
| CN | 205159465 U | 4/2016 | |
| CN | 205282524 U | 6/2016 | |
| CN | 205282525 U | 6/2016 | |
| CN | 105762316 A | 7/2016 | |
| CN | 205488247 U | 8/2016 | |
| CN | 103035975 B | 9/2016 | |
| CN | 205621793 U | 10/2016 | |
| CN | 106182714 A | 12/2016 | |
| CN | 106257714 A | 12/2016 | |
| CN | 106299166 A | 1/2017 | |
| CN | 205900631 U | 1/2017 | |
| CN | 205900638 U | 1/2017 | |
| CN | 106450089 A | 2/2017 | |
| CN | 205960060 U | 2/2017 | |
| CN | 106486625 A | 3/2017 | |
| CN | 205992578 U | 3/2017 | |
| CN | 206040913 U | 3/2017 | |
| CN | 106558659 A | 4/2017 | |
| CN | 106575728 A | 4/2017 | |
| CN | 106605314 A | 4/2017 | |
| CN | 206134803 U | 4/2017 | |
| CN | 206134820 U | 4/2017 | |
| CN | 106627081 A | 5/2017 | |
| CN | 106654114 A | 5/2017 | |
| CN | 106684287 A | 5/2017 | |
| CN | 206259400 U | 6/2017 | |
| CN | 106953039 A | 7/2017 | |
| CN | 106992273 A | 7/2017 | |
| CN | 206364073 U | 7/2017 | |
| CN | 107112443 A | 8/2017 | |
| CN | 206374545 U | 8/2017 | |
| CN | 107123769 A | 9/2017 | |
| CN | 107195829 A | 9/2017 | |
| CN | 206532801 U | 9/2017 | |
| CN | 107248557 A | 10/2017 | |
| CN | 107256932 A | 10/2017 | |
| CN | 107275710 A | 10/2017 | |
| CN | 107293809 A | 10/2017 | |
| CN | 206584986 U | * 10/2017 | ............... B60K 1/04 |
| CN | 206595314 U | 10/2017 | |
| CN | 107394063 A | 11/2017 | |
| CN | 107394279 A | 11/2017 | |
| CN | 107437594 A | 12/2017 | |
| CN | 107482141 A | 12/2017 | |
| CN | 107611296 A | 1/2018 | |
| CN | 107644962 A | 1/2018 | |
| CN | 206849954 U | 1/2018 | |
| CN | 206864505 U | 1/2018 | |
| CN | 206893769 U | 1/2018 | |
| CN | 107681076 A | 2/2018 | |
| CN | 107768560 A | 3/2018 | |
| CN | 107785511 A | 3/2018 | |
| CN | 107833996 A | 3/2018 | |
| CN | 207097887 U | 3/2018 | |
| CN | 107887536 A | 4/2018 | |
| CN | 107925028 A | 4/2018 | |
| CN | 107946506 A | 4/2018 | |
| CN | 107946692 A | 4/2018 | |
| CN | 207183353 U | 4/2018 | |
| CN | 207233816 U | 4/2018 | |
| CN | 207233915 U | 4/2018 | |
| CN | 105845860 B | 5/2018 | |
| CN | 107978800 A | 5/2018 | |
| CN | 108011069 A | 5/2018 | |
| CN | 108075063 A | 5/2018 | |
| CN | 108075065 A | 5/2018 | |
| CN | 207381449 U | 5/2018 | |
| CN | 207398218 U | 5/2018 | |
| CN | 207425959 U | 5/2018 | |
| CN | 207459036 U | 6/2018 | |
| CN | 207474601 U | 6/2018 | |
| CN | 207530003 U | 6/2018 | |
| CN | 207559010 U | 6/2018 | |
| CN | 207664083 U | 7/2018 | |
| CN | 108370075 A | 8/2018 | |
| CN | 108389986 A | 8/2018 | |
| CN | 108417747 A | 8/2018 | |
| CN | 207705320 U | 8/2018 | |
| CN | 207743264 U | 8/2018 | |
| CN | 207743294 U | 8/2018 | |
| CN | 207781672 U | 8/2018 | |
| CN | 207800740 U | 8/2018 | |
| CN | 108493384 A | 9/2018 | |
| CN | 108598354 A | 9/2018 | |
| CN | 207818679 U | 9/2018 | |
| CN | 207818697 U | 9/2018 | |
| CN | 207818836 U | 9/2018 | |
| CN | 207868256 U | 9/2018 | |
| CN | 207967121 U | 10/2018 | |
| CN | 207967123 U | 10/2018 | |
| CN | 208014765 U | 10/2018 | |
| CN | 208014778 U | 10/2018 | |
| CN | 108749548 A | 11/2018 | |
| CN | 108777268 A | 11/2018 | |
| CN | 108933203 A | 12/2018 | |
| CN | 108933296 A | 12/2018 | |
| CN | 108963184 A | 12/2018 | |
| CN | 208189676 U | 12/2018 | |
| CN | 208256735 U | 12/2018 | |
| CN | 208256768 U | 12/2018 | |
| CN | 208256770 U | 12/2018 | |
| CN | 109148771 A | 1/2019 | |
| CN | 208336298 U | 1/2019 | |
| CN | 109346637 A | 2/2019 | |
| CN | 110088937 A | 8/2019 | |
| CN | 110165115 A | 8/2019 | |
| CN | 110165117 A | 8/2019 | |
| CN | 110190211 A | 8/2019 | |

(56) References Cited

FOREIGN PATENT DOCUMENTS

| | | |
|---|---|---|
| CN | 110190212 A | 8/2019 |
| DE | 4407156 C1 | 6/1995 |
| DE | 10328209 A1 | 1/2005 |
| DE | 102017206566 A1 | 10/2017 |
| DE | 202017101961 U1 | 8/2018 |
| DE | 102017204412 A1 | 9/2018 |
| DE | 102017114749 A1 * 10/2018 ............. B60L 50/64 | |
| DE | 102017209342 A1 | 12/2018 |
| EP | 638951 A2 | 2/1995 |
| EP | 1978578 A2 | 10/2008 |
| EP | 2266151 A1 | 12/2010 |
| EP | 2490276 A2 | 8/2012 |
| EP | 2562843 A1 | 2/2013 |
| EP | 2565958 A1 | 3/2013 |
| EP | 2654100 A1 | 10/2013 |
| EP | 2693515 A1 | 2/2014 |
| EP | 2698862 A1 | 2/2014 |
| EP | 2573834 B1 | 4/2014 |
| EP | 3004246 A1 | 4/2016 |
| EP | 3125334 A2 | 2/2017 |
| EP | 3279970 A1 | 2/2018 |
| EP | 3331055 A1 | 6/2018 |
| EP | 3345783 A1 | 7/2018 |
| EP | 3386001 A1 | 10/2018 |
| EP | 3386002 A1 | 10/2018 |
| EP | 3422441 A4 | 1/2019 |
| EP | 3021379 B1 | 7/2019 |
| FR | 2951029 A1 | 4/2011 |
| HK | 1207922 A1 | 2/2016 |
| JP | 02138858 A | 5/1990 |
| JP | H06-203813 A | 7/1994 |
| JP | 07186734 A | 7/1995 |
| JP | 09274899 A | 10/1997 |
| JP | 2000351328 A | 12/2000 |
| JP | 2001256942 A | 9/2001 |
| JP | 2001313009 A | 11/2001 |
| JP | 2002298827 A | 10/2002 |
| JP | 2003007345 A | 1/2003 |
| JP | 2006054189 A | 2/2006 |
| JP | 2007027011 A | 2/2007 |
| JP | 2007134178 A | 5/2007 |
| JP | 2008117765 A | 5/2008 |
| JP | 2008171628 A | 7/2008 |
| JP | 2009277647 A | 11/2009 |
| JP | 2012064358 A | 3/2012 |
| JP | 2012119138 A | 6/2012 |
| JP | 2012243438 A | 12/2012 |
| JP | 2013069691 A | 4/2013 |
| JP | 5331517 B2 | 10/2013 |
| JP | 2013211197 A | 10/2013 |
| JP | 2014-008532 A | 1/2014 |
| JP | 5384432 B2 | 1/2014 |
| JP | 2014022277 A | 2/2014 |
| JP | 2014080116 A | 5/2014 |
| JP | 2014164795 A | 9/2014 |
| JP | 2015022915 A | 2/2015 |
| JP | 2015057759 A | 3/2015 |
| JP | 2015118799 A | 6/2015 |
| JP | 5903607 B2 | 4/2016 |
| JP | 2016096129 A | 5/2016 |
| JP | 2016100308 A | 5/2016 |
| JP | 2016122572 A | 7/2016 |
| JP | 2017054683 A | 3/2017 |
| JP | 2017111893 A | 6/2017 |
| JP | 2017162806 A | 9/2017 |
| JP | 2017-197093 A | 11/2017 |
| JP | 2017196941 A | 11/2017 |
| JP | 2017196959 A | 11/2017 |
| JP | 2017228391 A | 12/2017 |
| JP | 2018073552 A | 5/2018 |
| JP | 2018077979 A | 5/2018 |
| JP | 2018106822 A | 7/2018 |
| JP | 2018110048 A | 7/2018 |
| JP | 2018527704 A | 9/2018 |
| JP | 2018176961 A | 11/2018 |
| JP | 2018206495 A | 12/2018 |
| JP | 2018536975 A | 12/2018 |
| JP | 2019056716 A | 4/2019 |
| KR | 1020090000307 A | 1/2009 |
| KR | 2020090000307 U | 1/2009 |
| KR | 1020120049020 A | 5/2012 |
| KR | 1020130076660 A | 7/2013 |
| KR | 1020130116342 A | 10/2013 |
| KR | 1020130140245 A | 12/2013 |
| KR | 1020140042737 A | 4/2014 |
| KR | 1020140089067 A | 7/2014 |
| KR | 1020140138674 A | 12/2014 |
| KR | 1020160076156 A | 6/2016 |
| KR | 1020160094235 A | 8/2016 |
| KR | 101669118 B1 | 10/2016 |
| KR | 1020170023595 A | 3/2017 |
| KR | 1020170044473 A | 4/2017 |
| KR | 1020170053429 A | 5/2017 |
| KR | 1020170090261 A | 8/2017 |
| KR | 1020180081000 A | 7/2018 |
| KR | 1020180112617 A | 10/2018 |
| KR | 1020180116339 A | 10/2018 |
| KR | 1020190000211 A | 1/2019 |
| TW | 364221 B | 7/1999 |
| TW | 200840170 A | 10/2008 |
| TW | I 319637 | 1/2010 |
| TW | I 525879 B | 3/2016 |
| WO | 2009128214 A1 | 10/2009 |
| WO | 2010114317 A2 | 10/2010 |
| WO | WO-2012013789 A1 * 2/2012 ............... B60K 1/04 | |
| WO | 2012039013 A1 | 3/2012 |
| WO | 2013031614 A1 | 3/2013 |
| WO | 2013069308 A1 | 5/2013 |
| WO | 2013161370 A1 | 10/2013 |
| WO | 2014065110 A1 | 5/2014 |
| WO | 2015173999 A1 | 11/2015 |
| WO | 2015186849 A1 | 12/2015 |
| WO | 2016174855 A1 | 11/2016 |
| WO | 2017078264 A1 | 5/2017 |
| WO | 2017143754 A1 | 8/2017 |
| WO | 2018087681 A1 | 5/2018 |
| WO | 2018123574 A1 | 7/2018 |
| WO | 2018125641 A1 | 7/2018 |
| WO | 2018186582 A1 | 10/2018 |
| WO | 2018198895 A1 | 11/2018 |
| WO | 2019001357 A1 | 1/2019 |
| WO | 2019127957 A1 | 7/2019 |

OTHER PUBLICATIONS

Bohm DE-102017114749 Machine Translation (Year: 2018).*
Cheng CN 201766132 Machine Translation (Year: 2011).*
Denys WO-2012013789 Machine Translation (Year: 2012).*
Office Action from U.S. Appl. No. 17/421,875 dated Oct. 2, 2023.
Office Action from U.S. Appl. No. 17/421,895 dated Oct. 23, 2023.
International Search Report of PCT/CN2019/097479 dated Oct. 16, 2019.
International Search Report of PCT/CN2019/097640 dated Oct. 16, 2019.
International Search Report of PCT/CN2019/092390 dated Sep. 6, 2019.
International Search Report of PCT/CN2019/098441 dated Sep. 27, 2019.
International Search Report of PCT/CN2019/092351 dated Oct. 11, 2019 (2 pages).
International Search Report of PCT/CN2019/092393 dated Oct. 8, 2019 (2 pages).
BYD Europe, Nail Penetration Test on the BYD Blade Battery and NCM Batter; https://www.youtube.com/watch?v=CSGEsKhtZD0; Published Sep. 26, 2021.
Office Action from U.S. Appl. No. 17/419,443 dated Aug. 1, 2023.
Office Action from U.S. Appl. No. 17/049,732 dated Jan. 18, 2023.

* cited by examiner

BATTERY PACK, VEHICLE, AND ENERGY STORAGE DEVICE

CROSS-REFERENCE TO RELATED APPLICATIONS

This application is a continuation of U.S. patent application Ser. No. 17/049,732, filed Oct. 22, 2020, which is a 371 of International Application No. PCT/CN2019/092391, filed Jun. 21, 2019, which is based on and claims priority to and benefits of Chinese Patent Application "201910021244.0", Nos. "201910020967.9", "201910021246.X", "201910021248.9", "201910021247.4", and "201910020925.5", all filed by BYD Company Limited with the State Intellectual Property Office of P. R. China on Jan. 9, 2019. The entire contents of the above-referenced applications are incorporated herein by reference.

FIELD

This application relates to the field of vehicle manufacturing technologies, and specifically to a battery pack, a vehicle including the battery pack, and an energy storage device including the battery pack.

BACKGROUND

Battery packs applied to electric vehicles in the related art mainly include a battery pack housing and a plurality of battery modules mounted in the battery pack housing. Each of the battery modules is formed by a plurality of cells assembled together.

Users' requirements on the battery life of electric vehicles are becoming higher. However, in the case of limited space at the bottom of the vehicle body, power battery packs in the prior art have the problem of low space utilization, and the energy density of such power battery packs cannot meet the requirements, and it gradually becomes an important factor hindering the development of electric vehicles.

SUMMARY

In the related art, as shown in FIG. 1, a battery pack includes a battery pack housing, a plurality of transverse beams 500 and a plurality of longitudinal beams 600, a plurality of transverse beams 500 and a plurality of longitudinal beams 600 divide the battery pack housing into a plurality of mounting regions for battery modules 400. The battery modules 400 are fixed on the transverse beams 500 or the longitudinal beams 600 by screws or other means. Each of the battery modules 400 includes a plurality of cells arranged in sequence. A plurality of cells are arranged to form a cell array. At least one of end plates and side plates are disposed outside the cell array. Usually, both end plates and side plates are disposed. The end plates and the side plates are fixed to define a space for accommodating the cell array. In addition, the end plates and the side plates are connected by screws, by welding, or by other connecting members such as a pull rod, so as to fix the cell array.

Because the battery modules 400 are fixed on the transverse beams 500 and the longitudinal beams 600 by screws, space is wasted, and the use of screws or other connecting members increases the weight, and the energy density is reduced. In addition, because the battery module 400 are designed with the end plates and the side plates which all have a certain thickness and height, space inside the battery pack is wasted, leading to low utilization of the volume of the battery pack. Generally, for the battery pack in the prior art, the ratio of the sum of the volumes of cells in the battery pack to the volume of the battery pack is about 50%, or even lower than 40%.

For the battery pack provided in the embodiment of the prior art, the end plates and the side plates of the battery module 400 and the connection and mounting manners inside the battery pack reduce the utilization of the space inside the battery pack. As a result, in the battery pack, the ratio of the sum of the volumes of cells to the volume of the battery pack is too low, and the energy density of the battery pack cannot meet the requirements, and it gradually becomes an important factor hindering the development of electric vehicles. In addition, a complicated assembly process is required, and complex assembly procedures need to be performed. To be specific, first, cells need to be assembled to form a battery module, and then the battery module needs to be mounted in the battery pack housing, leading to increased labor and material costs. In addition, multiple assembly procedures required in the assembly process of the battery pack lead to an increase in defect rate and an increase in the possibility of loosening and unstable mounting of the battery pack, adversely affecting the quality of the battery pack and reducing the stability and reliability of the battery pack.

The present invention aims to solve at least one of the technical problems in the related art. In view of this, an objective of the present disclosure is to provide a battery pack, which has the advantages of high space utilization, high energy density, long battery life, and low costs.

To achieve the above objective, this application provides a battery pack, including a cell array and a support member, where the cell array includes a plurality of cells, the cell has a first dimension, and the first dimension is a maximum spacing between two imaginary parallel planes sandwiching the cell; and at least one of the cells meets 600 mm≤first dimension≤2500 mm and includes a casing and a core located inside the casing, a supporting region is formed on the casing, and the cell is connected to the support member through the supporting region and is supported on the support member.

This application provides a battery pack, including a cell array and a support member, where the cell array includes a plurality of cells, the cell has a dimension A, the dimension A is a length of a minimum enclosing rectangle of the cell, at least one of the cells meets 600 mm≤dimension A≤2500 mm and includes a casing and a core located inside the casing, a supporting region is formed on the casing, and the cell is connected to the support member through the supporting region and is supported on the support member.

This application provides a battery pack, including a cell array and a support member, where the cell array includes a plurality of cells, at least one of the cells includes a cell body and electrode terminals extending out of the cell body and configured to output a current inside the cell body, the cell body is substantially a cuboid, the cell body has a length L, 600 mm≤L≤2500 mm, the at least one cell includes a casing and a core located inside the casing, a supporting region is formed on the casing, and the cell is connected to the support member through the supporting region and is supported on the support member.

According to the above technical solutions, by limiting the arrangement of cells in the battery pack and the cell dimension, more cells can be disposed in the battery pack; and because the cell is connected to the support member through the supporting region and is supported on the support member, the use of transverse beams or longitudinal beams in the battery pack can be reduced, or even the use of transverse beams and/or longitudinal beams in the battery pack can be avoided, so that the space occupied by transverse beams and/or longitudinal beams in the battery pack can be reduced, thereby improving the utilization of the space inside the battery pack, and allowing as many cells as possible to be disposed in the battery pack, to make the battery pack safer and more reliable. In this way, the capacity, the voltage, and the battery life of the entire battery pack can be improved. For example, in an electric vehicle, such a design can improve the space utilization from about 40% to 60% or even higher, for example, 80%.

In addition, because no transverse beam and/or longitudinal beam needs to be disposed in the battery pack, one one hand, the fabrication process of the battery pack is simplified, the assembly complexity of the cell is reduced, and the production costs are reduced; on the other hand, the weight of the entire battery pack is reduced, thereby achieving a lightweight battery pack. Particularly, when the battery pack is mounted on an electric vehicle, the battery life of the electric vehicle can also be improved, and the weight of the electric vehicle can be reduced.

Moreover, compared with the cell in the prior art, in the present disclosure, the cell has a hard shell and a long cell dimension, so that the cell itself can serve as a transverse beam or longitudinal beam to enhance the structural strength of the battery pack. In other words, no reinforcing structure for enhancing the structural strength needs to be disposed in the battery pack, and the cell can be supported by the support member, that is, the cell itself can be directly used to replace the reinforcing structure to ensure the structural strength of the battery pack, thereby ensuring that the battery pack does not easily deform under an external force.

This application further provides a vehicle, including the above-mentioned battery pack.

This application further provides an energy storage device, including the above-mentioned battery pack.

The vehicle, the energy storage device, and the above-mentioned battery pack have the same advantages over the related art, and the details will not be repeated herein.

Other aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description made with reference to the following accompanying drawings, wherein.

Figure 1:
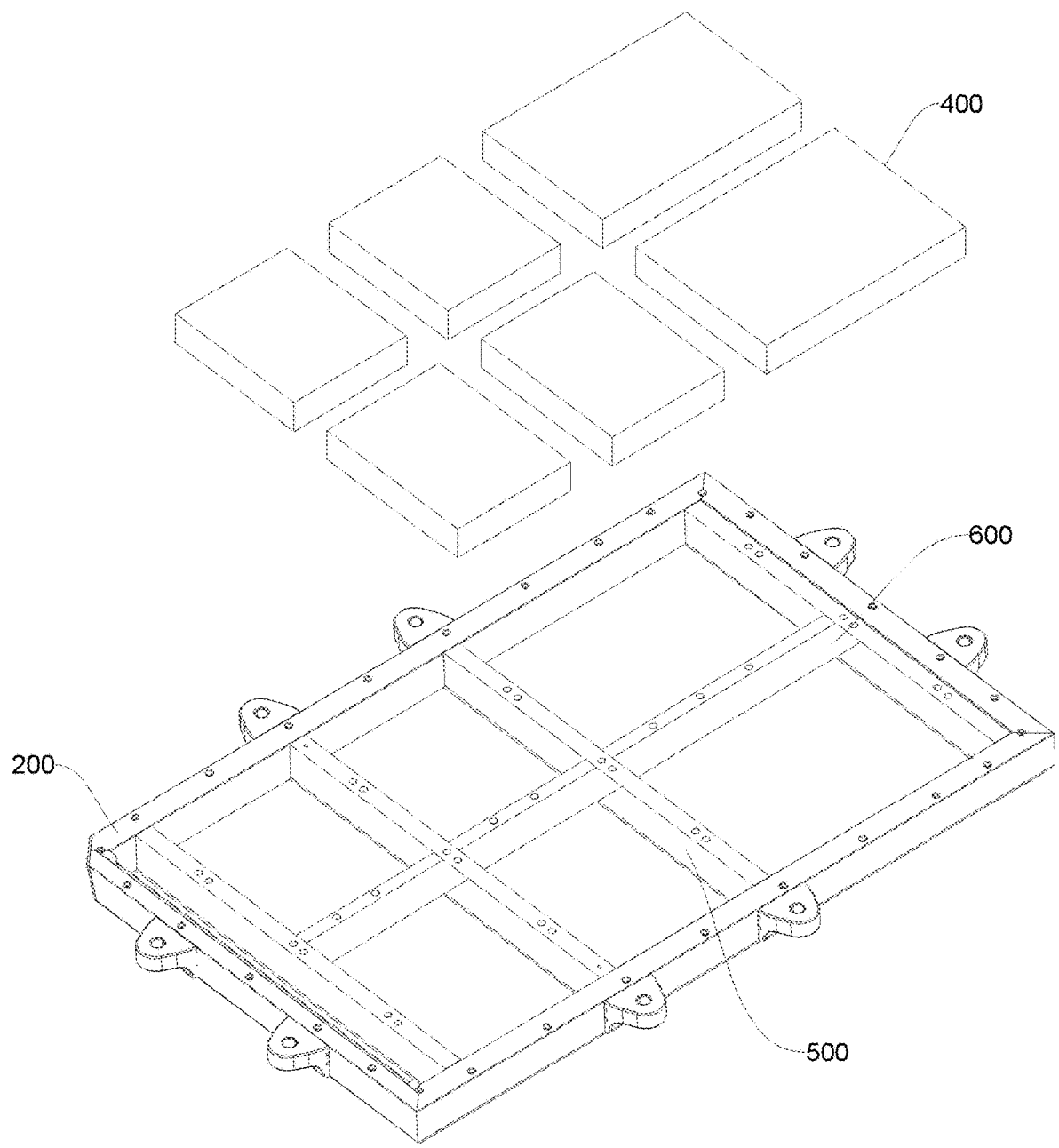
FIG. 1 is a schematic exploded view of a battery pack provided in the related art.

LIST OF REFERENCE NUMERALS 1 vehicle 2 energy storage device
3 cell array 4 support member
100 cell 101 first electrode terminal
102 second electrode terminal 103 explosion-proof valve
200 battery pack 201 first side beam
202 second side beam 203 third side beam 204 fourth side beam 205 first elastic apparatus
206 second elastic apparatus 207 first end plate
208 second end plate 209 first side plate
210 second side plate 211 second panel
212 first panel 213 first support plate
214 second support plate 215 first connecting surface
216 second connecting surface 217 thermal insulation layer
218 heat-conducting plate 219 heat exchange plate
221 gas inlet 222 exhaust passage
235 fourth connecting surface 236 third connecting surface
233 second connecting plate 234 side plate body
232 first connecting plate 231 end plate body
700 first partition plate 800 second partition plate
300 cavity 301 first side wall
302 second side wall 305 bottom of cavity
400 battery module 500 transverse beam
501 first beam 502 second beam
600 longitudinal beam
L dimension of the cell along the Y direction
D dimension of the cell along the X direction
H dimension of the cell along the Z direction
L1 distance between the first end and the second end of the cell
L2 distance between inner surfaces of the first side beam and the second side beam/distance between the first side wall and the second side wall along the first direction
L3 width of the battery pack in the Y direction

DETAILED DESCRIPTION

The following describes embodiments of this application in detail. Examples of the embodiments are shown in the accompanying drawings, and same or similar reference numerals throughout the accompanying drawings indicate same or similar components or components having same or similar functions. The following embodiments described with reference to the accompanying drawings are exemplary, are only used for explaining this application, and shall not be understood as limiting this application.

As shown in FIG. 2 to FIG. 25, according to an aspect of this application, a battery pack 200 is provided, including a cell array 3 and a support member 4.

The cell array 3 includes a plurality of cells 100, the cell 100 has a first dimension, and the first dimension is a maximum spacing between two imaginary parallel planes sandwiching the cell 100. At least one of the cells 100 meets: 600 mm≤first dimension≤2500 mm.

It should be noted that the two imaginary parallel planes sandwiching the cell 100 are introduced for the ease of understanding the first dimension, and do not physically exist in the solutions of this application. For example, the cell 100 has a regular or irregular external contour. To determine the first dimension, multiple sets of planes may be imagined. Each set of planes includes two parallel planes spaced apart from each other. The two parallel planes in each set together can imaginarily sandwich two opposite sides of the cell 100. In this case, a distance exists between the two parallel planes in each set, and the first dimension is a maximum value of such distances.

Figure 28:
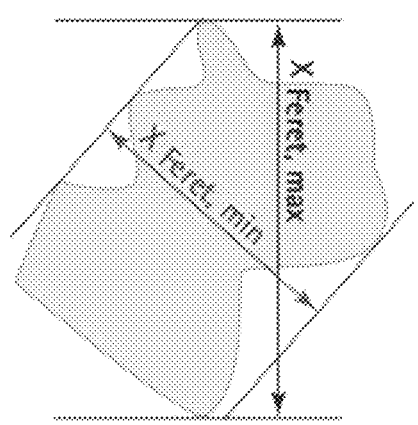
FIG. 28 is a diagram showing the principle of measuring a first dimension and a second dimension according to this application.

As shown in FIG. 28, the first dimension may be defined with reference to Feret diameter. The Feret diameter is a measure of an object dimension along a specified direction. In general, the measurement method is defined as the distance between the two parallel planes restricting the object perpendicular to the specified direction.

The cell 100 may be of various shapes, for example, may be of a regular geometry or of an irregular geometry. For example, the cell may be square, round, polygonal, triangular, or of any other shape. For example, the cell is a special-shaped cell. It may be understood that the shape of the cell is not limited in this application.

When the cell 100 is a special-shaped cell, the first dimension may be construed as follows: there are multiple pairs of parallel planes tangent to the contour edge of the cell 100, and when a spacing between one pair of parallel planes is greater than spacings between the other pairs of parallel planes, the largest spacing may be defined as the first dimension.

The cell 100 includes a casing and a core located inside the casing. A supporting region is formed on the casing, and the cell 100 is connected to the support member through the supporting region and is supported on the support member.

Compared with the prior art, the battery pack 200 of this application at least has the following improvements:

1) The costs of the battery pack are significantly reduced. Because the cell itself provides a supporting function, reinforcing ribs used in the battery tray can be reduced or omitted, making the fabrication process of the battery pack simpler, and reducing the manufacturing costs. In addition, according to this application, the cell dimension can fit the dimension of the battery pack, and the cells can be directly disposed side by side in the battery pack, different from the prior art where a plurality of cells need to be disposed side by side in a module frame formed by two end plates and two side plates and then the battery modules are assembled to form a battery pack. The cell dimension in this application is long enough, and a plurality of cells can be directly disposed side by side in the battery pack, so that the use of end plates and side plates for assembling battery modules and a large number of fasteners such as screws for fixedly mounting the battery modules is avoided or reduced, making the assembly process of cells simpler, and significantly reducing manufacturing costs in labor and materials. Low-cost battery packs are conducive to the popularization of new energy vehicles.

2) The utilization of the volume of the battery pack is significantly improved, and therefore the volume energy density of the battery pack is increased. As described above, with the supporting function provided by the cell itself, the use of auxiliary support members and fixing members can be reduced, so that the battery pack with the same volume can accommodate more cells, thereby improving the volume utilization and energy density of the battery pack. Because the space reserved in the vehicle for mounting the battery pack is limited, the battery pack of this application can effectively prolong the battery life of the vehicle.

3) The stability and reliability of the battery pack are increased. A more complex battery pack assembly process indicates a higher defect rate, and indicates an increase in the possibility of loosening and unstable mounting of the battery pack, adversely affecting the quality of the battery pack and reducing the stability and reliability of the battery pack. In this application, cells are assembled to form the battery pack, and because the assembly process becomes simpler, the stability and reliability of the battery pack are improved, and accordingly the defect rate of the battery pack is lowered.

Based on the significant technical effect brought by long cells, to enable the cell to support itself, the support strength of the housing may be increased by making improvements in terms of the forming process and the structural design, and the length-width ratio of the housing is controlled in a predetermined range. In addition, the internal resistance of the cell may be reduced by means such as optimizing the current collection path. Moreover, the liquid injection process may also be improved to solve the problem of long liquid injection time caused by long cell dimension.

The casing may include a casing body and a cover plate sealing the casing body. The casing body is made of aluminum or steel.

The casing body may be a polyhedron having an opening. The cover plate is correspondingly configured to close the opening. In a specific implementation, the number of openings may be one or more, and correspondingly, the number of cover plates may also be one or more.

It should be noted that the supporting region may be a partial region of an outer surface of the casing body or the cover plate, or may be any combination of an outer surface of the casing body, an outer surface of the cover plate, a partial region of an outer surface of the casing body, and a partial region of an outer surface of the cover plate, as long as the supporting region can be connected to the support member 4.

In practice, the supporting region may be disposed at two ends of the cell 100 along the first dimension, so that the the cell 100 may be supported by the support member 4 along the first dimension.

It is found that the first dimension of the cell 100 may be designed to be 600 mm-2500 mm. Because the cell 100 is long enough, the cell 100 can be directly supported by the support member 4. By forming a plurality of cells 100 into a module, the cells 100 themselves can provide a supporting function, and replace the reinforcing structure to ensure the structural strength of the battery pack 200. In this way, the use of transverse beams 500 and/or longitudinal beams 600 in the battery pack 200 can be reduced, or even the use of transverse beams 500 and/or longitudinal beams 600 in the battery pack 200 can be avoided, so that the space occupied by transverse beams 500 and/or longitudinal beams 600 in the battery pack 200 can be reduced, thereby improving the utilization of the space inside the battery pack 200, and allowing as many cells 100 as possible to be disposed in the battery pack 200. In this way, the capacity, the voltage, and the battery life of the entire battery pack can be improved. For example, in an electric vehicle, such a design can improve the space utilization from about 40% to 60% or even higher, for example, 80%. It is found through multiple experiments that if the cell 100 is designed as a pouch cell, that is, the housing of the cell is an aluminum-plastic composite film and the aluminum-plastic composite film is used to support the cell, the aluminum-plastic composite film of the cell may be worn out, and the pouch cell in the battery pack is prone to displacement, which accelerates the wear of the cell. Along with the wear of the aluminum-plastic composite film, the cell 100 fails, resulting in a short battery life of the battery pack. In addition, the heat dissipation performance of the pouch cell is poor, and after the pouch cells are designed into the dimension described in this application and arranged in the battery pack, the heat dissipation performance of the entire pouch cell is poor. Therefore, in this application, the cell 100 includes a casing, a cover plate, and a core located inside a space formed by the casing and the cover plate. In other words, the cell is a hard-case cell. When the first dimension of the cell is 600 mm-2500 mm, a supporting region is formed on the casing and/or the cover plate, and the support member 4 is connected to the supporting region to support the cell. Herein, that the support member 4 is connected to the supporting region may be that the support member 4 is in direct contact with the supporting region, or may be that the support member 4 is in indirect contact or connection with the supporting region through another component, which may be set depending on usage scenarios and is not limited in this application.

In addition, because no transverse beam or longitudinal beam needs to be disposed in the battery pack 200, one one hand, the fabrication process of the battery pack 200 is simplified, the assembly complexity of the cell 100 is reduced, and the production costs are reduced; on the other hand, the weight of the entire battery pack 200 is reduced, thereby achieving a lightweight battery pack. Particularly, when the battery pack is mounted on an electric vehicle, the battery life of the electric vehicle can also be improved, and the weight of the electric vehicle can be reduced.

In some embodiments of the present disclosure, the first dimension meets 600 mm≤first dimension≤1500 mm. In some embodiments of the present disclosure, the first dimension meets 600 mm≤first dimension≤1000 mm. The cell 100 having such a length is long enough to be supported by the support member 4, and the cell 100 having such a length is not too long. When used in the battery pack 200, the rigidity of the cell 100 is large enough.

In this application, the specific form of the battery pack is not particularly limited. as long as the battery pack includes the support member 4, the cell array 3 is located on the support member 4, and the cells 100 are supported on the support member 4. The specific structure of the support member 4 is not limited in this application, as long as the cells 100 can be supported on the support member 4. The specific structure of the support member 4 will be described below. The cells 100 are supported on the support member 4. The cells 100 may be directly supported on the support member 4, that is, respectively disposed on the support member 4, or fixed on the support member 4. The specific fixing manner will be described in detail below. The specific supporting and fixing manners are not limited in this application.

The support member 4 is used for supporting the cell array 3. The support member 4 is usually of a rigid structure. The support member 4 may be an independently fabricated tray or a rigid supporting structure formed on the chassis of the vehicle, and can be easily mounted on the vehicle or another apparatus.

It should be noted that the cells 100 may support itself through the connection between the local supporting region and the support member 4. However, in some application scenarios, for example, when the support member 4 is a vehicle chassis, the entire side where the supporting region of the cell 100 is located may be in contact with the vehicle chassis. In this case, the above inventive concept of this application may be achieved by locally reinforcing the part of the vehicle chassis corresponding to the supporting region, and the region of the vehicle chassis corresponding to the non-supporting region of the cell 100 may be weakened, or even partially removed.

When the housing of the cell 100 is made of a metal material, the metal housing of the cell 100 has a better heat-conducting property, so that the heat dissipation efficiency of the cell 100 can be improved, thereby improving the heat dissipation effect.

In some embodiments, the cell 100 has a second dimension. The cell has a second dimension, which is a minimum spacing between two imaginary parallel planes sandwiching the cell, a normal of the two parallel planes corresponding to the second dimension is a P direction, and a plurality of cells are arranged along the P direction of the at least one cell.

It should be noted that for a certain cell 100, there may be multiple sets of parallel planes, each set of parallel planes includes two parallel planes, the two parallel planes in each set can imaginarily sandwich the cell 100, a distance exists between the two parallel planes in each set, and the second dimension is a minimum value of such distances.

As shown in FIG. 28, the second dimension may be defined with reference to Feret diameter. The Feret diameter is a measure of an object dimension along a specified direction. In general, the measurement method is defined as the distance between the two parallel planes restricting the object perpendicular to the specified direction.

When the cell 100 is a special-shaped cell, the second dimension may be construed as follows: there are multiple pairs of parallel planes tangent to the contour edge of the cell 100, and when a spacing between one pair of parallel planes is less than spacings between the other pairs of parallel planes, the smallest spacing may be defined as the second dimension.

A normal of the two parallel planes corresponding to the second dimension is a P direction, and a plurality of cells are arranged along the P direction of any cell in the cell array 3.

At least one of the cells meets: 23≤first dimension/second dimension≤208. In an embodiment of this application, 50≤first dimension/second dimension≤70. It is found through a large number of experiments that for the cell 100 that meets the above dimension requirement, the cell 100 can have a small thickness along the second dimension while providing rigidity that meets the supporting requirement, so that the cell 100 has a high heat dissipation capability.

In some embodiments, the cell 100 has a volume V, and The cell body of at least one of the cells 100 meets: 0.0005 mm$^{-2}$≤L/V≤0.002 mm$^{-2}$. The volume V of the cell may be obtained by the water displacement method: that is, the cell is put into a container which is full of water, and the volume of water displaced from the container is equal to the volume of the cell. It is found through a large number of experiments that when the cell 100 meets the above limitations, the cross-section of the cell 100 is small, and the cell 100 has a good heat dissipation effect, so that the temperature difference between the inside and outside of the cell 100 is small.

In another implementation provided in this application, a ratio of the surface area S to the volume V of the cell body of the cell 100 is 0.1 mm$^{-1}$≤S/V≤0.35 mm$^{-1}$. This ratio may be achieved by the above long and thin cell 100 or through dimension adjustment. By controlling the ratio of the surface area S to the volume V of the cell 100, a sufficient heat dissipation area is provided while ensuring that the length of the cell 100 extends along the Y direction, thereby ensuring the heat dissipation effect of the cell 100.

It should be noted that the surface area of the cell is the sum of the areas of all surfaces of the cell.

In an implementation of this application, the at least one cell 100 has a first end and a second end along the first dimension, at least one of the first end and the second end has an electrode terminal configured to output a current inside the cell 100, and electrode terminals of cells 100 are electrically connected to each other through a connecting member.

Figure 2:
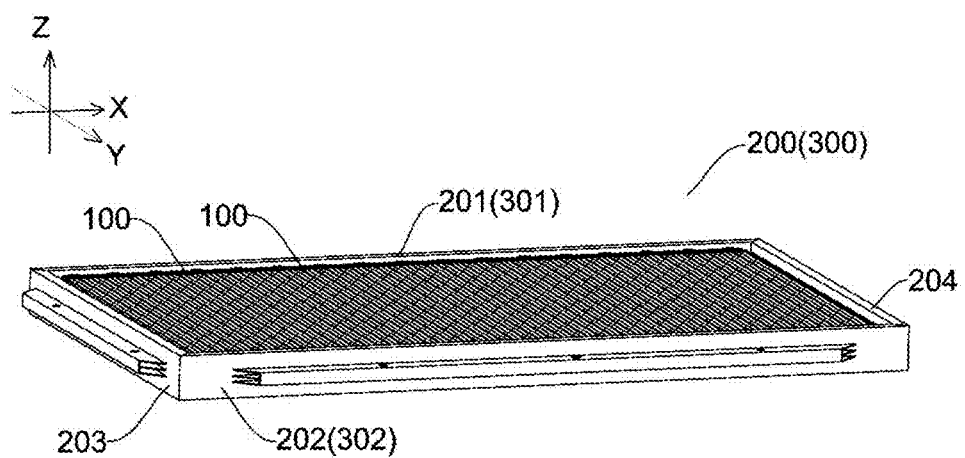
FIG. 2 is a schematic three-dimensional structural diagram of a battery pack according to an implementation of this application.
Figure 3:
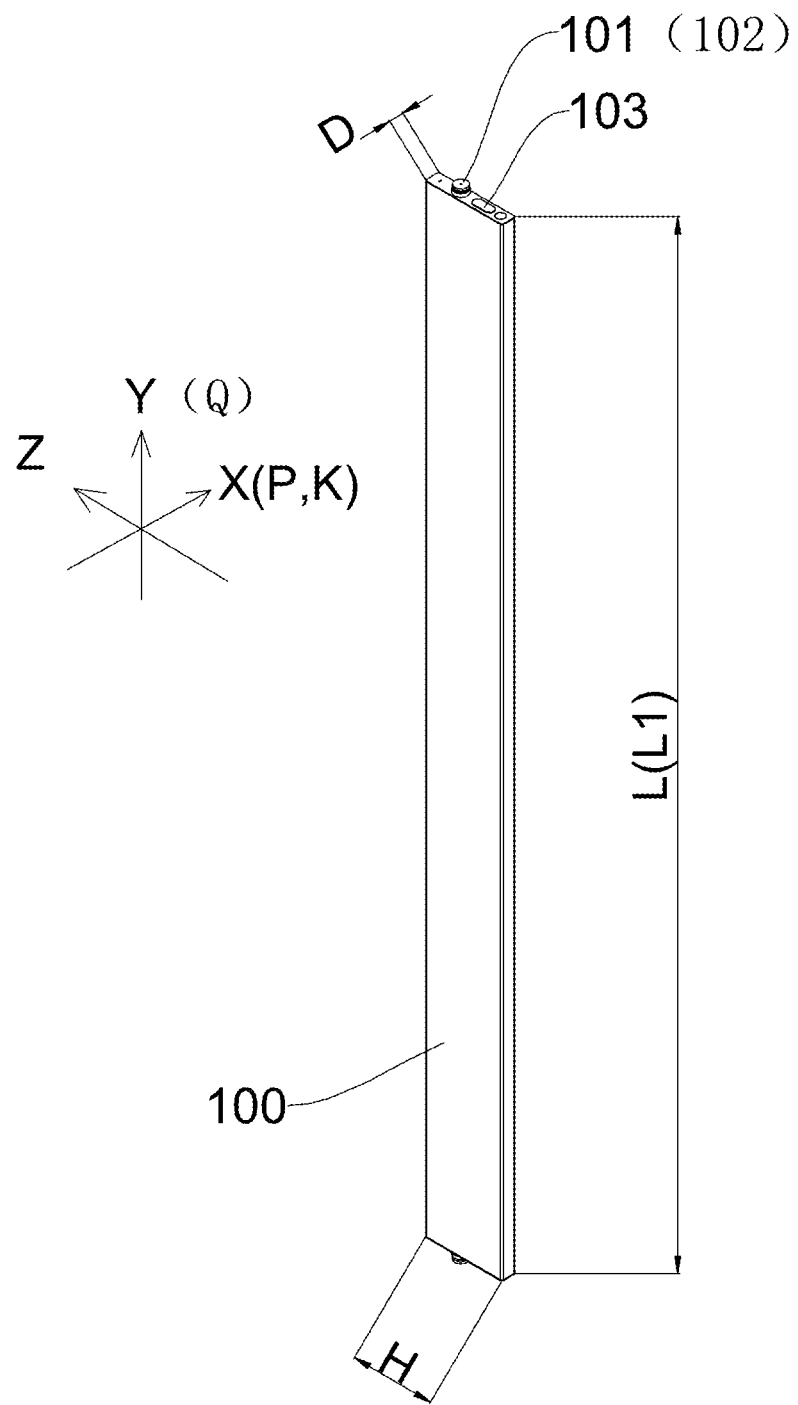
FIG. 3 is a schematic three-dimensional structural diagram of a cell according to an implementation of this application.
Figure 4:
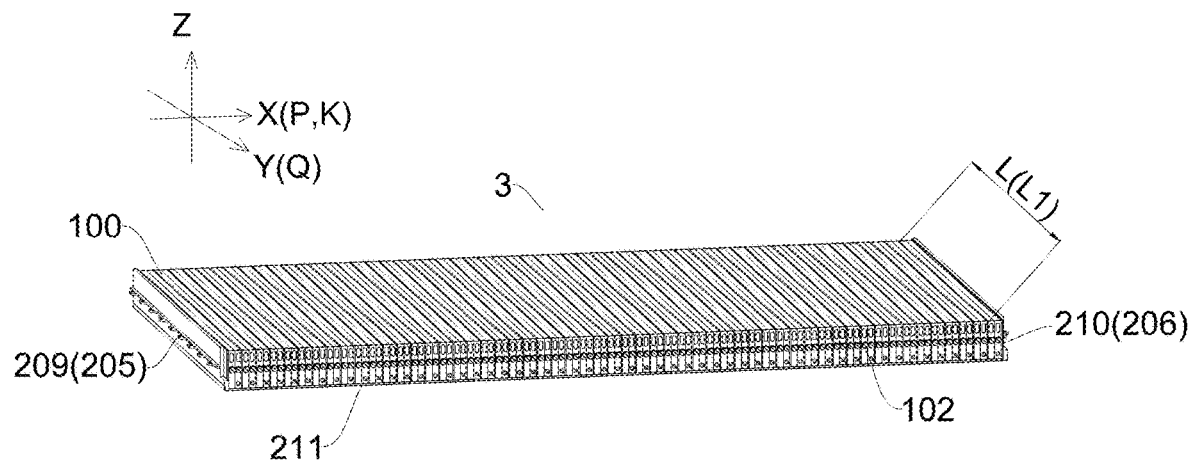
FIG. 4 is a schematic diagram showing an arrangement of a plurality of cells in a battery pack according to an implementation of this application.

Herein, the "first end" and the "second end" of the cell 100 are used for describing the orientation of the cell 100, and are not intended to limit or describe the specific structure of the cell 100. For example, the "first end" and the "second end" of the cell 100 are not intended to limit or describe positive and negative electrodes of the cell 100. In an implementation of the cell 100, as shown in FIG. 2 to FIG. 4, a first electrode terminal 101 of the cell 100 extends out from the first end of the cell 100, and a second electrode terminal 102 of the cell 100 extends out from the second end of the cell 100. In other words, the first dimension direction of the cell 100 may be the direction of a current inside the cell 100, that is, the current direction inside the cell 100 is the first dimension direction. In this way, because the current direction is the same as the first dimension direction of the cell 100, the cell 100 has a larger effective heat dissipation area and a higher heat dissipation efficiency. Herein, the first electrode terminal 101 is a positive electrode of the cell 100, and the second electrode terminal 102 is a negative electrode of the cell 100; or the first electrode terminal 101 is the negative electrode of the cell 100, and the second electrode terminal 102 is the positive electrode of the cell 100. Electrode terminals of cells 100 are connected in series or in parallel to each other through a connecting member.

Figure 12:
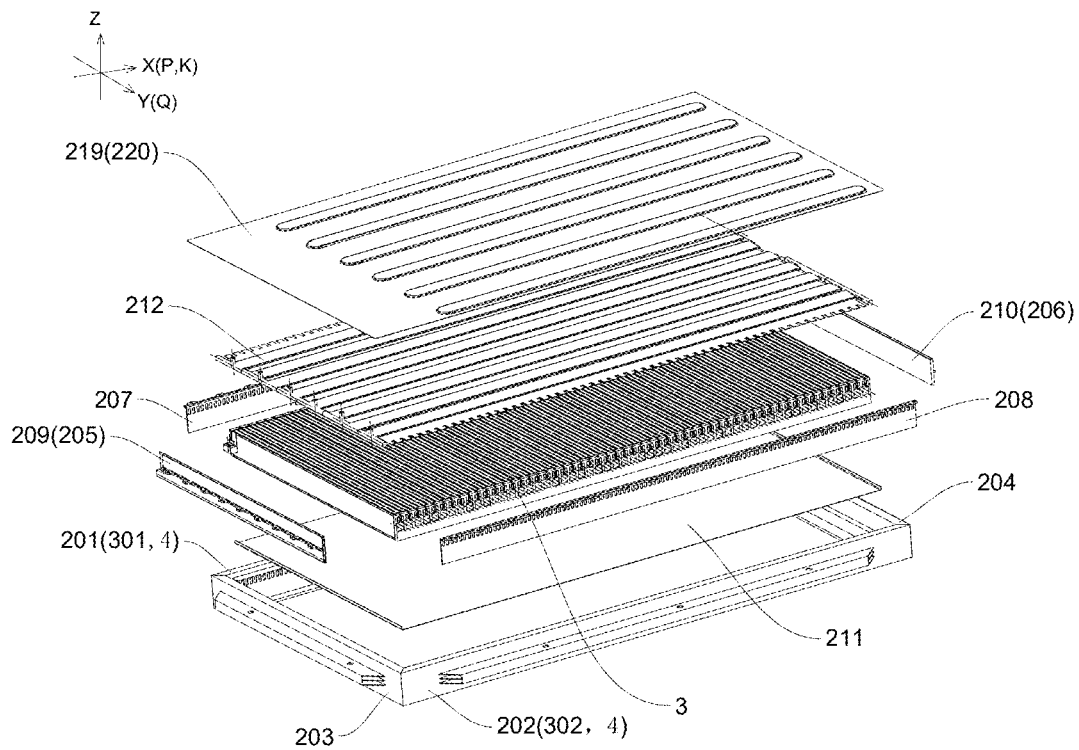
FIG. 12 is an exploded view of a battery pack according to an implementation of this application.

The battery pack further includes two side plate components disposed opposite to each other on two sides of the cell array 3 and configured to sandwich the cell array 3. The side plate components sandwiching the cell array 3 provide a function of limiting expansive deformation of the plurality of cells 100, thereby ensuring starting of an explosion-proof valve 103 and a current interrupt device (CID). Specifically, in some embodiments, as shown in FIG. 4, the side plate components may be a third side beam 203 and a fourth side beam 204; in some other embodiments, as shown in FIG. 12, the side plate components may be a first side plate 209 and a second side plate 210.

In some embodiments, as shown in FIG. 3 and FIG. 20-FIG. 24, the normal of the two parallel planes corresponding to the first dimension is a Q direction, the battery pack includes a tray for use with a vehicle, the tray includes a first side beam 201 and a second side beam 202 disposed opposite to each other along the Q direction, the support member 4 is the first side beam 201 and the second side beam 202, and two ends of the cell 100 are respectively supported by the first side beam 201 and the second side beam 202.

In some other embodiments, the support member 4 is a plurality of bottom beams, and the bottom beams are located below the cell array 3. The bottom beams are used for supporting the cell array 3. Upper surfaces of the bottom beams may be planes so as to support the cell array 3 in a surface-to-surface manner. In practice, the bottom beam has a rectangular cross-section. There may be a plurality of bottom beams, and the plurality of bottom beams may be disposed in parallel at intervals or disposed crossing each other. The cell array 3 may be fixed to the bottom beams by means such as gluing or threaded connecting members, the battery pack further includes a sealing cover, and the sealing cover and the bottom beams form an accommodating cavity for accommodating the cell array 3. The sealing cover is used for preventing intrusion of dust, water, and the like.

Figure 25:
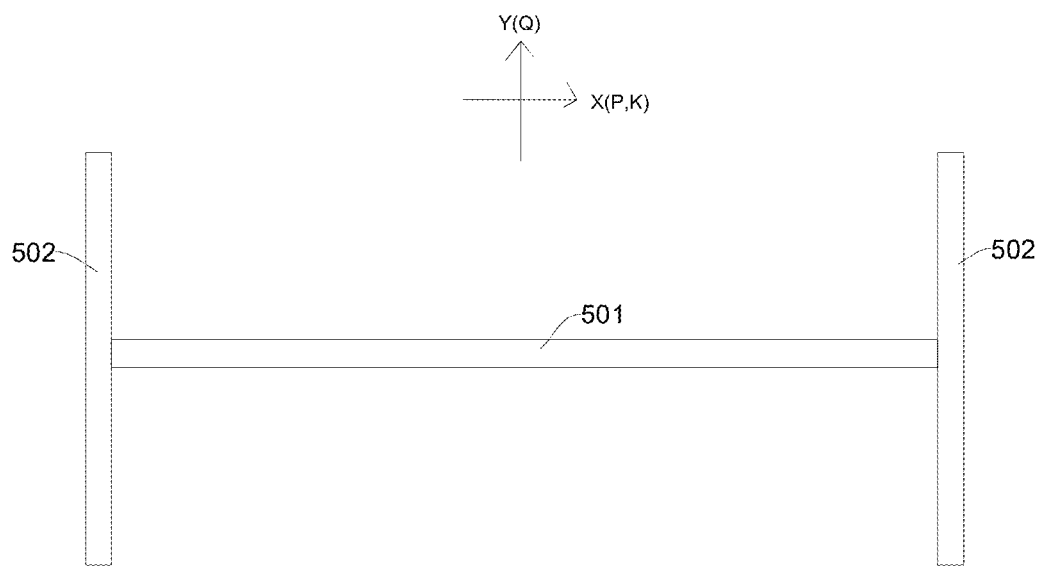
FIG. 25 is a three-dimensional diagram of a bottom beam according to an implementation of this application.

As shown in FIG. 25, the normal of the two parallel planes corresponding to the first dimension is the Q direction, the bottom beams include a first beam 501 and a second beam 502 located on and intersecting the first beam 501, an angle between an extension direction of the first beam 501 and the Q direction is 60-90°, and the cell 100 is supported by the first beam 501. In the embodiment shown in FIG. 25, the first beam 501 is perpendicularly connected to the second beam 502. The connection between the first beam 501 and the second beam 502 may be achieved by means such as, but not limited to, a threaded connecting member or welding. The first beam 501 and the second beam 502 may both be straight beams.

In practice, there are two second beams 502, the two second beams 502 are respectively located at two ends of the first beam 501 and are respectively perpendicular to the first beam 501, and the cell 100 is supported by the first beam 501. The second beam 502 protrudes upward (Z direction) relative to the first beam 501, for example, a lower surface of the second beam 502 may be connected to an upper surface of the first beam 501. During the arrangement of the cells 100, the outermost two cells 100 may respectively lean against side surfaces of two second beams 502 which face toward each other. A center of the cell 100 is located on the first beam 501. A length direction of the cell 100 is perpendicular to a length direction of the first beam 501. By aligning the center of the cell 100 with the first beam 501, the supporting of the cell 100 by using a single beam can be achieved. Certainly, in other embodiments, there may also be a plurality of first beams 501, and the plurality of first beams 501 are parallel to and spaced apart from each other along a second direction.

In other implementations, the normal of the two parallel planes corresponding to the first dimension is the Q direction, the bottom beams may be a plurality of rectangular beams parallel to and spaced apart from each other, an angle between an extension direction of the rectangular beam and the Q direction is 60-90°, and the cell 100 is supported by the rectangular beam. The rectangular beam may be evenly distributed along the Q direction, the extension direction of the rectangular beam is perpendicular to the Y direction, and the cell 100 is located on the evenly distributed rectangular beam.

Figure 16:
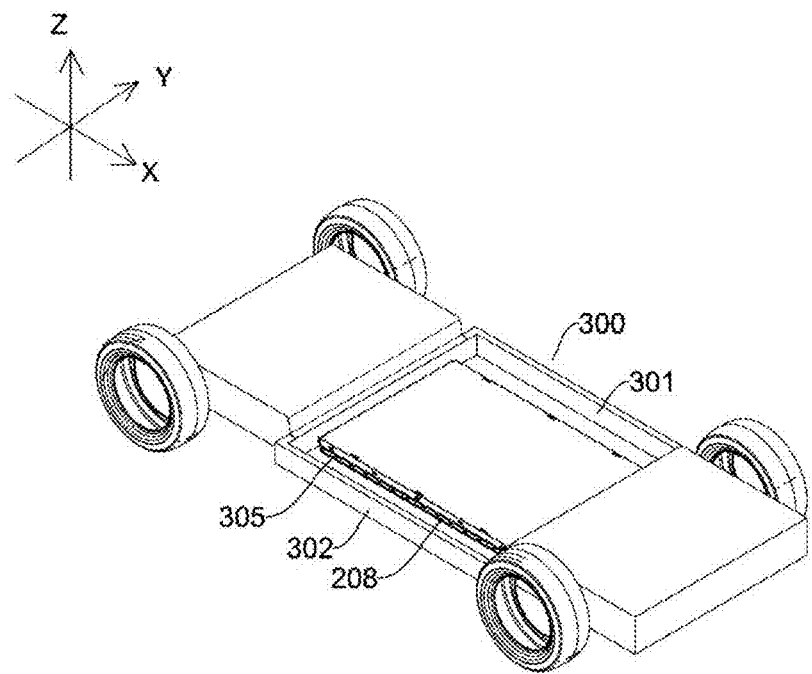
FIG. 16 is a schematic three-dimensional structural diagram of a battery pack (cavity) formed on an electric vehicle according to an implementation of this application.
Figure 17:
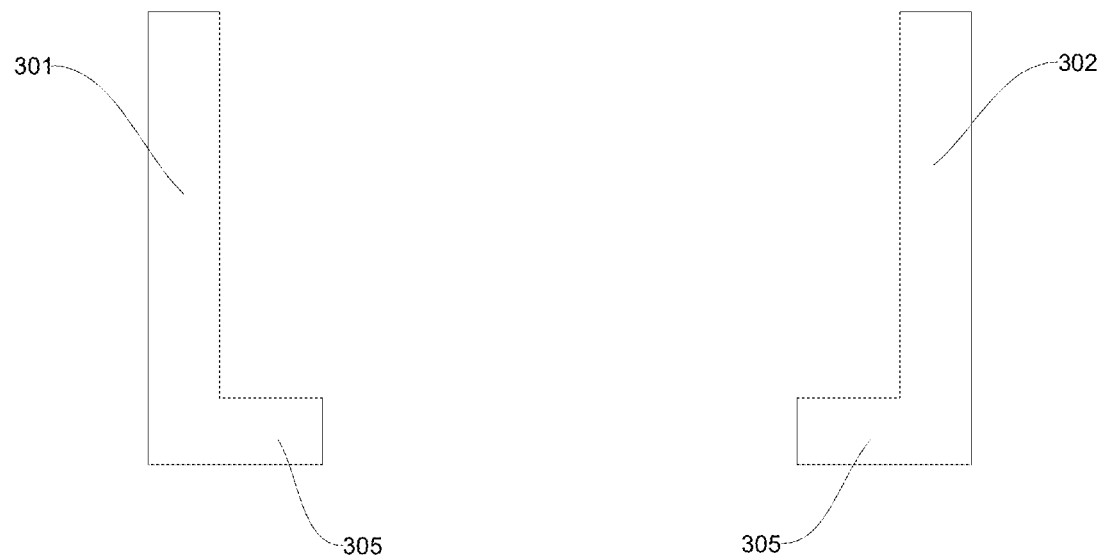
FIG. 17 is a cross-sectional view of a cavity according to an implementation of this application.

Certainly, the shape of the bottom beam includes, but is not limited to, straight and rectangular, and may also be triangular, trapezoidal, or any other special shape. In another implementation provided in this application, as shown in FIG. 16, the support member 4 is a vehicle chassis, and the cell array 3 is located on the vehicle chassis. The battery pack 200 may be directly formed on an electric vehicle. In other words, the battery pack 200 is an apparatus configured for mounting the cell 100 and formed at any suitable position on the electric vehicle. For example, the battery pack 200 may be directly formed on the chassis of the electric vehicle.

In some embodiments, the vehicle chassis is provided with a cavity 300 recessed downward, to facilitate the assembly of the cell 100.

In a specific implementation provided in this application, the cavity 300 may include a first side wall 301 and a second side wall 302 disposed opposite to each other. The first side wall 301 may extend downward from the chassis of the electric vehicle to obtain an extension portion of the first side wall 301, and the second side wall 302 may extend downward from the chassis of the electric vehicle to obtain an extension portion of the first side wall 302. In this way, as an implementation, the first end of the cell 100 may be supported by the extension portion of the first side wall 301, and the second end of the cell 100 may be supported by the extension portion of the second side wall 302. Accordingly, this application further provides an electric vehicle allowing for arranging cells 100 according to the above technical solution, where a cavity 300 having the same features as a separate tray for use with a vehicle is formed on the electric vehicle, thus forming the battery pack 200 provided by this application.

In some embodiments, as shown in FIG. 2, the normal of the two parallel planes corresponding to the first dimension is the Q direction, a cell placement region is formed in the battery pack 200, the cell array 3 is located in the cell placement region, the battery pack 200 includes one cell array 3, and the cells 100 extend from one side of the cell placement region to the other side of the cell placement region along the Q direction. The battery pack accommodates only one cell in the Q direction.

In some embodiments, the cell has a second dimension, which is a minimum spacing between two imaginary parallel planes sandwiching the cell, a normal of the two parallel planes corresponding to the second dimension is a P direction, and a cell placement region is formed in the battery pack 200, the cell array 3 is located in the cell placement region, N cell arrays 3 along the P direction and M cell arrays 3 along the Q direction are disposed in the cell placement region, the cell arrays 3 are electrically connected to each other through connecting members between electrode terminals of cells, N is greater than or equal to 1, and M is greater than or equal to 1. An electrode terminal of the last cell of the $(N-1)^{th}$ cell array 3 is connected to an electrode terminal of the first cell of the $N^{th}$ cell array 3 through a connecting member, and N is greater than or equal to 1. In other words, in the battery pack, a plurality of cell arrays 3 may be disposed along the arrangement direction of the cells 100, that is, the battery pack 200 is provided therein with multiple columns of cell arrays 3.

Figure 21:
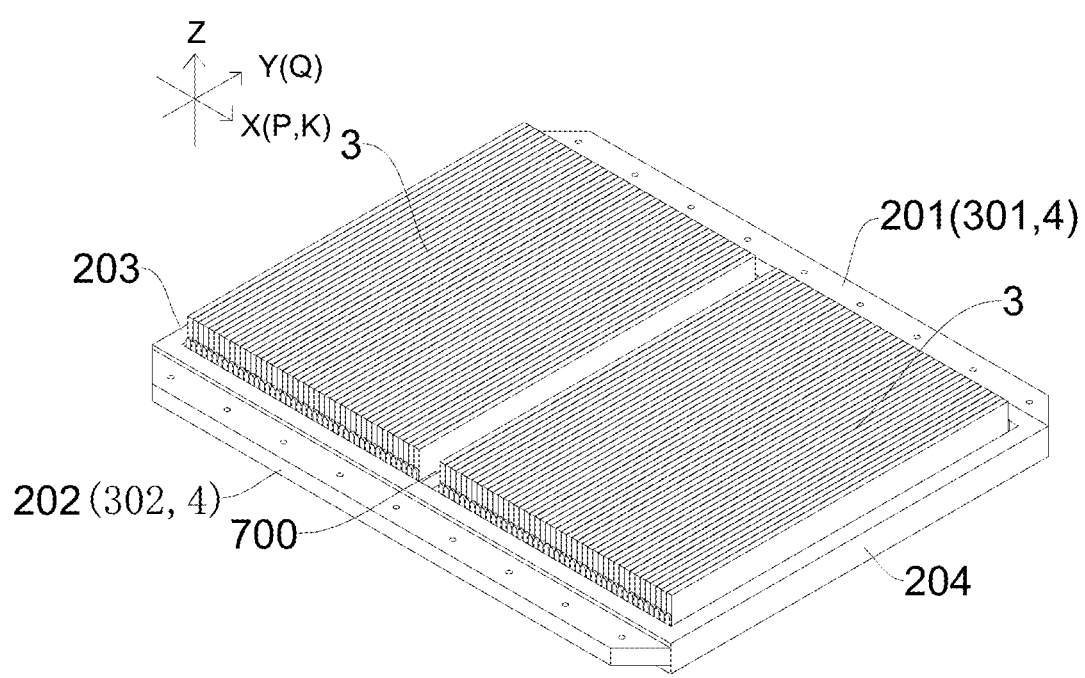
FIG. 21 is a three-dimensional diagram of a battery pack according to another implementation of this application.

Specifically, as shown in FIG. 21, the first partition plate 700 divides the shown cell array 3 along the P direction of the battery pack 200 into two cell arrays 3. The last cell 100 of one cell array 3 is connected to the first cell of the other cell array 3 through a connecting member.

According to the battery pack 200 provided by this application, a cell placement region is formed in the battery pack, the cell array 3 is located in the cell placement region, M cell arrays 3 along the Q direction are disposed in the cell placement region, the cell arrays 3 are electrically connected to each other through connecting members between electrode terminals of cells, and M is greater than or equal to 1. An electrode terminal of the last cell of the $(M-1)^{th}$ cell array 3 is connected to an electrode terminal of the first cell of the $M^{th}$ cell array 3 through a connecting member, and M is greater than or equal to 1. In other words, in the extension direction of the cell 100, a plurality of cells 100 may be accommodated, that is, the battery pack 200 is provided therein with multiple rows of cell arrays 3.

Figure 20:
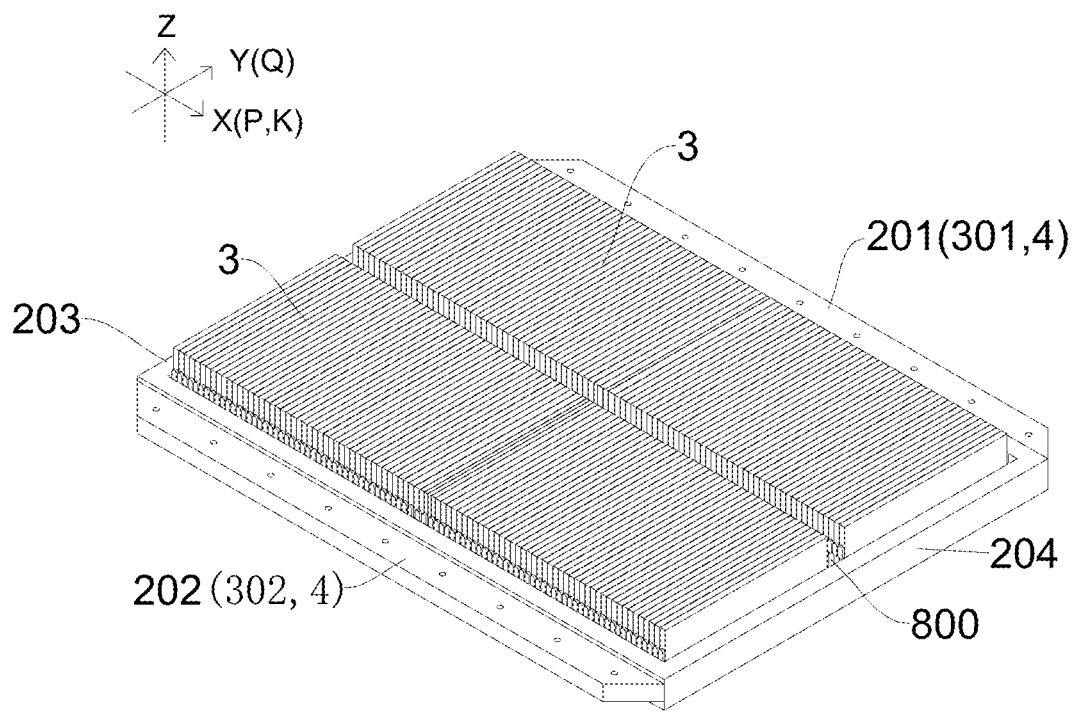
FIG. 20 is a three-dimensional diagram of a battery pack according to an implementation of this application.

Specifically, as shown in FIG. 20, the second partition plate 800 divides the cell array 3 along the Q direction of the battery pack 2000 into two cell arrays 3. The last cell 100 of one cell array 3 is connected to the first cell of the other cell array 3 through a connecting member.

According to the battery pack 200 provided by this application, a cell placement region is formed in the battery pack, the cell array 3 is located in the cell placement region, N cell arrays 3 along the P direction and M cell arrays 3 along the Q direction are disposed in the cell placement region, the cell arrays 3 are electrically connected to each other through connecting members between electrode terminals of cells, N is greater than or equal to 1, and M is greater than or equal to 1. In other words, in the P direction of the battery pack, the cell placement region is divided into a plurality of battery placement subregions, and in the extension direction of the cell 100, i.e., the Q direction, a plurality of cells 100 may be accommodated. That is, the battery pack 200 is provided therein with multiple rows and multiple columns of cell arrays 3.

Figure 22:
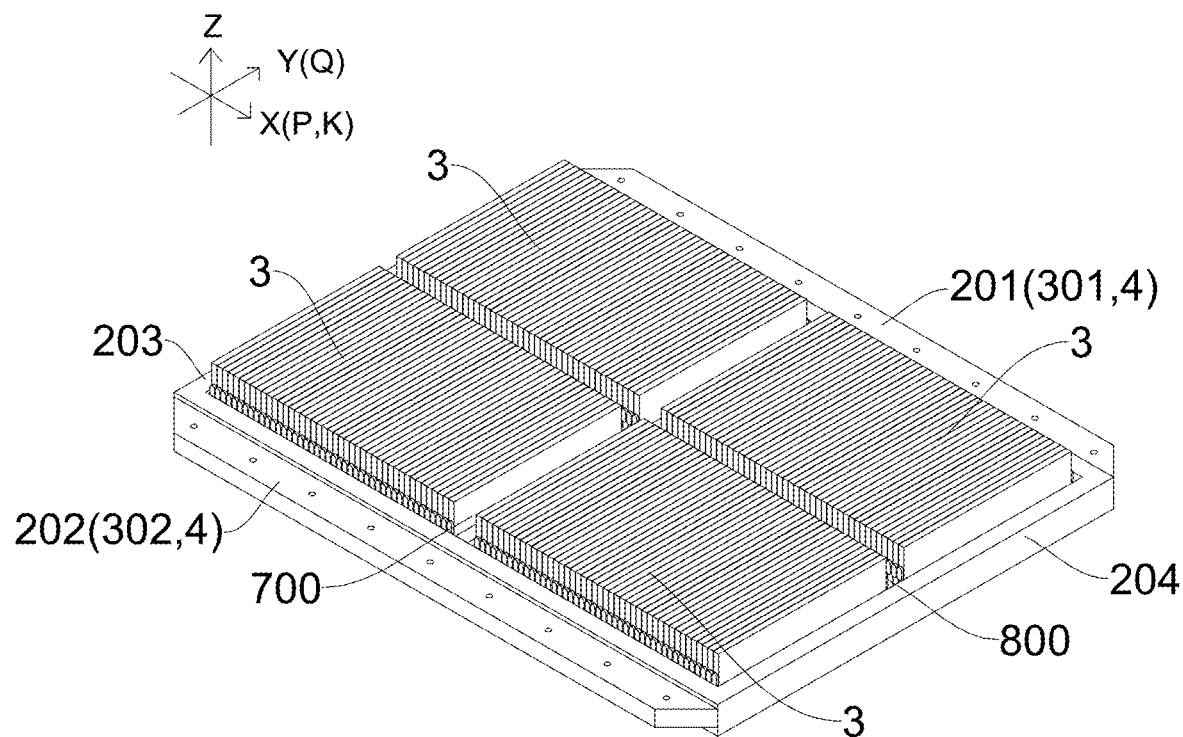
FIG. 22 is a three-dimensional diagram of a battery pack according to still another implementation of this application.

Specifically, as shown in FIG. 22, a first partition plate 700 and a second partition plate 800 are disposed in the battery pack 200, and the first partition plate 700 and the second partition plate 800 divide a plurality of cells into two rows and two columns of cell arrays 3. Any two of the cell arrays 3 are connected to each other through connecting members between electrode terminals.

In the foregoing description, the first partition plate 700 and the second partition plate 800 may be reinforcing ribs, or may be heat insulation foam or other mechanical member, which is not limited in this application.

The quantity of cells 100 in the cell array 3 is not particularly limited in this application, and depending on different vehicle types and different power requirements, different numbers of cells 100 may be arranged. In some specific examples of this application, the quantity of cells in the cell array 3 is 60-200. In some other specific examples of this application, the quantity of cells in the cell array 3 is 80-150.

It should be noted that the quantity of cells 100 in the cell array of this application is not limited, and for example, may be 2. The battery pack of this application may include one cell array described above, or may include a plurality of cell arrays. The cell arrays may be the same or different. In addition to the above-mentioned cell array, the battery pack may include other types of cells, for example, smaller cells disposed according to the space inside the battery pack, and the specific placement of such other types of cells is not limited by the cell array of the present invention.

As shown in FIG. 2 to FIG. 25, according to another aspect of this application, a battery pack 200 is provided, including a cell array 3 and a support member 4.

The cell array 3 includes a plurality of cells 100, the cell 100 has a dimension A, and the dimension A is a length of a minimum enclosing rectangle of the cell 100. At least one of the cells 100 meets: 600 mm≤dimension A≤2500 mm.

The minimum enclosing rectangle is introduced for the ease of understanding the dimension A, and does not physically exist in the solutions of this application.

Specifically, the minimum enclosing rectangle may be construed as follows: for the cell 100, assuming there is a cuboid housing and inner walls of six sides of the cuboid housing abut against the outer contour of the cell, the housing of the cuboid housing is the minimum enclosing rectangle. The dimension A is a length of the minimum enclosing rectangle. Certainly, for a cuboid, its length>height>width.

The cell 100 may be of various shapes, for example, may be of a regular geometry or of an irregular geometry. For example, the cell may be square, round, polygonal, triangular, or of any other shape. For example, the cell is a special-shaped cell. It may be understood that the shape of the cell is not limited in this application.

The cell 100 includes a casing and a core located inside the casing. A supporting region is formed on the casing, and The support member 4 is connected to the supporting region to support the cell 100. The casing may include a casing body and a cover plate sealing the casing body. The casing body is made of aluminum or steel.

It should be noted that the supporting region may be an outer surface of the casing body or the cover plate, or may be a partial region of an outer surface of the casing body or the cover plate, or may be any combination of an outer surface of the casing body, an outer surface of the cover plate, a partial region of an outer surface of the casing body, and a partial region of an outer surface of the cover plate, as long as the supporting region can be connected to the support member 4 to support the cell 100.

In practice, the supporting region may be disposed at two ends of the cell 100 along the dimension A, so that the the cell 100 may be supported by the support member 4 along the dimension A.

It is found that the dimension A of the cell 100 may be designed to be 600 mm-2500 mm. Because the cell 100 is long enough, the cell 100 can be directly supported by the support member 4. By forming a plurality of cells 100 into a module, the cells 100 themselves can provide a supporting function, and replace the reinforcing structure to ensure the structural strength of the battery pack 200. In this way, the use of transverse beams 500 and/or longitudinal beams 600 in the battery pack 200 can be reduced, or even the use of transverse beams 500 and/or longitudinal beams 600 in the battery pack 200 can be avoided, so that the space occupied by transverse beams 500 and/or longitudinal beams 600 in the battery pack 200 can be reduced, thereby improving the utilization of the space inside the battery pack 200, and allowing as many cells 100 as possible to be disposed in the battery pack 200. In this way, the capacity, the voltage, and the battery life of the entire battery pack can be improved. For example, in an electric vehicle, such a design can improve the space utilization from about 40% to 60% or even higher, for example, 80%. It is found through multiple experiments that if the cell 100 is designed as a pouch cell, that is, the housing of the cell is an aluminum-plastic composite film and the aluminum-plastic composite film is used to support the cell, the aluminum-plastic composite film of the cell may be worn out, and the pouch cell in the battery pack is prone to displacement, which accelerates the wear of the cell. Along with the wear of the aluminum-plastic composite film, the cell 100 fails, resulting in a short battery life of the battery pack. In addition, the heat dissipation performance of the pouch cell is poor, and after the pouch cells are designed into the dimension described in this application and arranged in the battery pack, the heat dissipation performance of the entire pouch cell is poor. Therefore, in this application, the cell 100 includes a casing, a cover plate, and a core located inside a space formed by the casing and the cover plate. In other words, the cell is a hard-case cell. When the dimension A of the cell is 600 mm-2500 mm, a supporting region is formed on the casing and/or the cover plate, and the support member 4 is connected to the supporting region to support the cell. Herein, that the support member 4 is connected to the supporting region may be that the support member 4 is in direct contact with the supporting region, or may be that the support member 4 is in indirect contact or connection with the supporting region through another component, which may be set depending on usage scenarios and is not limited in this application.

In addition, because no transverse beam and/or longitudinal beam needs to be disposed in the battery pack 200, one one hand, the fabrication process of the battery pack 200 is simplified, the assembly complexity of the cell 100 is reduced, and the production costs are reduced; In another case, the weight of the entire battery pack 200 is reduced, thereby achieving a lightweight battery pack. Particularly, when the battery pack is mounted on an electric vehicle, the battery life of the electric vehicle can also be improved, and the weight of the electric vehicle can be reduced.

In some embodiments, 600 mm≤dimension A≤1500 mm, for example, 600 mm≤dimension A≤1000 mm. The cell 100 having such a length is long enough to be supported by the support member 4, and the cell 100 having such a length is not too long. When used in the battery pack 200, the rigidity of the cell 100 is large enough.

In this application, the specific form of the battery pack is not particularly limited, as long as the battery pack includes the support member 4, the cell array 3 is located on the support member 4, the cells 100 are supported by the support member 4. The specific structure of the support member 4 is not limited in this application, as long as the cells 100 can be supported by the support member 4. The specific structure of the support member 4 will be described below. The cells 100 are supported by the support member 4. The cells 100 may be directly supported by the support member 4, that is, respectively disposed on the support member 4, or fixed on the support member 4. The specific fixing manner will be described in detail below. The specific supporting and fixing manners are not limited in this application.

The support member 4 is used for supporting the cell array 3. The support member 4 is usually of a rigid structure. The support member 4 may be an independently fabricated tray or a rigid supporting structure formed on the chassis of the vehicle, and can be easily mounted on the vehicle or another apparatus.

When the housing of the cell 100 is made of a metal material, the metal housing of the cell 100 has a better heat-conducting property, so that the heat dissipation efficiency of the cell 100 can be improved, thereby improving the heat dissipation effect.

In some embodiments, the plurality of cells are arranged along a direction K, and the direction K is a width direction of a minimum enclosing rectangle of the at least one cell in the cell array 3.

The cell 100 has a dimension B, the cell has a dimension B, which is a width of a minimum enclosing rectangle of the cell, the normal of the two parallel planes corresponding to the dimension B is the direction K, and a plurality of cells are arranged along the K direction of the at least one cell.

At least one of the cells meets: 10≤dimension A/dimension B≤208. In some embodiments, at least one of the cells meets: 23≤dimension A/dimension B≤208. In an embodiment of this application, 50≤dimension A/dimension B≤70. It is found through a large number of experiments that for the cell 100 that meets the above dimension requirement, the cell 100 can have a small thickness along the dimension B while providing rigidity that meets the supporting requirement, so that the cell 100 has a high heat dissipation capability.

In some embodiments, the plurality of cells 100 are arranged along a direction K, and the direction K is a height direction of a minimum enclosing rectangle of the at least one cell 100 in the cell array 3. The cell 100 has a dimension C, which is a height of a minimum enclosing rectangle of the cell 100.

At least one of the cells 100 meets: 10≤dimension A/dimension C≤208, for example, 23≤dimension A/dimension C≤208, for example, 50≤dimension A/dimension C≤70. It is found through a large number of experiments that for the cell 100 that meets the above dimension requirement, the cell 100 can have a small thickness along the dimension C while providing rigidity that meets the supporting requirement, so that the cell 100 has a high heat dissipation capability.

The battery pack 200 further includes two side plate components disposed opposite to each other on two sides of the cell array 3 and configured to sandwich the cell array 3. The side plate components sandwiching the cell array 3 provide a function of limiting expansive deformation of the plurality of cells 100, thereby ensuring starting of an explosion-proof valve 103 and a current interrupt device (CID). Specifically, in some embodiments, as shown in FIG. 4, the side plate components may be a third side beam 203 and a fourth side beam 204; In some other embodiments, as shown in FIG. 12, the side plate components may be a first side plate 209 and a second side plate 210.

In some embodiments, as shown in FIG. 3 and FIG. 20-FIG. 24, the battery pack 200 includes a tray for use with a vehicle, the tray includes a first side beam 201 and a second side beam 202 disposed opposite to each other along a length direction of a minimum enclosing rectangle of the cell 100, the support member 4 is the first side beam 201 and the second side beam 202, and two ends of the cell 100 are respectively supported by the first side beam 201 and the second side beam 202.

In some other embodiments, the support member 4 is a plurality of bottom beams, and the bottom beams are located below the cell array 3. The bottom beams are used for supporting the cell array 3. Upper surfaces of the bottom beams may be planes so as to support the cell array 3 in a surface-to-surface manner. In practice, the bottom beam has a rectangular cross-section. There may be a plurality of bottom beams, and the plurality of bottom beams may be disposed in parallel at intervals or disposed crossing each other. The cell array 3 may be fixed to the bottom beams by means such as gluing or threaded connecting members, the battery pack further includes a sealing cover, and the sealing cover and the bottom beams form an accommodating cavity for accommodating the cell array 3. The sealing cover is used for preventing intrusion of dust, water, and the like.

As shown in FIG. 25, the bottom beams include a first beam 501 and a second beam 502 located on and intersecting the first beam 501, an angle between an extension direction of the first beam 501 and the length direction of the minimum enclosing rectangle of the cell is 60-90°, and the cell 100 is supported by the first beam 501. In the embodiment shown in FIG. 25, the first beam 501 is perpendicularly connected to the second beam 502. The connection between the first beam 501 and the second beam 502 may be achieved by means such as, but not limited to, a threaded connecting member or welding. The first beam 501 and the second beam 502 may both be straight beams.

In practice, there are two second beams 502, the two second beams 502 are respectively located at two ends of the first beam 501 and are respectively perpendicular to the first beam 501, and the cell 100 is supported by the first beam 501. The second beam 502 protrudes upward (Z direction) relative to the first beam 501, for example, a lower surface of the second beam 502 may be connected to an upper surface of the first beam 501. During the arrangement of the cells 100, the outermost two cells 100 may respectively lean against side surfaces of two second beams 502 which face toward each other. A center of the cell 100 is located on the first beam 501. A length direction of the cell 100 is perpendicular to a length direction of the first beam 501. By aligning the center of the cell 100 with the first beam 501, the supporting of the cell 100 by using a single beam can be achieved. Certainly, in other embodiments, there may also be a plurality of first beams 501, and the plurality of first beams 501 are parallel to and spaced apart from each other along a second direction.

Certainly, the shape of the bottom beam includes, but not limited to, straight and rectangular, and may also be triangular, trapezoidal, or any other special shape. In another implementation provided in this application, as shown in FIG. 16, the support member 4 is a vehicle chassis, and the cell array 3 is located on the vehicle chassis. The battery pack 200 may be directly formed on an electric vehicle. In other words, the battery pack 200 is an apparatus configured for mounting the cell 100 and formed at any suitable position on the electric vehicle. for example, the battery pack 200 may be directly formed on the chassis of the electric vehicle.

In some embodiments, the vehicle chassis is provided with a cavity 300 recessed downward, to facilitate the assembly of the cell 100.

In a specific implementation provided in this application, the cavity 300 may include a first side wall 301 and a second side wall 302 disposed opposite to each other. The first side wall 301 may extend downward from the chassis of the electric vehicle to obtain an extension portion of the first side wall 301, and the second side wall 302 may extend downward from the chassis of the electric vehicle to obtain an extension portion of the first side wall 302. In this way, as an implementation, the first end of the cell 100 may be supported by the extension portion of the first side wall 301, and the second end of the cell 100 may be supported by the extension portion of the second side wall 302. Accordingly, this application further provides an electric vehicle allowing for arranging cells 100 according to the above technical solution, where a cavity 300 having the same features as a separate tray for use with a vehicle is formed on the electric vehicle, thus forming the battery pack 200 provided by this application.

In some embodiments, as shown in FIG. 2, a cell placement region is formed in the battery pack 200, the cell array 3 is located in the cell placement region, the battery pack 200 includes one cell array 3, and the cells extend from one side of the cell placement region to the other side of the cell placement region along a length direction of a minimum enclosing rectangle of the cell 100. The battery pack 200 accommodates only one cell in the length direction of the minimum enclosing rectangle of the cell 100.

In some embodiments, a cell placement region is formed in the battery pack 200, the cell array 3 is located in the cell placement region, N cell arrays 3 along a width direction of the minimum enclosing rectangle of the cell are disposed in the cell placement region, the cell arrays 3 are electrically connected to each other through connecting members between electrode terminals of cells, and N is greater than or equal to 1.

M cell arrays 3 along a length direction of the minimum enclosing rectangle of the cell are disposed in the cell placement region, the cell arrays 3 are electrically connected to each other through connecting members between electrode terminals of cells, and M is greater than or equal to 1.

Specifically, as shown in FIG. 21, the first partition plate 700 divides the shown cell array 3 along the K direction of the battery pack 200 into two cell arrays 3. The last cell 100 of one cell array 3 is connected to the first cell of the other cell array 3 through a connecting member.

According to the battery pack 200 provided by this application, a cell placement region is formed in the battery pack, the cell array 3 is located in the cell placement region, M cell arrays 3 along the Q direction are disposed in the cell placement region, the cell arrays 3 are electrically connected to each other through connecting members between electrode terminals of cells, and M is greater than or equal to 1. An electrode terminal of the last cell of the $(M-1)^{th}$ cell array 3 is connected to an electrode terminal of the first cell of the $M^{th}$ cell array 3 through a connecting member, and M is greater than or equal to 1. In other words, in the extension direction of the cell 100, a plurality of cells 100 may be accommodated. That is, the battery pack 200 is provided therein with multiple rows of cell arrays 3.

Specifically, as shown in FIG. 20, the second partition plate 800 divides the cell array 3 along the Q direction of the battery pack 2000 into two cell arrays 3. The last cell 100 of one cell array 3 is connected to the first cell of the other cell array 3 through a connecting member.

According to the battery pack 200 provided by this application, a cell placement region is formed in the battery pack, the cell array 3 is located in the cell placement region, N cell arrays 3 along the K direction and M cell arrays 3 along the Q direction are disposed in the cell placement region, the cell arrays 3 are electrically connected to each other through connecting members between electrode terminals of cells, N is greater than or equal to 1, and M is greater than or equal to 1. In other words, in the K direction of the battery pack, the cell placement region is divided into a plurality of battery placement subregions, and in the extension direction of the cell 100, i.e., the Q direction, a plurality of cells 100 may be accommodated. That is, the battery pack 200 is provided therein with multiple rows and multiple columns of cell arrays 3.

Specifically, as shown in FIG. 22, a first partition plate 700 and a second partition plate 800 are disposed in the battery pack 200, and the first partition plate 700 and the second partition plate 800 divide a plurality of cells into two rows and two columns of cell arrays 3. Any two of the cell arrays 3 are connected to each other through connecting members between electrode terminals.

In the foregoing description, the first partition plate 700 and the second partition plate 800 may be reinforcing ribs, or may be heat insulation foam or other mechanical member, which is not limited in this application.

a cell placement region is formed in the battery pack, the cell array 3 is located in the cell placement region, J cell arrays 3 along a height direction of the minimum enclosing rectangle of the cell are disposed in the cell placement region, the cell arrays 3 are electrically connected to each other through connecting members between electrode terminals of cells, and J is greater than or equal to 1.

The quantity of cells 100 in the cell array 3 is not particularly limited in this application, and depending on different vehicle types and different power requirements, different numbers of cells 100 may be arranged. In some specific examples of this application, the quantity of cells in the cell array 3 is 60-200. In some other specific examples of this application, the quantity of cells in the cell array 3 is 80-150.

As shown in FIG. 2 to FIG. 25, according to still another aspect of this application, a battery pack 200 is provided, including a cell array 3 and a support member 4.

The cell array 3 includes a plurality of cells 100, At least one of the cells 100 includes a cell body and electrode terminals extending out of the cell body and configured to output a current inside the cell body, the cell body is substantially a cuboid, the cell body has a length L, and 600 mm≤L≤2500 mm. The cell 100 includes a casing and a core located inside the casing. A supporting region is formed on the casing, and The support member 4 is connected to the supporting region to support the cell 100.

It should be noted that that the cell body is substantially a cuboid may be construed as that the cell body may be cuboid or cubic, or may be partially special-shaped but basically cuboid or cubic, or may be largely of a cuboid or cubic shape having a notch, a bump, a chamfer, an arc portion, or a bent portion.

In the related art, because the dimension of the cell 100 is small, the length L of the cell body is short, which is far less than the dimension of the battery pack in the Y direction or the X direction, resulting in that the cell 100 cannot provide the function of enhancing the structural strength of the battery pack. Therefore, transverse beams 500 and/or longitudinal beams 600 need to be disposed in the battery pack 200 (as shown in FIG. 1), to facilitate the assembly of the cell 100. After the cell 100 is mounted in the battery pack 200 through the battery module 400, the battery module is fixed to the neighboring transverse beam 500 and/or longitudinal beam 600 through a fastener.

In the related art, because transverse beams 500 and/or longitudinal beams 600 are disposed in the battery pack, the transverse beams 500 and/or longitudinal beams 600 occupy a large part of the space for accommodating cells in the battery pack 200, leading to low utilization of the volume of the battery pack. Generally, the volume utilization of the battery pack 200 is about 40% or even lower. In other words, in the related art, only about 40% of the space inside the battery pack 200 can be used for mounting cells. As a result, the quantity of cells 100 that the battery pack 200 can accommodate is limited, the capacity and the voltage of the entire battery pack are restricted, and the battery life of the battery pack is short.

It is found that the length L of the cell body of the cell 100 may be designed to be 600 mm-2500 mm. Because the cell body of the cell 100 is long enough, the cell body itself can provide a supporting function, and replace the reinforcing structure to ensure the structural strength of the battery pack 200. In this way, the use of transverse beams 500 and/or longitudinal beams 600 in the battery pack 200 can be reduced, or even the use of transverse beams 500 and/or longitudinal beams 600 in the battery pack 200 can be avoided, so that the space occupied by transverse beams 500 and/or longitudinal beams 600 in the battery pack 200 can be reduced, thereby improving the utilization of the space inside the battery pack 200, and allowing as many cells 100 as possible to be disposed in the battery pack 200. In this way, the capacity, the voltage, and the battery life of the entire battery pack can be improved. For example, in an electric vehicle, such a design can improve the space utilization from about 40% to 60% or even higher, for example, 80%. It is found through multiple experiments that if the cell 100 is designed as a pouch cell, that is, the housing of the cell is an aluminum-plastic composite film and the aluminum-plastic composite film is used to support the cell, the aluminum-plastic composite film of the cell may be worn out, and the pouch cell in the battery pack is prone to displacement, which accelerates the wear of the cell. Along with the wear of the aluminum-plastic composite film, the cell 100 fails, resulting in a short battery life of the battery pack. In addition, the heat dissipation performance of the pouch cell is poor, and after the pouch cells are designed into the dimension described in this application and arranged in the battery pack, the heat dissipation performance of the entire pouch cell is poor. Therefore, in this application, the cell 100 includes a casing, a cover plate, and a core located inside a space formed by the casing and the cover plate. In other words, the cell is a hard-case cell. When the length L of the cell is 600 mm-2500 mm, a supporting region is formed on the casing and/or the cover plate, and the support member 4 is connected to the supporting region to support the cell. Herein, that the support member 4 is connected to the supporting region may be that the support member 4 is in direct contact with the supporting region, or may be that the support member 4 is in indirect contact or connection with the supporting region through another component, which may be set depending on usage scenarios and is not limited in this application.

In addition, because no transverse beam and/or longitudinal beam needs to be disposed in the battery pack 200, on one one hand, the fabrication process of the battery pack 200 is simplified, the assembly complexity of the cell 100 is reduced, and the production costs are reduced; In another case, the weight of the entire battery pack 200 is reduced, thereby achieving a lightweight battery pack. Particularly, when the battery pack is mounted on an electric vehicle, the battery life of the electric vehicle can also be improved, and the weight of the electric vehicle can be reduced.

In this application, the specific form of the battery pack is not particularly limited, as long as the battery pack includes the support member 4, the cell array 3 is located on the support member 4, the cells 100 are supported by the support member 4. The specific structure of the support member 4 is not limited in this application, as long as the cells 100 can be supported by the support member 4. The specific structure of the support member 4 will be described below. The cells 100 are supported by the support member 4. The cells 100 may be directly supported by the support member 4, that is, respectively disposed on the support member 4, or fixed on the support member 4. The specific fixing manner will be described in detail below. The specific supporting and fixing manners are not limited in this application.

The support member 4 is used for supporting the cell array 3. The support member 4 is usually of a rigid structure. The support member 4 may be an independently fabricated tray or a rigid supporting structure formed on the chassis of the vehicle. The support member 4 is used for maintaining the complete appearance of the battery pack, and can be easily mounted on the vehicle or another apparatus.

In this application, because the length L of the cell body of the cell 100 is long, the cell body itself can provide a supporting function, so that the use of transverse beams and/or longitudinal beams in the battery pack to enhance the structural strength can be reduced, thereby improving the utilization of the space inside the battery pack, and allowing more cells to be disposed in the battery pack.

The cell body of the cell 100 has three directions perpendicular to each other, namely, X direction, Y direction, and Z direction. Every two of the X direction, the Y direction, the Z direction are perpendicular to each other. The X direction is the arrangement direction of the cell 100, the Y direction is the length direction of the cell 100, and the Z direction is the height direction of the cell 100. In practice, for example, in an embodiment shown in FIG. 20 to FIG. 23, when the battery pack 200 is mounted on a vehicle, the length direction of the battery pack 200 may be parallel to a longitudinal direction of a vehicle 1, the width direction of the battery pack 200 may be parallel to a transverse direction of the vehicle 1, the Y direction may be parallel to the transverse direction of the vehicle 1, the X direction may be parallel to the longitudinal direction of the vehicle 1, and the Z direction may be parallel to a vertical direction of the vehicle 1. For example, in an embodiment shown in FIG. 24, when the battery pack 200 is mounted on a vehicle, the length direction of the battery pack 200 may be parallel to a longitudinal direction of a vehicle 1, the width direction of the battery pack 200 may be parallel to a transverse direction of the vehicle 1, the Y direction may be parallel to the longitudinal direction of the vehicle 1, the X direction may be parallel to the transverse direction of the vehicle 1, and the Z direction may be parallel to a vertical direction of the vehicle 1. Certainly, when the battery pack 200 is mounted on a vehicle, the X direction, the Y direction, and the Z direction may also correspond to the actual directions of the vehicle in other relationship, and the actual correspondence depends on the mounting direction of the battery pack 200.

Unless otherwise particularly stated, in this application, a vehicle traveling direction is the longitudinal direction of the vehicle; a direction perpendicular to and coplanar with the vehicle traveling direction is the transverse direction of the vehicle, which is generally a horizontal direction; and an up-down direction is the vertical direction of the vehicle, which is generally an upright direction.

In some embodiments, the cells 100 may be arranged in sequence along the X direction, and the quantity of cells may not be limited. With such an arrangement, as the quantity of cells arranged in the battery pack increases, the heat dissipation performance of the entire battery pack degrades. To improve the safety performance of the entire battery pack, L/H or L/D is limited, so that the thickness along the X direction and the height along the Z direction are relatively small, and the surface area of a single cell is greater than the surface area of a cell in the related art. In this way, the heat dissipation area of the cell can be increased, to improve the heat dissipation efficiency of the cell, thereby improving the safety performance of the entire battery pack, to make the battery pack safer and more reliable.

On the other hand, when the housing of the cell 100 is made of a metal material, the metal housing of the cell 100 has a better heat-conducting property, so that the heat dissipation efficiency of the cell 100 can be improved, thereby improving the heat dissipation effect.

The plurality of cells 100 may be arranged in the cell array 3 in various manners. The cell body has a length L, a thickness D, and a height H, a thickness direction thereof being an X direction, a length direction thereof being a Y direction, and a height direction thereof being a Z direction.

In an implementation provided in this application, the plurality of cells 100 may be arranged at intervals or arranged closely along the X direction. As shown in FIG. 2, in this implementation, the cells are arranged closely along the X direction, so as to make full use of the space.

In some embodiments, the plurality of cells 100 are arranged along the X direction of at least one cell in the cell array 3, and the X direction is a thickness direction of any cell 100 in the cell array 3. The cell body has a thickness D, and at least one of the cells 100 meets: $10 \leq L/D \leq 208$, for example, $23 \leq L/D \leq 208$, for example, $50 \leq L/D \leq 70$. It is found through a large number of experiments that for the cell 100 that meets the above dimension requirement, the cell 100 can have a small thickness in the X direction while providing rigidity that meets the supporting requirement, so that the cell 100 has a high heat dissipation capability.

In some other embodiments, the plurality of cells 100 are arranged along the Z direction of at least one cell in the cell array 3, and the Z direction is a height direction of any cell 100 in the cell array 3. The cell body has a height H, and at least one of the cells 100 meets: $10 \leq L/H \leq 208$, for example, $23 \leq L/H \leq 208$. In some embodiments, $50 \leq L/H \leq 70$. It is found through a large number of experiments that for the cell 100 that meets the above dimension requirement, the cell body can have a small thickness in the Z direction while providing rigidity that meets the supporting requirement, so that the cell body has a high heat dissipation capability.

It should be noted that during the arrangement of the plurality of cells 100, an array with flush ends maybe formed, or the cells may form an angle with the X direction or the Z direction, that is, may be obliquely arranged. The arrangement directions of the plurality of cells 100 may be the same, or may be partially different or completely different, as long as each cell is distributed along a predetermined direction.

In some embodiments, $600 \text{ mm} \leq L \leq 1500 \text{ mm}$, for example, $600 \text{ mm} \leq L \leq 1000 \text{ mm}$. The cell 100 having such a length is long, and when used in the battery pack 200, only a single cell 100 needs to be disposed along the first direction.

In some embodiments, the cell body of the cell 100 has a volume V, and at least one of the cells 100 meets: $0.0005 \text{ mm}^{-2} \leq L/V \leq 0.002 \text{ mm}^{-2}$. It is found through a large number of experiments that when the cell 100 meets the above limitations, the cross-section of the cell body is small, and the cell body has a good heat dissipation effect, so that the temperature difference between the inside and outside of the cell body is small.

In another implementation provided in this application, a ratio of the surface area S to the volume V of the cell body of the cell 100 is $0.1 \text{ mm}^{-1} \leq S/V \leq 0.35 \text{ mm}^{-1}$. This ratio may be achieved by the above long and thin cell 100, or through dimension adjustment. By controlling the ratio of the surface area S to the volume V of the cell 100, a sufficient heat dissipation area is provided while ensuring that the length of the cell body extends along the Y direction, thereby ensuring the heat dissipation effect of the cell 100.

In some embodiments, the cell body has a volume V, and a relationship between the height H of the cell body and the volume V of the corresponding cell body is $0.0001 \text{ mm}^{-2} \leq H/V \leq 0.00015 \text{ mm}^{-2}$.

It should be noted that the surface area of the cell is the sum of the areas of all surfaces of the cell. When some surfaces of the cell is partially recessed or partially protrude, the surface area of the cell is calculated by using a length L, a width H, and a thickness D of a square defining the external contour of the cell. A specific calculation formula is $S=2(LD+LH+HD)$.

As shown in FIG. 3 to FIG. 4 and FIG. 20 to FIG. 24, the cell body has a length L, a thickness D, and a height H, a thickness direction thereof being an X direction, a length direction thereof being a Y direction, and a height direction thereof being a Z direction; and the height H of the cell body is greater than or equal to the thickness D of the cell body, at least one of the cells meets: $23 \leq L/D \leq 208$, and $4 \leq L/H \leq 21$, and the plurality of cells are arranged along the X direction of at least one cell in the cell array 3. In solutions of some embodiments, at least one of the cells meets: $9 \leq L/H \leq 13$. It is found through a large number of experiments that for the cell body that meets the above dimension requirement, the cell body can have a small thickness in the X direction while providing rigidity that meets the supporting requirement, so that the cell body has a high heat dissipation capability, and the cells 100 can be conveniently arranged closely in the X direction.

In some exemplary implementations of this application, the at least one cell 100 has a first end and a second end along the Y direction, at least one of the first end and the second end has an electrode terminal configured to output a current inside the cell, and electrode terminals of cells 100 are electrically connected to each other through a connecting member.

Herein, the "first end" and the "second end" of the cell 100 are used for describing the orientation of the cell 100, and are not intended to limit or describe the specific structure of the cell 100. For example, the "first end" and the "second end" of the cell 100 are not intended to limit or describe positive and negative electrodes of the cell 100. In an implementation of the cell 100, as shown in FIG. 2 to FIG.

4, a first electrode terminal 101 of the cell 100 extends out from the first end of the cell 100 facing toward the Y direction, and a second electrode terminal 102 of the cell 100 extends out from the second end of the cell 100 facing toward the Y direction. In other words, the length direction of the cell 100 may be the direction of a current inside the cell 100, that is, the current direction inside the cell 100 is the Y direction. In this way, because the current direction is the same as the length direction of the cell 100, the cell 100 has a larger effective heat dissipation area and a higher heat dissipation efficiency. Herein, the first electrode terminal 101 is a positive electrode of the cell 100, and the second electrode terminal 102 is a negative electrode of the cell 100; or the first electrode terminal 101 is the negative electrode of the cell 100, and the second electrode terminal 102 is the positive electrode of the cell 100. Electrode terminals of cells 100 are connected in series or in parallel to each other through a connecting member.

In an implementation, the thickness directions of at least a part of the cells 100 extend along the X direction, that is, a plurality of cells are arranged along the thickness direction of the cell.

In some embodiments, the cell array 3 includes a plurality of cells 100 arranged in sequence along the X direction, and the cell 100 has a length extending along the Y direction and a height extending along the Z direction. In other words, a plurality of cells 100 are arranged along the thickness direction, and extend along the length direction, thereby making full use of the space inside the battery pack, and allowing more cells to be disposed.

The cell 100 has a first end and a second end along the length direction, the first end and/or the second end has an electrode terminal configured to output a current inside the cell, and electrode terminals of cells are connected to each other through a connecting member.

Herein, the "first end" and the "second end" of the cell 100 are used for describing the orientation of the cell 100, and are not intended to limit or describe the specific structure of the cell 100. for example, the "first end" and the "second end" of the cell 100 are not intended to limit or describe positive and negative electrodes of the cell 100. In an implementation of the cell 100, as shown in FIG. 2 to FIG. 4, a first electrode terminal 101 of the cell 100 extends out from the first end of the cell 100 along the length direction, and a second electrode terminal 102 of the cell 100 extends out from the second end of the cell 100 along the length direction. In other words, the length direction of the cell 100 may be the direction of a current inside the cell 100, that is, the current direction inside the cell 100 is the Y direction. In this way, because the current direction is the same as the length direction of the cell 100, the cell 100 has a larger effective heat dissipation area and a higher heat dissipation efficiency. Herein, the first electrode terminal 101 is a positive electrode of the cell 100, and the second electrode terminal 102 is a negative electrode of the cell 100; or the first electrode terminal 101 is the negative electrode of the cell 100, and the second electrode terminal 102 is the positive electrode of the cell 100. Electrode terminals of cells 100 are connected in series or in parallel to each other through a connecting member.

In the related art, how to design the dimension of a rectangular cell 100 to achieve both a suitable battery capacity and a good heat dissipation effect has long been one of the problems to be solved in the battery field.

In an implementation provided in this application, the ratio of the length L and the thickness D of the cell body of the at least one cell 100 meets $23 \leq L/D \leq 208$. Under this ratio, a moderately long, and thin cell 100 can be obtained, and while ensuring that the length of the cell 100 extends along the first direction, a suitable resistance, a large heat dissipation area, and high heat dissipation efficiency can be maintained, providing good adaptability for various vehicle types.

In an implementation provided in this application, the ratio of the length L and the thickness D of the cell body of the at least one cell 100 meets $50 \leq L/D \leq 70$. Under this ratio, a moderately long cell 100 can be obtained, and the rigidity of the cell 100 is large enough, thereby facilitating the processing, transportation, and assembly. When the cell 100 is mounted in the battery pack housing, because the cell 100 has high rigidity, the cell 100 itself can be used as reinforcing beams. On the other hand, while ensuring that the length of the cell 100 extends along the first direction, a suitable resistance, a large heat dissipation area, and high heat dissipation efficiency can be maintained, providing good adaptability for various vehicle types.

According to the battery pack 200 provided by this application, in the X direction, the battery pack 200 further includes two side plate components disposed opposite to each other on two sides of the cell array 3 and configured to sandwich the cell array 3. The side plate components sandwiching the cell array 3 provide a function of limiting expansive deformation of the plurality of cells 100, thereby ensuring starting of an explosion-proof valve 103 and a current interrupt device (CID). Specifically, in some embodiments, as shown in FIG. 4, the side plate components may be a third side beam 203 and a fourth side beam 204. In some other embodiments, as shown in FIG. 12, the side plate components may be a first side plate 209 and a second side plate 210.

The battery pack provided by this application further includes a sealing cover 220. The sealing cover 220 and the support member 4 form an accommodating cavity for accommodating the cell array 3. The sealing cover 220 and the support member 4 define the accommodating cavity for accommodating cells, and the sealing cover 220 provides a waterproof moisture-proof function.

Figure 18:
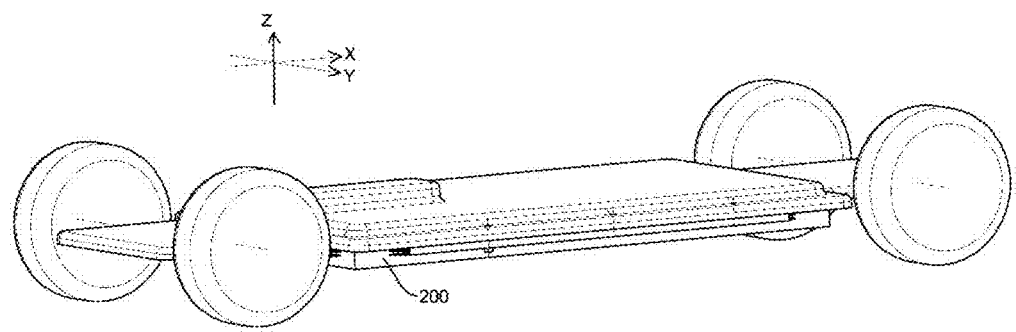
FIG. 18 is a schematic three-dimensional diagram of a tray fixed on an electric vehicle according to an implementation of this application.
Figure 19:
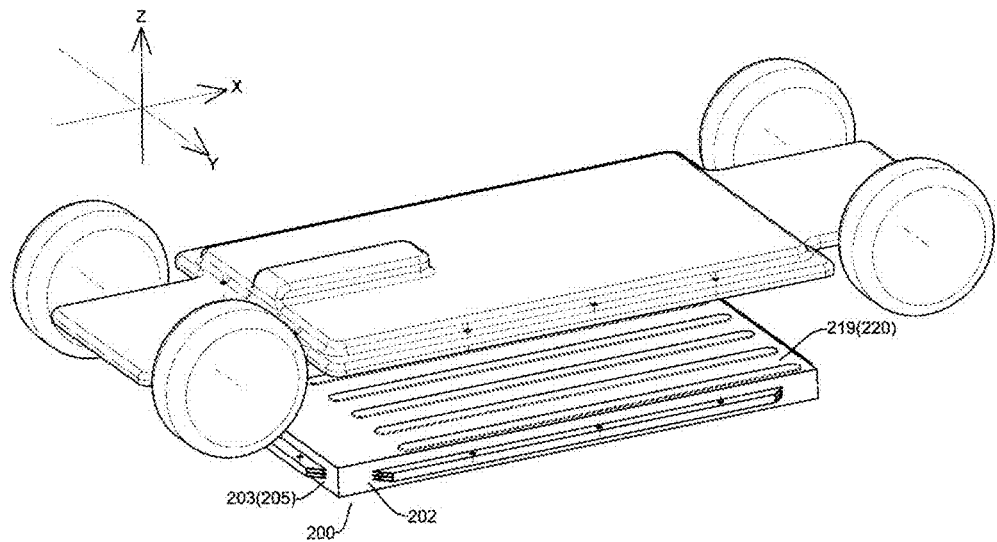
FIG. 19 is a schematic exploded view of a battery pack (tray) formed on an electric vehicle according to an implementation of this application.

The battery pack 200 includes a tray for use with a vehicle. The tray is a separately fabricated tray for accommodating and mounting cells 100 therein. As shown in FIG. 16, FIG. 18, and FIG. 19, after the cell 100 is mounted in the tray, the tray may be mounted on the vehicle body through a fastener, for example, may be suspended on the chassis of an electric vehicle.

The tray includes a first side beam 201 and a second side beam 202 disposed opposite to each other along the Y direction, the support member 4 is the first side beam 201 and the second side beam 202, the first end of the cell 100 is supported by the first side beam 201, and the second end of the cell 100 is supported by the second side beam 202. Under the technical concept of this application, the specific structure of the first side beam 201 and the second side beam 202 are not limited, the first side beam 201 and the second side beam 202 are disposed opposite to each other, and the first side beam 201 and the second side beam 202 may be parallel to each other or may form an angle, and may be of a straight or curved structure. The first side beam 201 may be rectangular, cylindrical, or polygonal, which is not particularly limited in this application.

The first side beam 201 and the second side beam 202 are disposed opposite to each other along the Y direction, the plurality of cells 100 are disposed between the first side beam 201 and the second side beam 202, and two ends of the cell 100 are respectively supported by the first side beam 201 and the second side beam 202. In an embodiment, the first end of each cell 100 is supported by the first side beam 201, and the second end of each cell 100 is supported by the second side beam 202.

In other words, each of the cells 100 extends between the first side beam 201 and the second side beam 202, and the plurality of cells 100 are arranged along the length direction of the first side beam 201 and the second side beam 202, that is, arranged along the X direction.

The first end and the second end of the cell 100 are respectively supported by the first side beam 201 and the second side beam 202. The cell 100 may be directly supported by the first side beam 201 and the second side beam 202, that is, respectively placed on the first side beam 201 and the second side beam 202; or may be fixed on the first side beam 201 and the second side beam 202. The specific fixing manner will be described in detail below. The specific supporting and fixing manners are not limited in this application.

In some embodiments of this application, the first end of each cell 100 may be directly or indirectly supported by the first side beam 201, and the second end of each cell 100 may be directly or indirectly supported by the second side beam 202. The term "directly" means that the first end of the cell 100 is in direct contact fit with the first side beam 201, and the second end of the cell 100 is in direct contact fit with the second side beam 202. The term "indirectly" means that for example, in some embodiments, the first end of the cell 100 is supported by the first side beam 201 through a first end plate 207, and the second end of the cell 100 is supported by the second side beam 202 through a second end plate 208.

It should be noted that the cell 100 may be perpendicular to the first side beam 201 and/or the second side beam 202, or may form a sharp or obtuse angle with the first side beam 201 and/or the second side beam 202. For example, when the first side beam 201 and the second side beam 202 are parallel to each other, the first side beam 201, the second side beam 202, and the cell 100 may constitute a rectangular, square or rhomboid, fan-shaped or other structure; when the first side beam 201 and the second side beam 202 form an angle, the first side beam 201, the second side beam 202, and the cell 100 may constitute a trapezoid, triangular or other structure. The angle between the first side beam 201 and the second side beam 202 and the angles between the cell 100 and the first side beam 201 and the second side beam 202 are not limited in this application.

The first side beam 201 and the second side beam 202 are located on two opposite sides of the tray along the Y direction, which means that as shown in FIG. 2, the first side beam 201 and the second side beam 202 are located on the outermost sides of the tray along the Y direction, and the first side beam 201 and the second side beam 202 are the outermost side edges of the tray.

Moreover, the "first end" and the "second end" of the cell 100 mentioned above are used for describing the orientation of the cell 100, and are not intended to limit or describe the specific structure of the cell 100. For example, the "first end" and the "second end" of the cell 100 are not intended to limit or describe positive and negative electrodes of the cell 100. In other words, in this application, the end of the cell 100 supported by the first side beam 201 is the first end, and and the end of the cell 100 supported by the second side beam 202 is the second end.

trayThe vehicle body has a large width of for example 1.2 m-2 m and a large length of for example 2 m-5 m, and different vehicle types correspond to different vehicle body widths and lengths. A larger vehicle body width and length requires the tray disposed at the bottom of the vehicle to have a larger overall dimension. However, a large tray dimension results in that in the related art, in addition to the side beams disposed at the side edges of the tray, transverse beams also need to be disposed inside the tray, in order to provide a sufficient supporting force and structural strength for cells disposed therein. After transverse beams are disposed in the tray, part of the load and internal space of the tray are occupied by the transverse beams; as a result, the space inside the tray cannot be effectively used. In addition, due to the existence of transverse beams, to allow for the mounting of transverse beams, a plurality of battery modules need to be disposed inside the tray along the width and length directions, which requires a complex mounting process involving a large quantity of mechanical members for mounting.

However, if transverse beams are removed, the module layout and cell layout methods in the related art cannot provide a sufficient structural strength for the battery module, and the tray cannot provide a sufficient bearing capacity.

In this application, when the length L of the cell is 600 mm-1500 mm, two ends of the cell 100 are respectively supported by the first side beam 201 and the second side beam 202, so as to distribute the weight of the cell to the side beams on two sides of the tray. While avoiding the use of transverse beams, the bearing capacity of the tray is effectively improved. In addition, the cell 100 itself can provide a supporting function.

The first side beam 201 and the second side beam 202 respectively include inner wall surfaces matching two end faces of the cell 100. An insulating plate is sandwiched between the inner wall surface of the first side beam 201 and the first end of the cell 100, that is, the insulating plate is located between the cell 100 and the inner wall surface of the first side beam 201. An insulating plate is sandwiched between the inner wall surface of the second side beam 202 and the second end of the cell 100, that is, the insulating plate is located between the cell 100 and the inner wall surface of the second side beam 202. Specifically, the specific structure of the insulating plate is not limited, as long as it can provide functions of fixing the cell array 3 and preventing expansion. In some implementations, the insulating plate may be a first end plate 207 and a second end plate 208 described below.

the tray includes a bottom plate, the first side beam 201 and the second side beam 202 are disposed opposite to each other at two ends of the bottom plate along the Y direction, and the cell 100 is spaced apart from the bottom plate. In this way, the bearing load of the bottom plate for the cell 100 can be reduced, and most of the weight of the cell 100 can be borne by the first side beam and the second side beam, so that the load bearing requirements on the bottom plate are lowered, thereby simplifying the manufacturing process of the bottom plate and reducing the production costs.

A thermal insulation layer 217 is disposed between the bottom of the cell array 3 formed by arranging a plurality of cells 100 and the bottom plate of the tray, so as to prevent the heat transfer between the cell 100 and the outside, thereby achieving a heat preservation function for the cell 100, and preventing thermal interference between the environment outside the battery pack 200 and the cell 100 inside the battery pack 200. The thermal insulation layer 217 may be made of a material having heat insulation and heat preservation functions, for example, made of heat preservation cotton.

Figure 5:
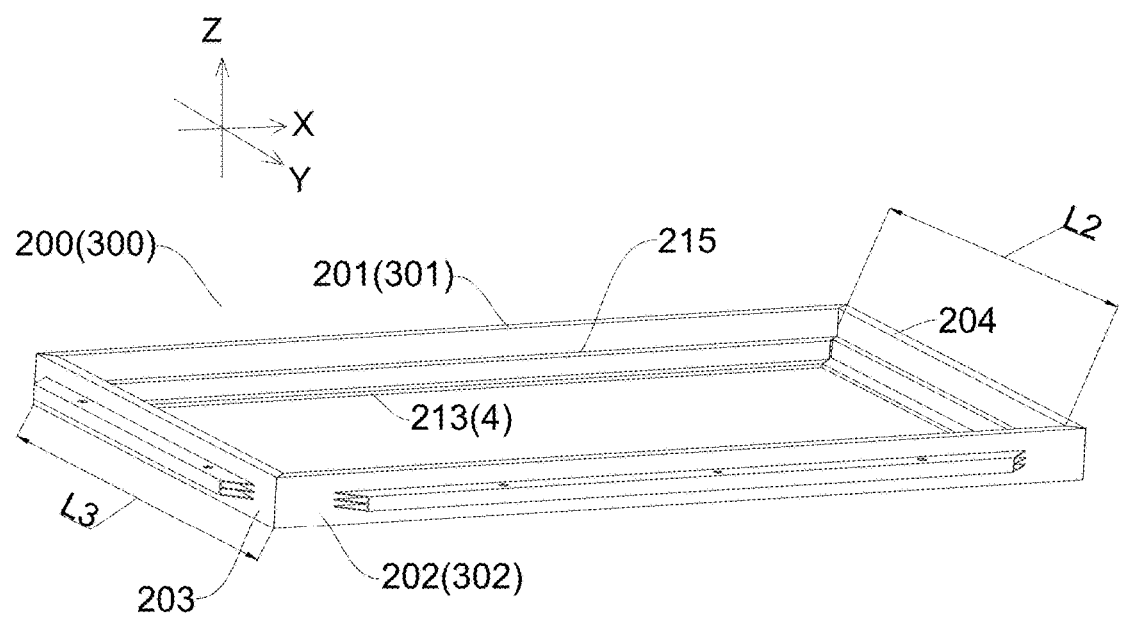
FIG. 5 is a schematic three-dimensional structural diagram of a battery pack according to an implementation of this application.
Figure 6:
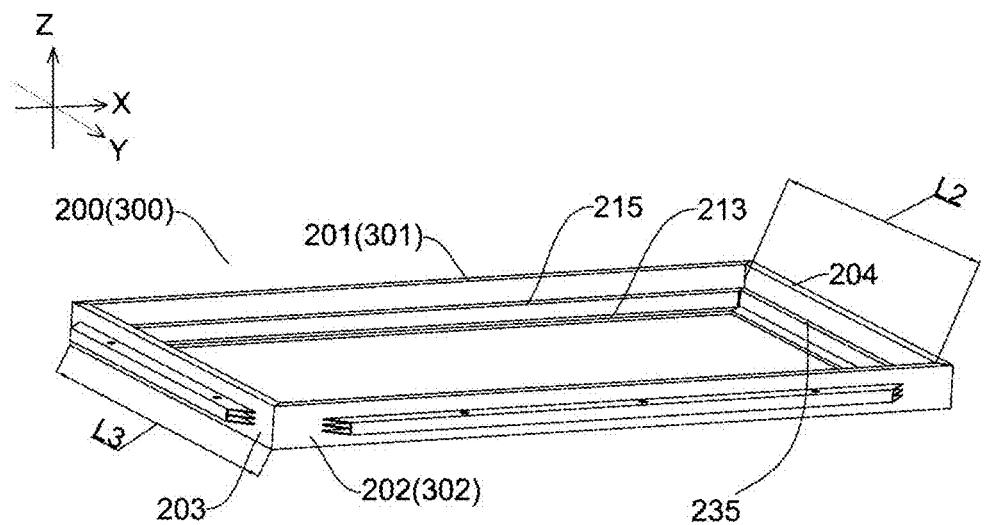
FIG. 6 is a schematic three-dimensional structural diagram of a battery pack according to another implementation of this application.
Figure 7:
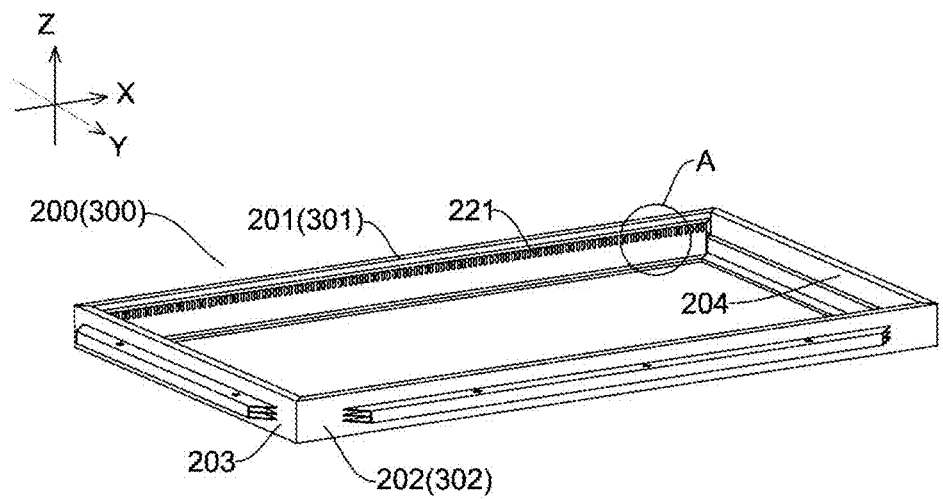
FIG. 7 is a schematic three-dimensional structural diagram of a battery pack according to still another implementation of this application.
Figure 8:
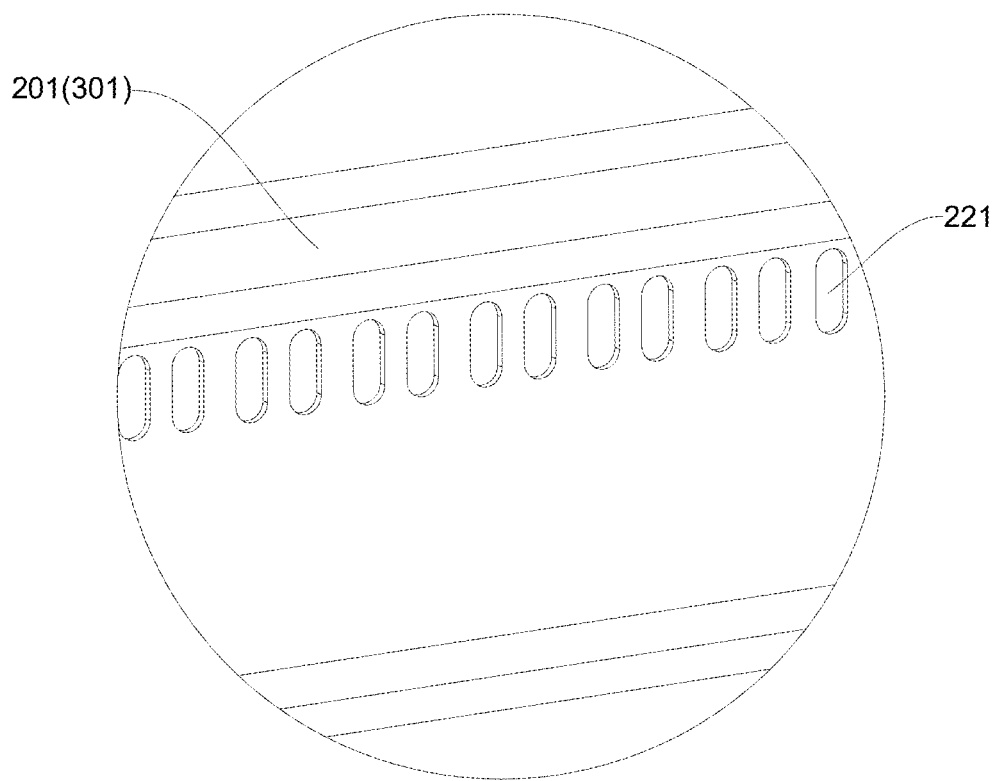
FIG. 8 is an enlarged view of part A in FIG. 7.
Figure 9:
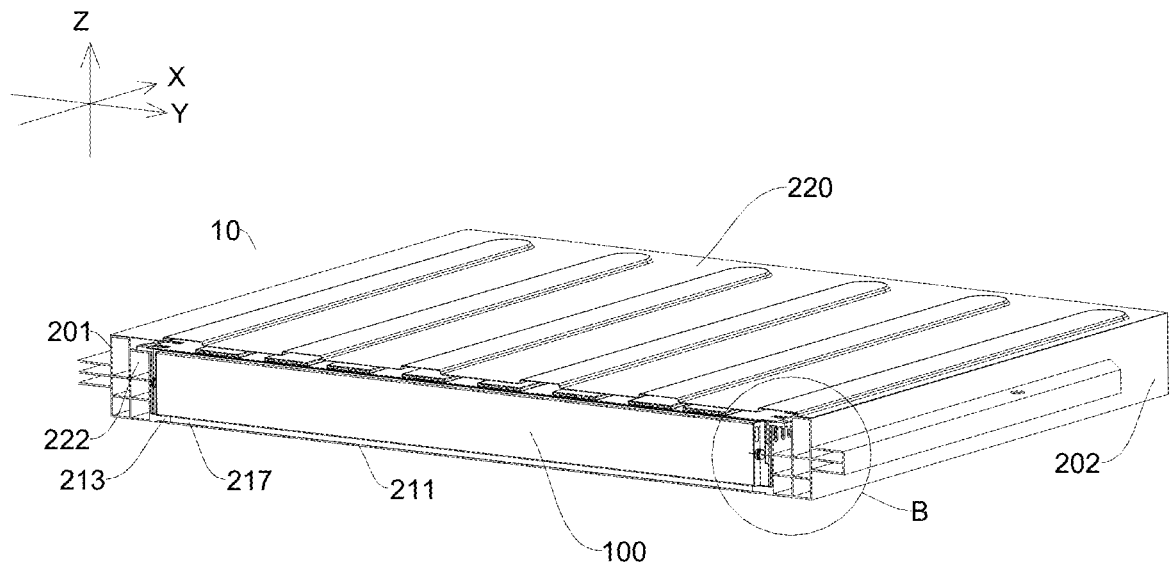
FIG. 9 is a three-dimensional cross-sectional view of a battery pack according to an implementation of this application.

Moreover, to enable the first side beam 201 and the second side beam 202 to provide a supporting force for the cell 100, in an implementation provided in this application, as shown in FIG. 5 and FIG. 6, the first side beam 201 is provided with a first support plate 213, and the second side beam 202 is provided with a second support plate 214. A side of the first support plate 213 facing toward the sealing cover 220 is provided with a first supporting surface, and a side of the second support plate 214 facing toward the sealing cover 220 is provided with a second supporting surface. The first end of each cell 100 is supported by the first supporting surface of the first support plate 213, and the second end of each cell 100 is supported by the second supporting surface of the second support plate 214. A side of the first support plate 213 facing away from the sealing cover 220 is provided with a first mounting surface, and a side of the second support plate 214 facing away from the sealing cover 220 is provided with a second mounting surface. The bottom plate of the tray is mounted on the first mounting surface and the second mounting surface, the first support plate 213 may protrude inward from the bottom of the first side beam 201, and the second support plate 214 may protrude inward from the bottom of the second side beam 202.

Compared with technical solution in the related art where the bottom plate in the battery pack is used to support the cell 100, in this application, by using the first support plate 213 and the second support plate 214 disposed on the first side beam 201 and the second side beam 202 to support the cell 100, the structure of the battery pack 200 provided by this application can be simplified, and the weight of the battery pack 200 can be reduced. Insulating plates may be disposed on the first support plate 213 and the second support plate 214. The insulating plates are located between the cell 100 and the first support plate 213 and the second support plate 214.

The manner of connection between the first side beam 201, the second side beam 202, and the bottom plate is not particularly limited, and they may be integrally formed or may be welded together.

The inner wall surface of the first side beam 201 facing toward the cell 100 has a first connecting surface 215, and a distance from the first connecting surface 215 to the sealing cover 220 is less than a distance from the first supporting surface to the sealing cover 220; the inner wall surface of the second side beam 202 facing toward the cell 100 has a second connecting surface 216, and a distance from the second connecting surface 216 to the sealing cover 220 is less than a distance from the second supporting surface to the sealing cover 220; and the two ends of the cell 100 are respectively in contact with the first connecting surface and the second connecting surface.

In some embodiments, the first side beam 201 is further provided with a first connecting surface 215, and the second side beam 202 is further provided with a second connecting surface 216. The first end of each cell 100 is fixed on the first connecting surface 215, and the second end of each cell 100 is fixed on the second connecting surface 216. The first connecting surface 215 may be a third support plate disposed on the first side beam 201, and the third support plate is located above the first support plate 213. The second connecting surface 216 may be a fourth support plate disposed on the second side beam 202, and the fourth support plate is located above the second support plate 214. The first end and the second end of the cell may be fixed to the first connecting surface 215 and the second connecting surface 216 through fasteners, or welded on the first connecting surface 215 and the second connecting surface 216.

In practice, the inner wall surface of the first side beam 201 facing toward the cell 100 has a step structure including at least two steps, and sides of two steps facing toward the sealing cover 220 respectively form the first connecting surface 215 and the first supporting surface; and the inner wall surface of the second side beam 202 facing toward the cell 100 has a step structure including at least two steps, and sides of two steps facing toward the sealing cover 220 respectively form the second connecting surface 216 and the second supporting surface.

Figure 14:
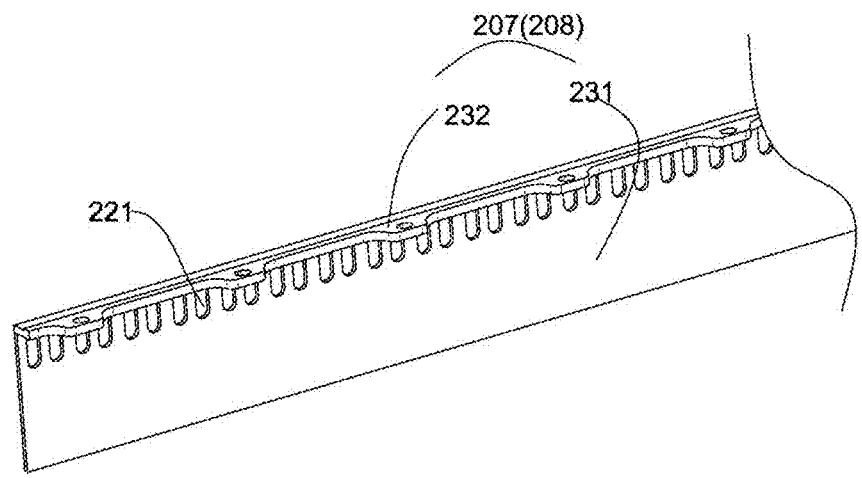
FIG. 14 is a schematic three-dimensional structural diagram of a first end plate or a second end plate according to an implementation of this application.
Figure 15:
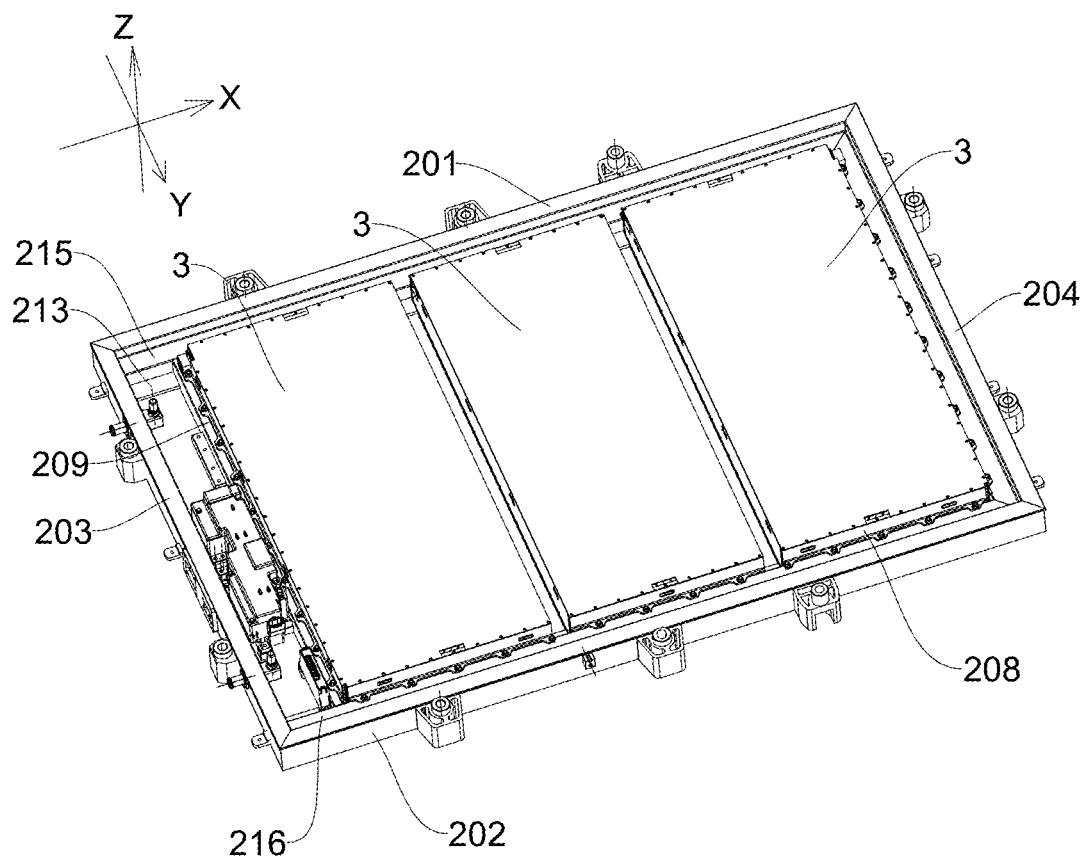
FIG. 15 is a schematic three-dimensional structural diagram of a battery pack according to an implementation of this application, where there are a plurality of battery modules.

According to the battery pack provided by this application, in at least a part of the plurality of cells 100, as shown in FIG. 12 and FIG. 14, a first end plate 207 is disposed at an end of a cell 100 adjacent to the first side beam 201 facing toward the first side beam 201; in at least a part of the plurality of cells 100, a second end plate 208 is disposed at an end of a cell 100 adjacent to the second side beam 202 facing toward the second side beam 202. The first end of the at least one cell 100 is connected to the first connecting surface 215 through the first end plate 207, and the second end of the at least one cell 100 is connected to the second connecting surface 216 through the second end plate 208. In other words, only one cell is supported by the first side beam 201 through the first end plate, and at least one cell 100 is supported by the second side beam 202 through the second end plate 208. The first end plate 207, the second end plate 208, and at least a part of the plurality of cells 100 form a battery module. There may be one first end plate 207, there may be one second end plate 208, and the first end plate 207, the second end plate 208, and a plurality of cells 100 form a battery module. The battery module is supported between the first side beam 201 and the second side beam 202 through the first end plate 207 and the second end plate 208. There may be a plurality of first end plates 207, there may be a plurality of second end plates 208, and the plurality of first end plates 207, the plurality of second end plates 208, and the cells 100 form a plurality of battery modules. Each of the battery modules is supported between the first side beam 201 and the second side beam 202 through the corresponding first end plate 207 and second end plate 208. Each of the battery modules extends between the first side beam 201 and the second side beam 202, and the plurality of battery modules are arranged along the length direction of the first side beam 201 and the second side beam 202. In this application, the quantity of first end plates 207 and the quantity of second end plates 208, that is, the quantity of battery modules is not limited.

In some embodiments, the first end plate 207 includes an end plate body 231 disposed opposite to an end face of the cell 100 and a first connecting plate 232 connected to the end plate body 231 and protruding toward the first side beam 201, the second end plate 208 includes an end plate body 231 disposed opposite to an end face of the cell 100 and a first connecting plate 232 connected to the end plate body 231 and protruding toward the second side beam 202, the first connecting plate 232 of the first end plate 207 is connected to the first connecting surface 215, and the first connecting plate 232 of the second end plate 208 is connected to the second connecting surface 216. The specific connection form is not limited herein.

Figure 10:
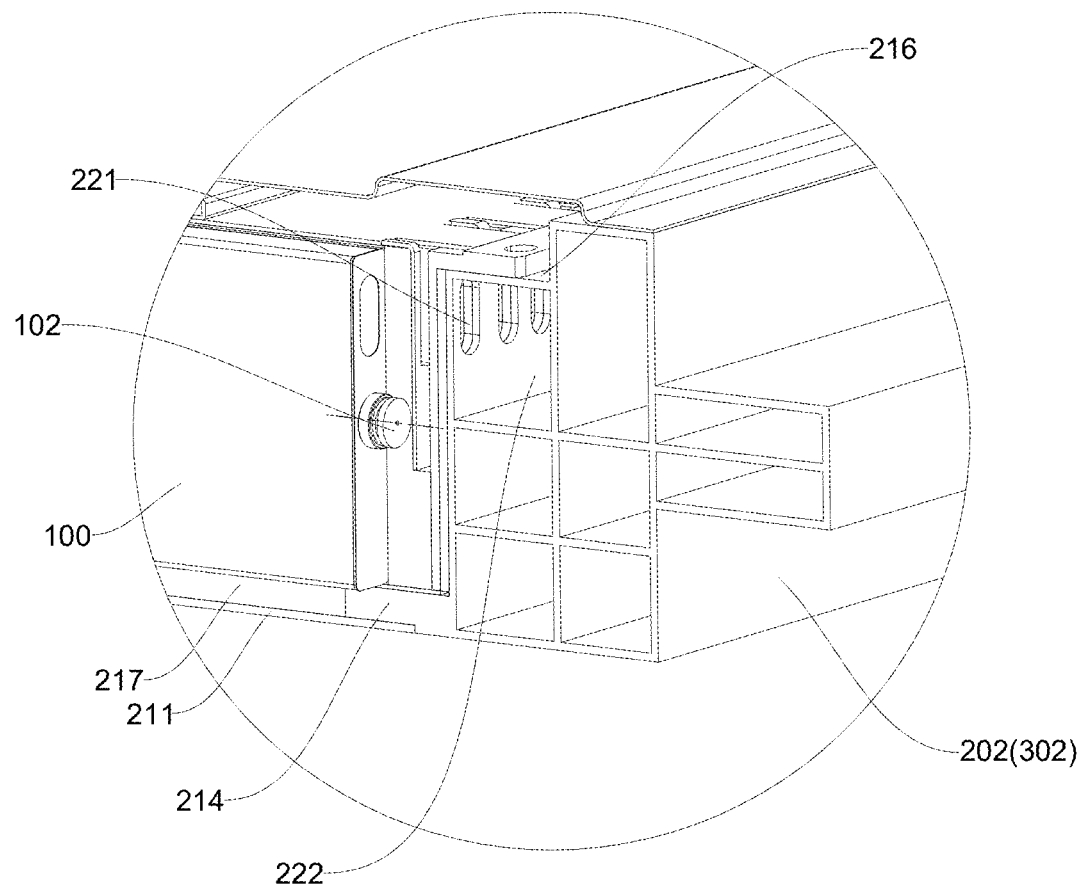
FIG. 10 is an enlarged view of part B in FIG. 9.

In an implementation, as shown in FIG. 2 and FIG. 10, an explosion-proof valve 103 is disposed at the first end of the cell 100 facing toward the first side beam 201, the first side beam 201 is provided therein with an exhaust passage 222, an exhaust vent 221 is provided at a position on the first side beam 201 corresponding to the explosion-proof valve 103, the exhaust vent 221 is in communication with the exhaust passage 222, and the battery pack 200 is provided with an exhaust outlet in communication with the exhaust passages 222. An explosion-proof valve 103 is disposed at the second end of the cell 100 facing toward the second side beam 202, the second side beam 202 is provided therein with an exhaust passage 222, an exhaust vent 221 is provided at a position on the second side beam 202 corresponding to the explosion-proof valve 103, the exhaust vent 221 is in communication with the exhaust passage 222, and the battery pack 200 is provided with an exhaust outlet in communication with the exhaust passages 222. In other implementations, as shown in FIG. 12 and FIG. 14, the exhaust vent 221 may be formed on the first end plate 207 and the first side beam 201, and/or on the second end plate 208 and the second side beam 202.

In the related art, during the use of the battery pack, if gas pressure inside the cell increases to a certain degree, the explosion-proof valve is opened, so that a flame, smoke or gas inside the cell will be discharged through the explosion-proof valve. The flame, smoke or gas accumulates inside the battery pack, and if not discharged in time, will cause secondary damage to the cell. In this application, because the gas inlet 221 corresponding to the explosion-proof valve 103 of the cell 100 is provided on the first side beam 201 and/or the second side beam 202 and the first side beam 201 and/or the second side beam 202 is provided therein with the exhaust passage 222, the explosion-proof valve 103 is opened when the gas pressure inside the cell 100 increases, and the flame, smoke or gas inside the cell will directly enter the exhaust passages 222 inside the first side beam 201 and/or the second side beam 202 through the gas inlet 221, and will be discharged out of the first side beam 201 and the second side beam 202 through the exhaust vent, for example, discharged into the atmosphere through the exhaust vent. In this way, the flame, smoke or gas will not accumulate inside the battery pack 200, thereby preventing the the flame, smoke or gas from causing secondary damage to the cell 100.

In some embodiments, a management accommodating cavity for accommodating battery management components and power distribution components is defined between the first connecting surface 215, the second connecting surface 216, and the sealing cover 220. In this way, the space occupied by battery management components and power distribution components can be reduced, so that more cells can be disposed in the battery pack, thereby improving the space utilization, and improving the volume energy density and the battery life.

For the bottom plate of the tray, the cell 100 is spaced apart from the bottom plate of the tray. Because the bottom plate of the tray does not receive any force, the manufacturing process of the bottom plate can be simplified, thereby reducing the manufacturing costs. A thermal insulation layer is disposed between the cell 100 and the bottom plate of the tray, to prevent heat transfer between the cell 100 and the outside, thereby achieving a heat preservation function for the cell 100, and preventing thermal interference between the environment outside the battery pack 200 and the cell 100 inside the battery pack 200. The thermal insulation layer may be made of a material having heat insulation and heat preservation functions, for example, made of heat preservation cotton.

Moreover, in an implementation provided in this application, as shown in FIG. 3 to FIG. 8, the battery pack 200 further includes a third side beam 203 and a fourth side beam 204 disposed opposite to each other along the X direction, and the plurality of cells 100 are arranged between the third side beam 203 and the fourth side beam 204 along the X direction. In an implementation, the first side beam 201 and the second side beam 202 are perpendicular to and connected to the third side beam 203 and the fourth side beam 204, so that the battery pack 200 forms a rectangle or square. In other implementations, the first side beam 201 and the second side beam 202 may be parallel to each other, and the third side beam 203 and the fourth side beam 204 may form an angle with the first side beam 201 and the side beam 202, so that the battery pack 200 forms a trapezoid, rhomboid, or the like. The specific shape of the battery pack 200 formed by the first side beam 201, the second side beam 202, the third side beam 203, and the fourth side beam 204 is not limited in this application.

In some embodiments, as shown in FIG. 2, the third side beam 203 and the fourth side beam 204 provide a pressing force to the cell array 3. The third side beam 203 applies an acting force, which is toward the fourth side beam 204, on the cell 100 disposed adjacent to the third side beam 203, and the third side beam 204 applies an acting force, which is toward the third side beam 203, on the cell 100 disposed adjacent to the fourth side beam 204, so that the plurality of cells 100 can be closely arranged between the third side beam 203 and the fourth side beam 204 along the X direction, and the plurality of cells 100 can closely fit each other. Moreover, the third side beam 203 and the fourth side beam 204 may limit the plurality of cells 100 in the X direction, and especially when the cell 100 undergoes slight expansion, may provide a buffering function and an inward pressure for the cell 100, to prevent the cell 100 from excessive expansion and deformation. Especially when the cell 100 is provided with the explosion-proof valve 103 and a current interrupt device (CID), the third side beam 203 and the fourth side beam 204 can effectively limit the expansion of the cell 100, so that when the cell 100 fails and expands, the gas pressure inside the cell is sufficient to break through the explosion-proof valve 103 or a flip sheet inside the CID, to short circuit the cell 100, thereby ensuring the safety of the cell 100, and preventing explosion of the cell 100.

Figure 13:
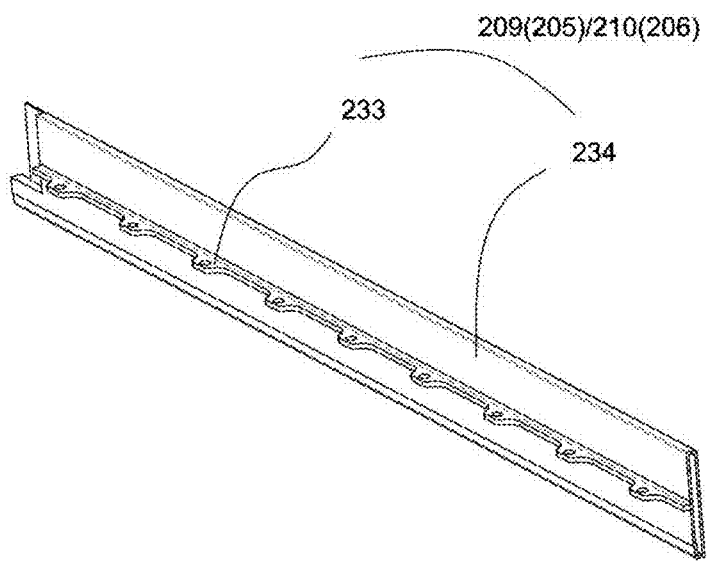
FIG. 13 is a schematic three-dimensional structural diagram of a first side plate or a second side plate according to an implementation of this application.

As shown in FIG. 12 and FIG. 13, a first elastic apparatus 205 may be disposed between the third side beam 203 and the cell 100 adjacent to the third side beam 203, and/or a second elastic apparatus 206 may be disposed between the fourth side beam 204 and the cell 100 adjacent to the fourth side beam 204. The first elastic apparatus 205 may be mounted on the third side beam 203, the second elastic apparatus 206 may be mounted on the fourth side beam 204, and the plurality of cells 100 are closely arranged through the first elastic apparatus 205 and the second elastic apparatus 206. In this way, he quantity of cells 100 arranged between the third side beam 203 and the fourth side beam 204 can be adjusted by changing the mounting distances from the first elastic apparatus 205 and the second elastic apparatus 206 to the third side beam 203 and the fourth side beam 204 without changing the spacing between the third side beam 203 and the fourth side beam 204.

In some embodiments, the third side beam 203 is further provided with a third connecting surface 236, and the fourth side beam 204 is further provided with a fourth connecting surface 235. A first side of each cell 100 is fixed on the third connecting surface 236, and a second side of each cell 100 is fixed on the fourth connecting surface 235.

In at least a part of the plurality of cells 100, as shown in FIG. 12 and FIG. 13, a first side plate 209 is disposed at an end of a cell 100 adjacent to the third side beam 203 facing toward the third side beam 203; in at least a part of the plurality of cells 100, a second side plate 210 is disposed at an end of a cell 100 adjacent to the fourth side beam 204 facing toward the fourth side beam 210.

The first side of the at least one cell 100 is connected to the third connecting surface 236 through the first side plate 209, and the second side of the at least one cell 100 is connected to the fourth connecting surface 235 through the second side plate 210. In other words, at least one cell is supported by the fourth side beam 209 through the first side plate, and at least one cell 100 is supported by the fourth side beam 210 through the second side plate 210. The first side plate 209, the second side plate 210, and at least a part of the plurality of cells 100 form a battery module. There may be one first side plate 209, there may be one second side plate 210, and the first side plate 209, the second side plate 210, and a plurality of cells 100 form a battery module. The battery module is supported between the third side beam 203 and the fourth side beam 204 through the first side plate 209 and the second side plate 210. There may be a plurality of first side plates 209, there may be a plurality of second side plates 210, and the plurality of first side plates 209, the plurality of second side plates 210, and the cells 100 form a plurality of battery modules. Each of the battery modules is supported between the third side beam 203 and the fourth side beam 210 through the corresponding first side plate 209 and second side plate 210. Each of the battery modules is arranged between the third side beam 203 and the fourth side beam 210. In this application, the quantity of first side plates 209 and the quantity of second side plates 210, that is, the quantity of battery modules is not limited.

In some embodiments, the first side plate 209 includes a side plate body 234 disposed opposite to an end face of the cell 100 and a second connecting plate 233 connected to the side plate body 234 and protruding toward the third side beam 203, the second side plate 210 includes a side plate body 234 disposed opposite to an end face of the cell 100 and a second connecting plate 234 connected to the end plate body 234 and protruding toward the fourth side beam 204, the second connecting plate 234 corresponding to the first side plate 209 is connected to the third connecting surface 236, and the second connecting plate 234 of the second side plate 210 is connected to the fourth connecting surface 235. The specific connection form is not limited herein.

In some embodiments, at least a part of the cells 100 are supported between the first side beam 201 and the second side beam 202 through a second panel 211, and the second panel 211 and at least a part of the cells 100 form a battery module. In other words, the second panel 211 is disposed below at least a part of the plurality of cells 100, and each cell 100 is supported between the first side beam 201 and the second side beam 202 through the second panel 211; and the second panel 211 and at least a part of the plurality of cells 100 form a battery module. In this implementation, the plurality of cells 100 are supported between the first side beam 201 and the second side beam 202 through the second panel 211, thereby simplifying the structure of the battery module, and achieving a lightweight battery pack.

The first end plate 207 and the second end plate 208, or the second panel 211 may be supported by the first side beam 201 and the second side beam 202 in various manners, which are not limited in this application. For example, the first end plate 207 and the second end plate 208, or the second panel 211 may be detachably fastened on the first side beam 201 and the second side beam 202 through fasteners; or fixed to the first side beam 201 and the second side beam 202 by welding; or connected to the first side beam 201 and the second side beam 202 by gluing; or directly placed on the first side beam 201 and the second side beam 202, and supported by the first side beam 201 and the second side beam 202.

In an implementation, the battery pack 200 includes: a first panel 212 and a second panel 211, where the first panel 212 and the second panel 211 are respectively connected to upper surfaces and lower surfaces of at least a part of the cells 100; a first end plate 207 and a second end plate 208, where the first end plate 207 and the second end plate 208 are respectively provided on two end faces of at least a part of the cells 100; and a first side plate 209 and a second side plate 210, where the first side plate 209 and the second side plate 210 are respectively disposed on outer side surfaces of the outermost two cells 100. The first end plate 207, the second end plate 208, the first side plate 209, and the second side plate 210 are all connected to the first panel 212 and the second panel 211. The inner wall surface of the first side beam 201 facing toward the cell 100 has a first supporting surface and a first connecting surface 215, and the inner wall surface of the second side beam 202 facing toward the cell 100 has a second supporting surface and a second connecting surface 216. The first end of the cell 100 is supported by the first supporting surface, and the second end of the cell 100 is supported by the second supporting surface. The first end plate 207 is connected to the first connecting surface 215, and the second end plate 208 is connected to the second connecting surface 216. An inner wall surface of the third side beam 203 facing toward the cell 100 has a third connecting surface 236, and an inner wall surface of the fourth side beam facing toward the cell has a fourth connecting surface 235. The first side plate 209 is connected to the third connecting surface 236, and the second side plate 210 is connected to the fourth connecting surface 235.

Through the above implementation, the first end plate 207, the second end plate 208, the first side plate 209, the second side plate 210, the first panel 212, and the second panel 211 jointly define a closed accommodating space for accommodating the plurality of cells 100. In this way, when the cell 100 fails and burns or explodes, the first end plate 207, the second end plate 208, the first side plate 209, the second side plate 210, the first panel 212, and the second panel 211 can control the impact of the failure of the cell 100 to be within a certain range, so as to prevent the explosion of the cell 100 from affecting components nearby. The first side plate 209 may be the first elastic buffering apparatus 205 mentioned above, and the second side plate 210 may be the second elastic apparatus 206 mentioned above, so that the first side plate 209 and the second side plate 210 provide a function of limiting expansive deformation of the plurality of cells 100, thereby ensuring starting of the explosion-proof valve 103 and/or the current interrupt device (CID).

Figure 11:
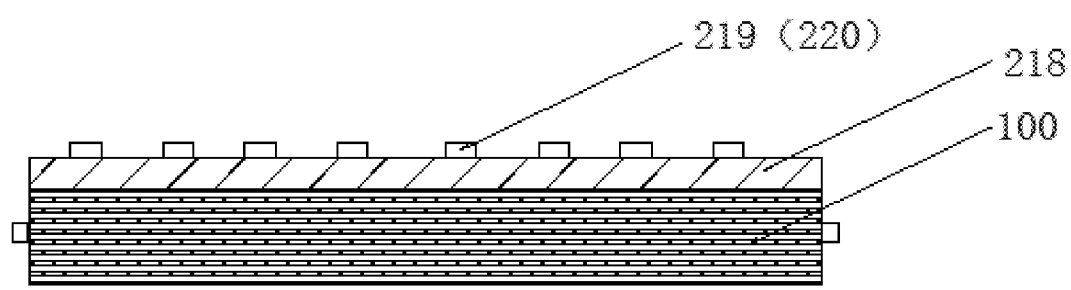
FIG. 11 is a schematic three-dimensional structural diagram of a battery pack according to another implementation of this application, where first and second side beams are not shown.

For embodiments where the battery module includes the first panel 212, as shown in FIG. 11, a heat-conducting plate 218 may be disposed between the first panel 212 and the cell 100, to facilitate heat dissipation of the cell 100, and ensure that the temperature difference between the plurality of cells 100 is not too large. The heat-conducting plate 218 may be made of a material having a good heat-conducting property. For example, the heat-conducting plate 218 may be made of a material having a high coefficient of thermal conductivity, such as copper or aluminum.

In some embodiments, when the battery pack is used on a vehicle to provide electric energy, the length direction of the cell 100 may be used as the width direction of the vehicle, that is, a left-right direction of the vehicle.

In another implementation provided in this application, the support member 4 is a plurality of bottom beams, and the bottom beams are located below the cell array 3. The bottom beams are used for supporting the cell array 3. Upper surfaces of the bottom beams may be planes so as to support the cell array 3 in a surface-to-surface manner. In practice, the bottom beam has a rectangular cross-section. There may be a plurality of bottom beams, and the plurality of bottom beams may be disposed in parallel at intervals or disposed crossing each other. The cell array 3 may be fixed to the bottom beams by means such as gluing or threaded connecting members, the battery pack further includes a sealing cover, and the sealing cover and the bottom beams form an accommodating cavity for accommodating the cell array 3. The sealing cover is used for preventing intrusion of dust, water, and the like.

as shown in FIG. 25, the bottom beams include a first beam 501 and a second beam 502 located on and intersecting the first beam 501, an angle between an extension direction of the first beam 501 and the Y direction is 60-90°, and the cell 100 is supported by the first beam 501. In the embodiment shown in FIG. 25, the first beam 501 is perpendicularly connected to the second beam 502. The connection between the first beam 501 and the second beam 502 may be achieved by means such as, but not limited to, a threaded connecting member or welding. The first beam 501 and the second beam 502 may both be straight beams.

In practice, there are two second beams 502, the two second beams 502 are respectively located at two ends of the first beam 501 and are respectively perpendicular to the first beam 501, and the cell 100 is supported by the first beam 501. The second beam 502 protrudes upward (Z direction) relative to the first beam 501, for example, a lower surface of the second beam 502 may be connected to an upper surface of the first beam 501. During the arrangement of the cells 100, the outermost two cells 100 may respectively lean against side surfaces of two second beams 502 which face toward each other. A center of the cell 100 is located on the first beam 501. A length direction of the cell 100 is perpendicular to a length direction of the first beam 501. By aligning the center of the cell 100 with the first beam 501, the supporting of the cell 100 by using a single beam can be achieved. Certainly, in other embodiments, there may also be a plurality of first beams 501, and the plurality of first beams 501 are parallel to and spaced apart from each other along a second direction.

In other implementations, the bottom beams may be a plurality of rectangular beams parallel to and spaced apart from each other, an angle between an extension direction of the rectangular beam and the Y direction is 60-90°, and the cell 100 is supported by the rectangular beam. The rectangular beam may be evenly distributed along the Y direction, the extension direction of the rectangular beam is perpendicular to the Y direction, and the cell 100 is located on the evenly distributed rectangular beam.

Certainly, the shape of the bottom beam includes, but is not limited to, straight and rectangular, and may also be triangular, trapezoidal, or any other special shape.

In another implementation provided in this application, as shown in FIG. 16, the support member 4 is a vehicle chassis, and the cell array 3 is located on the vehicle chassis. The battery pack 200 may be directly formed on an electric vehicle. In other words, the battery pack 200 is an apparatus configured for mounting the cell 100 and formed at any suitable position on the electric vehicle. for example, the battery pack 200 may be directly formed on the chassis of the electric vehicle.

In some embodiments, the vehicle chassis is provided with a cavity 300 recessed downward, to facilitate the assembly of the cell 100.

In a specific implementation provided in this application, the cavity 300 may include a first side wall 301 and a second side wall 302 disposed opposite to each other. The first side wall 301 may extend downward from the chassis of the electric vehicle to obtain an extension portion of the first side wall 301, and the second side wall 302 may extend downward from the chassis of the electric vehicle to obtain an extension portion of the first side wall 302. In this way, as an implementation, the first end of the cell 100 may be supported by the extension portion of the first side wall 301, and the second end of the cell 100 may be supported by the extension portion of the second side wall 302. Accordingly, this application further provides an electric vehicle allowing for arranging cells 100 according to the above technical solution, where a cavity 300 having the same features as a separate tray for use with a vehicle is formed on the electric vehicle, thus forming the battery pack 200 provided by this application.

In some embodiments, in an exemplary implementation provided in this application, the extension portion of the first side wall 301 and the extension portion of the second side wall 302 form a bottom 305 of the cavity 300. In an implementation, the extension portion of the first side wall 301 is connected to the extension portion of the second side wall 302, so that the cavity 300 is formed into a cavity 300 having a U-shaped groove recessed downward, and the cell 100 may be supported by th bottom 305 of the cavity 300. In another implementation, the extension portion of the first side wall 301 may be spaced apart from the extension portion of the second side wall 302 by a distance.

According to the battery pack 200 provided by this application, as shown in FIG. 2, a cell placement region is formed in the battery pack 200, the cell array 3 is located in the cell placement region, and the battery pack 200 includes one cell array 3.

In other words, no reinforcing rib needs to be disposed in the battery pack, and the cells 100 connected function as reinforcing ribs, so that the structure of the battery pack 200 is greatly simplified, and the space occupied by reinforcing ribs and the space occupied by the mounting structure of the cell 100 are reduced, thereby improving the space utilization to improve the battery life.

In some specific examples of this application, the battery pack accommodates only one cell 100 in the Y direction. In other words, in the Y direction, the battery pack 200 does not allow two or more cells 100 to be arranged in this direction. That the battery pack accommodates only one cell 100 means that in the Y direction of the battery pack 200, only one cell 100 can be disposed. As shown in FIG. 2 and FIG. 4 to FIG. 6, the cell 100 is perpendicular to the first side beam 201 and the second side beam 202, a distance between the first end and the second end of the cell 100 is L1, and a distance between an inner surface of the first side beam 201 and an inner surface of the second side beam 202 is L2, where a ratio of L1 to L2 meets L1/L2≥50%. In other words, along the Y direction, only one cell 100 is arranged between the first side beam 201 and the second side beam 202. By means of such a setting of the cell 100 and the distance between the two side beams in the Y direction, the purpose of using the cell 100 as a transverse beam or longitudinal beam is achieved. In an exemplary implementation provided in this application, by arranging only one cell 100 between the first side beam 201 and the second side beam 202 along the Y direction, the cell 100 itself can serve as a transverse beam or longitudinal beam to enhance the structural strength of the battery pack 200.

In some embodiments, the ratio of L1 to L2 may meet 80%≤L1/L2≤97%, so that the first end and the second end of the cell 100 are as close as possible to the first side beam 201 and the second side beam 202 or even abut against the first side beam 201 and the second side beam 202. In this way, the distribution and transmission of force can be achieved by using the structure of the cell 100 itself, thereby ensuring that the cell 100 can serve as a transverse beam or longitudinal beam to enhance the structural strength of the battery pack 200, and ensuring that the battery pack 200 has sufficient strength against deformation under an external force.

Certainly, the embodiments of this application are not limited to the case where no reinforcing rib is disposed. Therefore, there may be a plurality of cell arrays 3.

According to the battery pack 200 provided by this application, a cell placement region is formed in the battery pack 200, the cell array 3 is located in the cell placement region, N cell arrays 3 along the X direction and M cell arrays 3 along the Y direction are disposed in the cell placement region, the cell arrays 3 are electrically connected to each other through connecting members between electrode terminals of cells, N is greater than or equal to 1, and M is greater than or equal to 1. An electrode terminal of the last cell of the $(N-1)^{th}$ cell array 3 is connected to an electrode terminal of the first cell of the $N^{th}$ cell array 3 through a connecting member, and N is greater than or equal to 1. In other words, in the battery pack, a plurality of cell arrays 3 may be disposed along the arrangement direction of the cells 100, that is, the battery pack 200 is provided therein with multiple columns of cell arrays 3.

Specifically, as shown in FIG. 21, the first partition plate 700 divides the shown cell array 3 along the X direction of the battery pack 200 into two cell arrays 3. The last cell 100 of one cell array 3 is connected to the first cell of the other cell array 3 through a connecting member.

According to the battery pack 200 provided by this application, a cell placement region is formed in the battery pack, the cell array 3 is located in the cell placement region, M cell arrays 3 along the Y direction are disposed in the cell placement region, the cell arrays 3 are electrically connected to each other through connecting members between electrode terminals of cells, and M is greater than or equal to 1. An electrode terminal of the last cell of the $(M-1)^{th}$ cell array 3 is connected to an electrode terminal of the first cell of the $M^{th}$ cell array 3 through a connecting member, and M is greater than or equal to 1. In other words, in the extension direction of the cell 100, a plurality of cells 100 may be accommodated. That is, the battery pack 200 is provided therein with multiple rows of cell arrays 3.

Specifically, as shown in FIG. 20, the second partition plate 800 divides the cell array 3 along the Y direction of the battery pack 2000 into two cell arrays 3. The last cell 100 of one cell array 3 is connected to the first cell of the other cell array 3 through a connecting member.

According to the battery pack 200 provided by this application, a cell placement region is formed in the battery pack, the cell array 3 is located in the cell placement region, N cell arrays 3 along the X direction and M cell arrays 3 along the Y direction are disposed in the cell placement region, the cell arrays 3 are electrically connected to each other through connecting members between electrode terminals of cells, N is greater than or equal to 1, and M is greater than or equal to 1. In other words, in the X direction of the battery pack, the cell placement region is divided into a plurality of battery placement subregions, and in the extension direction of the cell 100, i.e., the Y direction, a plurality of cells 100 may be accommodated. That is, the battery pack 200 is provided therein with multiple rows and multiple columns of cell arrays 3.

Specifically, as shown in FIG. 22, a first partition plate 700 and a second partition plate 800 are disposed in the battery pack 200, and the first partition plate 700 and the second partition plate 800 divide a plurality of cells into two rows and two columns of cell arrays 3. Any two of the cell arrays 3 are connected to each other through connecting members between electrode terminals.

In the foregoing description, the first partition plate 700 and the second partition plate 800 may be reinforcing ribs, or may be heat insulation foam or other mechanical member, which is not limited in this application.

The quantity of cells 100 in the cell array 3 is not particularly limited in this application, and depending on different vehicle types and different power requirements, different numbers of cells 100 may be arranged. In some specific examples of this application, the quantity of cells in the cell array 3 is 60-200. In some other specific examples of this application, the quantity of cells in the cell array 3 is 80-150.

In the battery pack 200 provided by this application, the cells in the cell array 3 are connected by gluing. By connecting the cells 100 with each other by gluing, space can be saved, and the use of other mechanical members is reduced, thereby achieving a lightweight design, and improving the energy density and the production efficiency.

In an implementation, the first panel 212 is a heat exchange plate 219 provided therein with a cooling structure, and a cooling liquid is provided inside the heat exchange plate 219, so as to lower the temperature of the cell 100 by using the cooling liquid, making the cell 100 remain at a suitable operating temperature. Because the heat-conducting plate 218 is disposed between the heat exchange plate 219 and the cell 100, the temperature differences between various positions on the heat exchange plate 219 can be balanced by means of the heat-conducting plate 218 when the cooling liquid is used to cool the cell 100, thereby controlling the temperature difference between the plurality of cells 100 to be within 1° C.

The cell 100 may be of any suitable structure and shape. In an implementation provided in this application, as shown in FIG. 3, the cell body of the cell 100 is a prismatic cell having a square-shaped structure and has a length, a thickness, and a height in a range of the length to the thickness, each cell 100 is placed on its side, a length direction of the cell body of each cell 100 is a Y direction, a thickness direction thereof is an X direction, a height direction thereof is a Z direction, and neighboring two cells 100 are arranged in a large surface-to-large surface manner. In other words, the square shape has a length L in the length direction, a thickness D in the thickness direction perpendicular to the length direction, and a height H in the height direction. The height H is in a range of the length L to the thickness D. The cell 100 has large surfaces, narrow surfaces, and end faces. A long side of the large surface has the length L, and a short side of the large surface has the height H. A long side of the narrow surface has the length L, and a short side of the narrow surface has the thickness D. A long side of the end face has the height H, and a short side of the end face has the thickness D. That each cell 100 is placed on its side means that and two end faces of the cell 100 respectively face toward the first side beam 201 and the second side beam 202. The large surfaces of neighboring two cells 100 are opposite to each other, so that the cells 100 can be used in place of transverse beams, and provide a better effect and a higher strength. In other implementations, the cell 100 may be a cylindrical cell.

In the related art, how to design the shape and dimension of the cell 100 to achieve both a suitable battery capacity and a good heat dissipation effect has long been one of the problems to be solved in the battery field.

in an implementation provided in this application, the ratio of the length L and the thickness D of the cell body of the cell 100 meets 23≤L/D≤208. Under this ratio, a long and thin cell 100 can be obtained. In this way, while ensuring that the length of the cell 100 extends along the Y direction, a suitable resistance, a large heat dissipation area, and high heat dissipation efficiency can be maintained, providing good adaptability for various vehicle types.

In another implementation provided in this application, the ratio of the length L and the height H of the cell body of the cell 100 meets 4≤L/D≤21. In some embodiments, 9≤L/H≤13. This ratio may be achieved by the above long and thin cell 100 or through dimension adjustment. By controlling the ratio of the length L and the height H of the cell body of the cell 100, a sufficient heat dissipation area is provided while ensuring that the length of the cell 100 extends along the Y direction, thereby ensuring the heat dissipation effect of the cell 100.

In the related art, because the dimension L of the cell is small, the two ends of the cell cannot be directly supported by the side beams. During the assembly process, first, a plurality of cells need to be arranged to form a cell array 3. End plates and/or side plates are disposed outside the cell array 3. Usually, both end plates and side plates are disposed. The end plates and the side plates are fixed to define a space for accommodating the cell array 3. Thus, a battery module is formed. Then, the battery module is mounted in the battery pack, and at least one of transverse beams and longitudinal beams further needs to be disposed in the battery pack to facilitate the mounting of the battery module. Such an assembly process is complex, the defect rate in the assembly process of the battery pack is increased, and multiple assembly procedures lead to an increase in the possibility of loosening and unstable mounting of the battery pack, adversely affecting the quality of the battery pack and reducing the stability and reliability of the battery pack.

Compared with the related art, in this application, the dimension L of the cell is large, and the cell is a hard-case cell that can provide a supporting function by itself; therefore, in the process of assembling cells into a battery pack, first, a single cell 100 may be directly placed on its side into the tray, with the first end of the cell 100 being supported by the first side beam 201, and the other end of the cell 100 being supported by the second side beam 200. Then, other cells 100 are placed in sequence along the X direction of the battery pack to form a cell array 3, and then the fixing of the cell array 3 and the mounting of battery management components and power distribution components are implemented by using fasteners. The entire assembly process is relatively simple, it is not necessary to assemble cells into a battery module first and then mount the battery module into the battery pack, but instead, the cell array 3 can be directly formed in the battery pack, thereby reducing the labor and material costs, lowering the defect rate, and improving the stability and reliability of the battery pack.

Certainly, in this application, it is also feasible to assemble cells into a cell array 3 first and then mount the cell array 3 into the battery pack, and this implementation also falls within the technical scope of this application.

Figure 26:
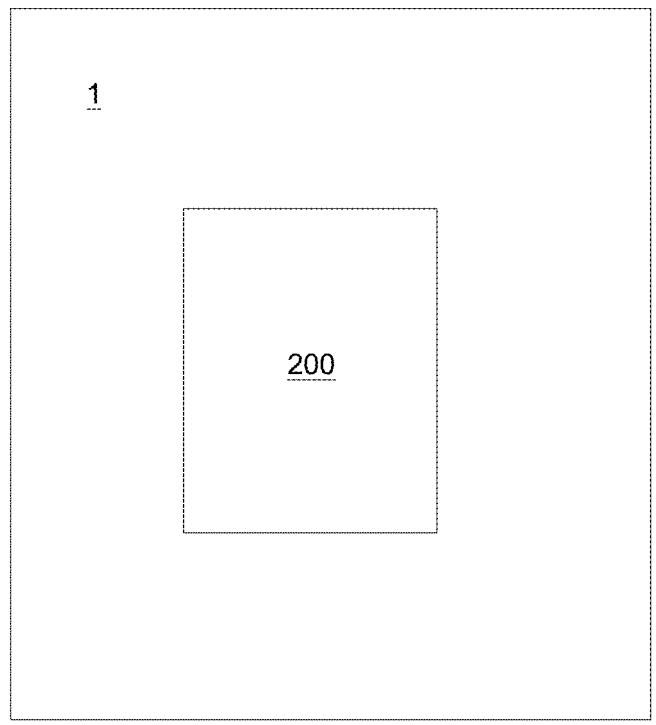
FIG. 26 is a schematic structural diagram of a vehicle according to an implementation of this application.

As shown in FIG. 26, a second objective of this application is to provide a vehicle 1, including the above-mentioned battery pack 200.

Herein, the vehicle 1 may include a commercial vehicle, a special vehicle, an electric bicycle, an electric motorcycle, an electric scooter, or any other electric vehicle that requires the use of a battery pack to provide electric energy to drive it.

In some embodiments, the battery pack 200 is disposed at a bottom of the electric vehicle, and the support member 4 is fixedly connected to a chassis of the vehicle 1. Because there is a large mounting space at the chassis of the electric vehicle, disposing the battery pack 200 at the chassis of the electric vehicle can increase the quantity of cells 100 as much as possible, thereby improving the battery life of the electric vehicle.

In some embodiments, the vehicle includes a battery pack disposed at a bottom of the vehicle, and the battery pack is fixedly connected to a chassis of the vehicle. The Q direction, or the length direction of the minimum enclosing rectangle of the cell, or the Y direction is a width direction of a vehicle body of the vehicle, that is, a left-right direction of the vehicle. The P direction, or the width direction of the minimum enclosing rectangle of the cell, or the Y direction is a length direction of the vehicle body of the vehicle, that is, a front-rear direction of the vehicle. In other implementations, the vehicle may include a plurality of battery packs disposed at the bottom of the vehicle. The shapes and dimensions of the plurality of battery packs may be the same or may be different. Each battery pack may be adjusted depending on the shape and dimension of the chassis of the vehicle. The plurality of battery packs are arranged along the length direction of the vehicle body, that is, the front-rear direction.

In some embodiments, in an implementation provided in this application, a ratio of a width L3 of the battery pack 200 in the Q direction, or the length direction of the minimum enclosing rectangle of the cell, or the Y direction to a vehicle body width W meets: 50%≤L3/W≤80%. In this implementation, only one battery pack 200 may be disposed along the width direction of the vehicle body, and when there are a plurality of battery packs 200, the plurality of battery packs 200 are arranged along the length direction of the vehicle body. Generally, for most vehicles, the vehicle body width is 600 mm-2000 mm, for example, 600 mm, 1600 mm, 1800 mm, or 2000 mm, and the vehicle body length is 500 mm-5000 mm. For a passenger vehicle, its width is generally 600 mm-1800 mm, and the vehicle body length is 600 mm-4000 mm.

In some embodiments, a ratio of a dimension L' of the cell 100 in the Q direction, or the length direction of the minimum enclosing rectangle of the cell, or the Y direction to the vehicle body width W meets: 46%≤L'/W≤76%. Taking the thicknesses of the first side beam 201 and the second side beam 202 of the battery pack 200 into consideration, when the ratio of the dimension L of the cell 100 in the Y direction to the vehicle body width W meets 46%≤L'/W≤76%, in this implementation, only one cell 100 may be disposed along the width direction of the vehicle body. In other possible implementations, in the case that such a dimension requirement is satisfied, a plurality of battery modules or a plurality of cells may be disposed in the length direction. As an implementation, the dimension of the cell 100 in the Y direction is 600 mm-1500 mm.

It should be noted that in some embodiments of this application, although the solution where two ends of a cell are respectively supported by a first side beam and a second side beam has been proposed, in the actual production process, it is possible that cells having a length matching the vehicle body width cannot be fabricated, that is to say, due to some reasons, cells cannot be fabricated into an expected length. This is because that during the development of electric vehicles, according to the development requirements, a voltage platform of the entire battery pack is usually a fixed value, and the volume of the battery pack is a fixed value. Provided that the selected material system is certain, and the voltage platform of the cell is certain, the quantity of cells needed in the battery pack is certain. Because the volume of the battery pack is a fixed value, the volume of the cell is certain. As a result, if the length of the cell is increased, the thickness or width of the cell will be decreased. On the other hand, the surface area of the entire cell needs to be ensured in order to improve the heat dissipation effect, and in view of this, the length of the cell cannot be increased by reducing the width (height) of the cell. In addition, on the vehicle body, the utilization of the space in height is also limited. To minimize the impact, usually the width (height) of the cell is not adjusted. Therefore, the surface area of the cell can be changed only by changing the length of the cell in the first direction and the thickness of the cell in the second direction. Therefore, it is probable to increase the length by reducing the thickness. However, in practice, because a core and related material need to be placed inside the cell, the change in the thickness of the cell is limited to a minimum limit value. As a result, affected by the limit value of thickness variation, there is limited room for changing the length of the cell in the first direction, and the length of the cell cannot be increased indefinitely.

This application further provides an energy storage device 2.

Figure 27:
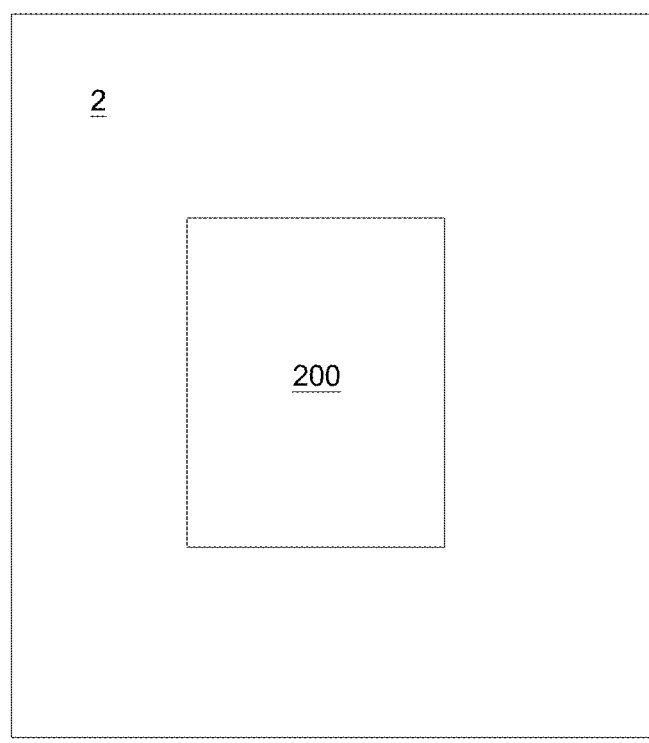
FIG. 27 is a schematic structural diagram of an energy storage device according to an implementation of this application.

As shown in FIG. 27, the energy storage device 2 of this application includes the battery pack 200 according to any one of the foregoing embodiments. The energy storage device 2 of this application may be applied to a backup power supply for family use, a backup power supply for commercial use, an outdoor power supply, peak-shaving energy storage equipment for a power station, a power supply for various vehicles, and the like.

The preferred embodiments of this application are described in detail above with reference to the accompanying drawings, but this application is not limited to the specific details in the above embodiments. Various simple variations may be made to the technical solutions of this application within the scope of the technical idea of this application, and such simple variations shall all fall within the protection scope of this application.

It should be noted that the specific technical features described in the above specific embodiments may be combined in any suitable manner without contradiction. To avoid unnecessary repetition, various possible combinations are not further described in this application.

In addition, the various embodiments of this application may be combined without departing from the idea of this application, and such combinations shall also fall within the scope of this application.

The improvement in energy density that is achieved in the battery pack 200 according to the embodiments of this application by designing the arrangement and dimension parameters of cells 100 will be described below with reference to Comparative Example 1 and Embodiments 1-2, Comparative Example 2 and Embodiment 4-4, as well as Comparative Example 3 and Embodiment 5.

The following embodiments and comparative examples all take a lithium iron phosphate battery as an example.

In Comparative Example 1, Embodiment 1, and Embodiment 2, the total volume of the battery pack 200 is 213 L, where the volume occupied by the battery pack housing and the battery management system and other power distribution modules therein is 82.54 L in total, and the remaining volume of the battery pack 200 that can be actually used for accommodating the cells 100 and/or the first partition plate and the second partition plate is 130.46 L. The battery pack housing has a length of 1380 mm, a width of 1005 mm, and a thickness of 137 mm, the volume of the power distribution box is 22.5 L, and the total volume of the battery pack is 213 L=1380×1005×137×0.000001+22.5.

Comparative Example 1

For a battery pack 200 in the related art, as shown in FIG. 1, two transverse beams 500 and one longitudinal beam 600 are disposed inside the battery pack housing. The two transverse beams 500 and the longitudinal beam 600 divide cells 100 into six battery modules 400.

Embodiment 1

For a battery pack 200 according to this embodiment of this application, as shown in FIG. 21, the length direction of the cell 100 is arranged along the width direction of the battery pack 200, and a plurality of cells 100 are arranged along the length direction of the battery pack 200. In the width direction of the battery pack 200, the battery pack housing accommodates one cell 100. The cell 100 extends from one side to the other side of the battery pack housing along the width direction of the battery pack 200. A first partition plate 700 is disposed in the battery pack housing, and no second partition plate 800 is disposed. The first partition plate 700 extends along the width direction of the battery pack 200. A plurality of cells 100 are arranged along the length direction of the battery pack 200 to form a cell array 400. The first partition plate 700 divides the cell array 400 along the length direction of the battery pack 200 into two parts. The first side beam 201 and the second side beam 202 of the battery pack housing that are located at two sides of the battery pack 200 in the width direction provide a supporting force for the cell 100. The third side beam 203 and the fourth side beam 204 of the battery pack housing that are located at two ends of the battery pack 200 in the length direction provide an inward pressing force for adjacent cells 100. The battery pack housing contains one layer of cell array 400 along the height direction of the battery pack 200.

Embodiment 2

Figure 23:
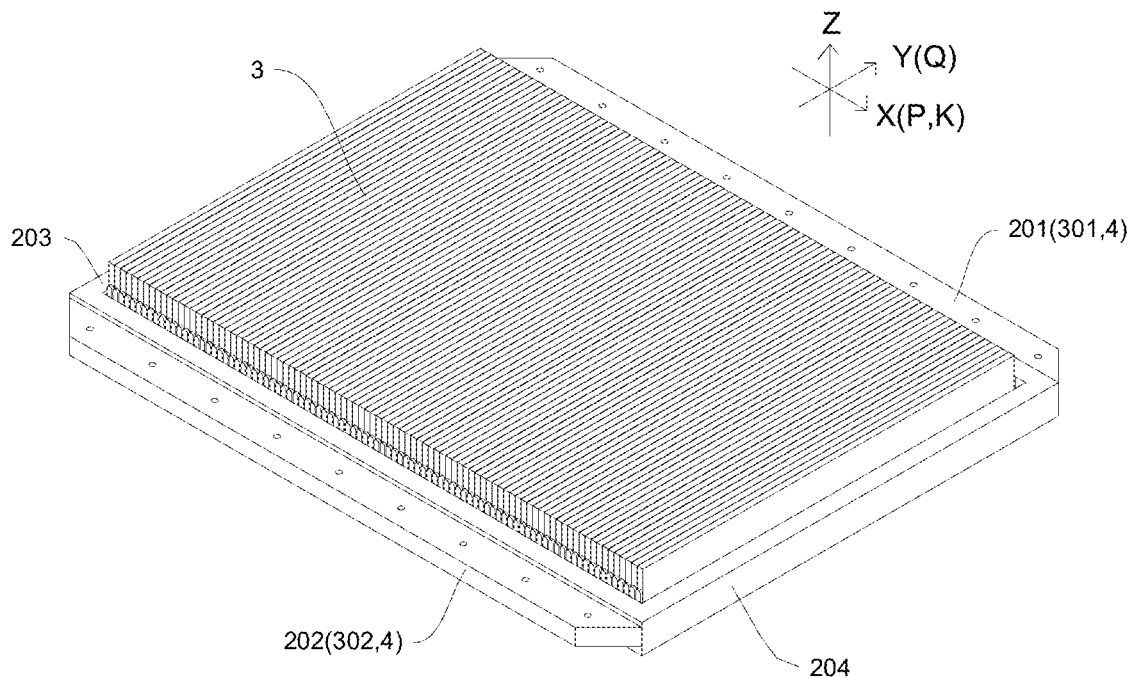
FIG. 23 is a three-dimensional diagram of a battery pack according to yet another implementation of this application.

For a battery pack 200 according to this embodiment of this application, as shown in FIG. 23, the length direction of the cell 100 is arranged along the width direction of the battery pack 200, and a plurality of cells 100 are arranged along the length direction of the battery pack 200. In the width direction of the battery pack 200, the battery pack housing accommodates one cell 100. The cell 100 extends from one side to the other side of the battery pack housing along the width direction of the battery pack 200. no first partition plate 700 or second partition plate 800 is disposed in the battery pack housing. The first side beam 201 and the second side beam 202 of the battery pack housing that are located at two sides of the battery pack 200 in the width direction provide a supporting force for the cell 100. The third side beam 203 and the fourth side beam 204 of the battery pack housing that are located at two ends of the battery pack 200 in the length direction provide an inward pressing force for adjacent cells 100. The battery pack housing contains two layers of cell arrays 400 along the height direction of the battery pack 200.

It can be known by those skilled in the art by comparing the foregoing Comparative Example 1 and Embodiments 1-3 that compared with the battery pack 200 in the related art, the battery pack 200 according to the embodiments of this application, by designing the arrangement, dimension parameters and other factors of the cells 100, the grouping efficiency can overcome the limitations of existing battery packs 200, thereby achieving a higher energy density.

In Comparative Example 2, Embodiment 3, and Embodiment 4, the total volume of the battery pack 200 is 310 L, where the volume occupied by the battery pack housing and the battery management system and other power distribution modules therein is 90 L in total, and the remaining volume of the battery pack that can be actually used for accommodating the cells 100 and/or the first partition plate and the second partition plate is 220 L. The battery pack housing has a length of 1580 mm, a width of 1380 mm, and a thickness of 137 mm, the volume of the power distribution box is 11 L, and the total volume of the battery pack is 310 L=1580×1380×137×0.000001+11.

Comparative Example 2

The arrangement manner of cells in the battery pack is the same as that in Comparative Example 1.

Embodiment 3

For a battery pack 200 according to this embodiment of this application, as shown in FIG. 20, the length direction of the cell 100 is arranged along the length direction of the battery pack 200, and a plurality of cells 100 are arranged along the width direction of the battery pack 200. In the length direction of the battery pack 200, the battery pack housing accommodates one cell 100. The cell 100 extends from one side to the other side of the battery pack housing along the length direction of the battery pack 200. A second partition plate 800 is disposed in the battery pack housing, and no transverse beam 500 is disposed. The second partition plate 800 extends along the length direction of the battery pack 200. A plurality of cells 100 are arranged along the width direction of the battery pack 200 to form a cell array 400. The second partition plate 800 divides the cell array 400 along the width direction of the battery pack 200 into two parts. The third side beam 203 and the fourth side beam 204 of the battery pack housing that are located at two ends of the battery pack 200 in the length direction provide a supporting force for the cell 100. The first side beam 201 and the second side beam 202 of the battery pack housing that are located at two sides of the battery pack 200 in the width direction provide an inward pressing force for adjacent cells 100. The battery pack housing contains two layers of cell arrays 400 along the height direction of the battery pack 200.

Embodiment 4

Figure 24:
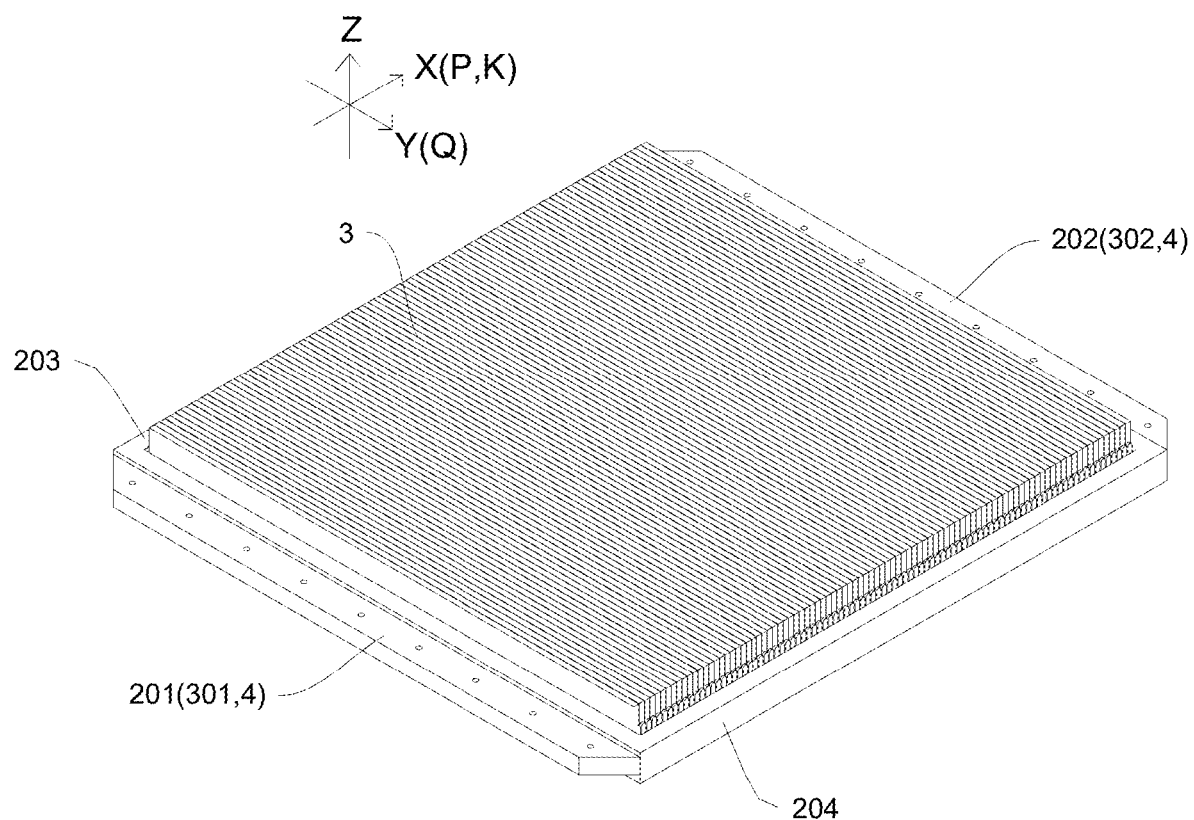
FIG. 24 is a three-dimensional diagram of a battery pack according to yet another implementation of this application.

For a battery pack 200 according to this embodiment of this application, as shown in FIG. 24, the length direction of the cell 100 is arranged along the length direction of the battery pack 200, and a plurality of cells 100 are arranged along the width direction of the battery pack 200. In the length direction of the battery pack 200, the battery pack housing accommodates one cell 100. The cell 100 extends from one side to the other side of the battery pack housing along the length direction of the battery pack 200. The third side beam 203 and the fourth side beam 204 of the battery pack housing that are located at two ends of the battery pack 200 in the length direction provide a supporting force for the cell 100. The first side beam 201 and the second side beam 202 of the battery pack housing that are located at two sides of the battery pack 200 in the width direction provide an inward pressing force for adjacent cells 100. The battery pack housing contains two layers of cell arrays 400 along the height direction of the battery pack 200.

In Comparative Example 3 and Embodiment 5, the total volume of the battery pack 200 is 414 L, where the volume occupied by the battery pack housing and the battery management system and other power distribution modules therein is 102 L in total, and the remaining volume of the battery pack that can be actually used for accommodating the cells 100 is 312 L. The battery pack housing has a length of 2130 mm, a width of 1380 mm, and a thickness of 137 mm, the volume of the power distribution box is 11 L, and the total volume of the battery pack is 414 L=2130×1380×137×0.000001+11.

Comparative Example 3

The arrangement manner of cells is the same as that in Comparative Example 1.

Embodiment 5

The arrangement manner of cells in the battery pack is the same as that in Embodiment 4.

Embodiment 6

In this embodiment, the total volume of the battery pack 200 is 508 L, where the volume occupied by the battery pack housing and the battery management system and other power distribution modules therein is 119 L in total, and the remaining volume of the battery pack that can be actually used for accommodating the cells 100 is 389 L. The battery pack housing has a length of 2630 mm, a width of 1380 mm, and a thickness of 137 mm, the volume of the power distribution box is 11 L, and the total volume of the battery pack is 414 L=2630×1380×137×0.000001+11. The arrangement manner of cells in the battery pack is the same as that in Embodiment 4.

Specific parameters of Embodiments 1-6 and Comparative Examples 1-2 are as shown in Table 1.

TABLE 1

| Experiment | Comparative example 1 | Embodiment 1 | Embodiment 2 | Comparative example 2 | Embodiment 3 | Embodiment 4 | Comparative example 3 | Embodiment 5 | Embodiment 6 |
|---|---|---|---|---|---|---|---|---|---|
| Cell dimension: length, width, height (mm) | 208 * 118 * 13.5 | 905 * 118 * 13.5 | 905 * 118 * 13.5 | 208 * 118 * 13.5 | 1280 * 118 * 13.5 | 1280 * 118 * 13.5 | 208 * 118 * 13.5 | 2000 * 118 * 13.5 | 2500 * 118 * 13.5 |
| Number | 352 | 88 | 92 | 500 | 90 | 93 | 752 | 94 | 94 |
| Cell capacity (Ah) | 47.5 | 202 | 202 | 47.5 | 286 | 286 | 47.5 | 448 | 561 |
| Quantity of electricity of cell (Wh) | 152 | 646.4 | 646.4 | 152 | 915.2 | 915.2 | 152 | 1434 | 1795 |
| Cell volume (L) | 0.331 | 1.442 | 1.442 | 0.331 | 2.039 | 2.039 | 0.331 | 3 | 4 |
| Cell energydensity (Wh/L) | 459 | 448 | 448 | 459 | 449 | 449 | 459 | 450 | 451 |
| Quantity of electricity of battery pack (Wh) | 53504 | 56883.2 | 59468.8 | 76000 | 82368 | 85113.6 | 114304 | 134758.4 | 168748.8 |
| Total volume of battery pack (L) | 213 | 213 | 213 | 310 | 310 | 310 | 414 | 414 | 508 |
| Battery pack energy density (Wh/L) | 251 | 268 | 280 | 245 | 266 | 275 | 276 | 326 | 332 |
| Sum of volumes of cells/volume of battery pack | 54.76% | 59.7% | 62.41% | 53.49% | 59.25% | 61.23% | 60.23% | 72.39% | 73.66% |

The improvement in heat dissipation effect that is achieved in the battery pack 200 according to the embodiments of this application by designing the dimension parameters of cells 100 and the like will be described below with reference to Comparative Example 4 and Embodiments 7-10.

The cell in Comparative Example 4 and Embodiments 7-10 is fast-charged at a rate of 2C, and in the fast-charging process, the temperature rise of the cell is measured. Table 2 below records the selection of parameters including the length, width, thickness, volume, surface area, and energy of the cell in each embodiment and comparative example, and also records specific temperature rises.

TABLE 2

|  | Comparative Example 4 | Embodiment 7 | Embodiment 8 | Embodiment 9 | Embodiment 10 | Embodiment 10 |
|---|---|---|---|---|---|---|
| Cell body length (mm) | 173 | 905 | 1280 | 700 | 600 | 1500 |
| Cell body width (mm) | 113.9 | 113.9 | 109 | 109 | 150 | 105 |
| Cell body thickness (mm) | 50 | 9.6 | 7 | 12.5 | 14.5 | 13.5 |
| Cell body volume (mm) | 985235 | 989563.2 | 976640 | 953750 | 1305000 | 2126250 |
| Cell body surface area (mm) | 58146.02 | 223535 | 296960 | 170100 | 197400 | 355500 |
| Cell body length/cell body width | 1.52 | 7.95 | 11.74 | 6.422018349 | 4 | 14.28571429 |
| Cell body length/cell body thickness | 3.46 | 94.2708333 | 182.8571429 | 56 | 41.37931034 | 111.1111111 |
| Cell body length/cell body volume (mm-2) | 0.000176 | 0.00091455 | 0.001310616 | 0.000733945 | 0.00045977 | 0.000705467 |
| Cell body width/cell body volume (mm-2) | 0.000116 | 0.0001151 | 0.000111607 | 0.000114286 | 0.000114943 | 0.000049383 |
| Cell body thickness/cell body volume (mm-2) | 0.000051 | 0.0000097 | 0.000007167 | 0.000013106 | 0.000011111 | 0.000006349 |
| Cell body length/cell body surface area (mm-1) | 0.002975 | 0.00404858 | 0.004310345 | 0.004115226 | 0.003039514 | 0.004219409 |
| Cell body surface area/cell body volume (mm-1) | 0.059017 | 0.2258926 | 0.30406291 | 0.178348624 | 0.151264368 | 0.167195767 |

TABLE 2-continued

|  | Comparative Example 4 | Embodiment 7 | Embodiment 8 | Embodiment 9 | Embodiment 10 | Embodiment 10 |
|---|---|---|---|---|---|---|
| Cell temperature rise (° C.) | 22.24 | 16.20 | 15.56 | 17.92 | 21.92 | 21.7 |
| Battery pack temperature rise (° C.) | 12.24 | 6.5 | 5.56 | 7.92 | 11.95 | 11.7 |

It can be seen from the data in the table that under same fast-charging conditions, the temperature rise of the cell 100 provided by this application is less than those of the comparative examples to different degrees, indicating a better heat dissipation effect that the prior art; and then such cells 100 are assembled into a battery pack, the temperature rise of the battery pack is also less than that in the prior art.

It can be known by those skilled in the art by comparing the foregoing comparative examples and embodiments that for the battery pack 200 according to the embodiments of this application, by designing the arrangement, dimension parameters and other factors of the cells 100, the space utilization can overcome the limitations of existing battery packs 200, thereby achieving a higher energy density. Such an increase in energy density will be magnified as the overall volume of the battery pack 200. For battery packs 200 with a larger volume, the improvement in energy density achieved by using the solutions of the embodiments of this application will be more significant.

In description of the specification, description of reference terms such as "one embodiment", "some embodiments", "exemplary embodiment", "example", "specific example" or "some examples" means including specific features, structures, materials, or features described in the embodiment or example in at least one embodiment or example of this application. In the specification, schematic descriptions of the foregoing terms do not necessarily refer to a same embodiment or example. In addition, the described specific features, structures, materials, or characteristics may be combined in an appropriate manner in any one or more embodiments or examples.

Although the embodiments of this application have been shown and described, a person skilled in the art should understand that various changes, modifications, replacements and variations may be made to the embodiments without departing from the principles and spirit of this application, and the scope of this application is as defined by the appended claims and their equivalents.

What is claimed is:

1. A battery pack, comprising a cell array, a sealing cover and a tray,
wherein the tray includes a bottom plate and a support member comprising a first side beam and a second side beam;
wherein the cell array comprises a plurality of cells, each of the cells comprising a cell body defined by a length L, a thickness D, and a height H extending between a top and a bottom of the cell body, the bottom of the cell body of each of the plurality of cells facing the bottom plate, the height H being continuous along the length L, and having a volume V, a length direction of the cell body defines a Y direction between a first end of the cell body and a second end of the cell body, wherein 600 mm≤L≤2500 mm, 10≤L/D≤208, 4≤L/H≤208, 0.0005 mm$^{-2}$≤L/V≤0.002 mm$^{-2}$;

wherein:
the first side beam and the second side beam are disposed along the Y direction at opposing ends of the bottom plate;
an inner wall surface of the first side beam facing toward the plurality of cells has a first supporting surface and a first connecting surface;
an inner wall surface of the second side beam facing toward the plurality of cells has a second supporting surface and a second connecting surface;
the first end of the cell body of each of the plurality of cells is supported by the first supporting surface;
the second end of the cell body of each of the plurality of cells is supported by the second supporting surface;
a first end plate is connected to the first connecting surface and positioned between the first end of each of the cells and the first side beam;
a second end plate is connected to the second connecting surface and positioned between the second end of the cell body of each of the plurality of cells and the second side beam;
wherein:
the battery pack further comprises a first side plate component and a second side plate component configured to sandwich the cell array therebetween, wherein the first side plate component and the second side plate component are adjacent to the first end plate and the second end plate.

2. The battery pack according to claim 1, wherein the cell body of each of the plurality of cells has a surface area S, a relationship between the surface area S and the volume V of the cell body is 0.1 mm$^{-1}$≤S/V≤0.35 mm$^{-1}$, and a relationship between the height H and the volume V of the cell body is 0.0001 mm$^{-2}$≤H/V≤0.00015 mm$^{-2}$.

3. The battery pack according to claim 1, wherein for each of the plurality of cells, the height H of the cell body is greater than or equal to the thickness D of the cell body, a relationship between the length L and the thickness D is 23≤L/D≤208, a relationship between the length L and the height H is 4≤L/H≤21, and the length L is 600 mm≤L≤1500 mm.

4. The battery pack according to claim 1, wherein a distance from the first connecting surface to the sealing cover is less than a distance from the first supporting surface to the sealing cover; and a distance from the second connecting surface to the sealing cover is less than a distance from the second supporting surface to the sealing cover.

5. The battery pack according to claim 1, wherein the inner wall surface of the first side beam facing toward the plurality of cells has a step structure comprising at least two steps, and sides of two of the at least two steps facing toward the sealing cover respectively form the first connecting surface and the first supporting surface; and
the inner wall surface of the second side beam facing toward the plurality of cells has a step structure comprising at least two steps, and sides of two of the at least two steps facing toward the sealing cover respectively form the second connecting surface and the second supporting surface.

6. The battery pack according to claim 1, wherein a management accommodating cavity for accommodating battery management components and power distribution components is defined between the first connecting surface, the second connecting surface, the plurality of cells, and the sealing cover.

7. The battery pack according to claim 1, wherein the first end of at least one of the plurality of cells is provided with an explosion-proof valve, the first side beam comprises an exhaust passage, an exhaust vent is provided at a position on the first side beam corresponding to the explosion-proof valve and is in communication with the exhaust passage, and the battery pack is provided with an exhaust outlet in communication with the exhaust passage.

8. The battery pack according to claim 1, the tray further comprising a third side beam and a fourth side beam disposed opposite the third side beam along an X direction defined by the thickness of the cell body of each of the plurality of cells, wherein the third side beam and the fourth side beam provide a pressing force to the cell array.

9. The battery pack according to claim 8, further comprising:
a first elastic apparatus elastically sandwiched between the third side beam and a cell of the plurality of cells positioned directly adjacent to the third side beam; and
a second elastic apparatus elastically sandwiched between the fourth side beam and a cell of the plurality of cells positioned directly adjacent to the fourth side beam.

10. The battery pack according to claim 8, further comprising:
a first side plate disposed between the third side beam and the cell of the plurality of cells positioned directly adjacent to the third side beam; and
a second side plate is disposed between the fourth side beam and the cell of the plurality of cells positioned directly adjacent to the fourth side beam.

11. The battery pack according to claim 10, further comprising:
a first panel and a second panel, respectively connected to upper surfaces and lower surfaces of at least some of the plurality of cells; and
wherein the first end plate, the second end plate, the first side plate, and the second side plate are each connected to the first panel and the second panel.

12. The battery pack according to claim 1, further comprising a heat exchange plate mounted on an upper surface of the cell array.

13. The battery pack according to claim 1, wherein the first end plate, the second end plate, or the first end plate and the second end plate comprise an insulating plate.

14. The battery pack according to claim 1, wherein a distance between the inner wall surface of the first side beam and the inner wall surface of the second side beam is L2, and a relationship between L and L2 is L/L2≤50%.

15. The battery pack according to claim 14, wherein the relationship between L and L2 is 80%≤L/L2≤97%.

16. The battery pack according to claim 1, wherein at least some of the plurality of cells are bonded to another of the plurality of cells by an adhesive.

17. The battery pack according to claim 1, wherein the battery pack contains only one of the plurality of cells along the Y direction.

18. The battery pack according to claim 1, wherein the plurality of cells are spaced apart from the bottom plate.

19. The battery pack according to claim 1, wherein each of the plurality of cells has a cuboid shape.

20. A battery pack, comprising a cell array, a sealing cover and a tray, wherein the tray includes a bottom plate and a support member comprising a first side beam and a second side beam;
wherein the cell array comprises a plurality of cells, each of the cells comprising a cell body defined by a length L, a thickness D, and a height H extending between a top and a bottom of the cell body, the bottom of the cell body of each of the plurality of cells facing the bottom plate, the height H being continuous along the length L, and have a volume V, a length direction of the cell body defines a Y direction between a first end of the cell body and a second end of the cell body, wherein 600 mm≤L≤2500 mm, 10≤L/D≤208, 4≤L/H≤208, 0.0005 mm$^{-2}$≤L/V≤0.002 mm$^{-2}$;
wherein:
the first side beam and the second side beam are disposed along the Y direction at opposing ends of the bottom plate;
an inner wall surface of the first side beam facing toward the plurality of cells has a first supporting surface and a first connecting surface;
an inner wall surface of the second side beam facing toward the plurality of cells has a second supporting surface and a second connecting surface;
the first end of the cell body of each of the plurality of cells is supported by the first supporting surface;
the second end of the cell body of each of the plurality of cells is supported by the second supporting surface;
a first end plate is connected to the first connecting surface and positioned between the first end of each of the cells and the first side beam;
a second end plate is connected to the second connecting surface and positioned between the second end of the cell body of each of the plurality of cells and the second side beam;
wherein:
the tray further comprises a third side beam and a fourth side beam disposed opposite the third side beam along an X direction defined by the thickness of the cell body of each of the plurality of cells, wherein the third side beam and the fourth side beam provide force to the cell body; and
comprising:
a first side plate disposed between the third side beam and the cell of the plurality of cells position directly adjacent to the third side beam; and
a second side plate disposed between the fourth side beam and the cell of the plurality of cells positioned directly to the fourth side beam.

* * * * *